US008826131B2

(12) United States Patent
Suito et al.

(10) Patent No.: US 8,826,131 B2
(45) Date of Patent: Sep. 2, 2014

(54) INFORMATION PROCESSING APPARATUS, INFORMATION PROCESSING METHOD, AND INFORMATION PROCESSING PROGRAM FOR GENERATING CONTENT LISTS

(75) Inventors: Taro Suito, Kanagawa (JP); Yoshiaki Arishima, Kanagawa (JP); Yukihiro Isono, Chiba (JP); Takashi Karimoto, Kanagawa (JP); Rui Sugiuchi, Tokyo (JP); Ryo Takaoka, Tokyo (JP); Takashi Murayama, Chiba (JP); Kazuhiro Yanase, Kanagawa (JP); Yasuaki Yorikane, Kanagawa (JP); Nobuyuki Fujiwara, Kanagawa (JP); Tatsuya Narahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1279 days.

(21) Appl. No.: 12/009,578

(22) Filed: Jan. 18, 2008

(65) Prior Publication Data

US 2008/0209325 A1    Aug. 28, 2008

(30) Foreign Application Priority Data

Jan. 22, 2007 (JP) .................... 2007-011898

(51) Int. Cl.
| G06F 3/00 | (2006.01) |
| G06F 3/0482 | (2013.01) |
| G06F 17/30 | (2006.01) |
| H04N 21/431 | (2011.01) |
| G06F 3/048 | (2013.01) |
| G06F 3/0481 | (2013.01) |
| H04N 21/45 | (2011.01) |
| H04N 21/462 | (2011.01) |
| H04N 21/482 | (2011.01) |

(52) U.S. Cl.
CPC ............. *G06F 3/0482* (2013.01); *G06F 3/048* (2013.01); *G06F 3/0481* (2013.01); *G06F 17/30053* (2013.01); *G06F 17/30056* (2013.01); *G06F 17/30905* (2013.01); *H04N 21/431* (2013.01); *H04N 21/4312* (2013.01); *H04N 21/4532* (2013.01); *H04N 21/462* (2013.01); *H04N 21/4622* (2013.01); *H04N 21/482* (2013.01)
USPC .......... 715/716; 715/717; 715/719; 715/810; 715/825; 715/828; 715/835; 715/838; 386/291; 725/37; 725/39; 725/44; 725/46; 725/49

(58) Field of Classification Search
CPC ..... G06F 3/0482; G06F 3/048; G06F 3/0481; G06F 17/30053; G06F 17/30056; G06F 17/30905; H04N 21/431; H04N 21/4312; H04N 21/4532; H04N 21/462; H04N 21/4622; H04N 21/482
USPC ......... 715/719, 716, 717, 810, 825, 828, 835, 715/838; 725/39, 44, 46, 49, 37; 386/291
See application file for complete search history.

(56) References Cited

U.S. PATENT DOCUMENTS

| 6,384,846 | B1 * | 5/2002 | Hiroi ............................. 715/794 |
| 7,607,150 | B1 * | 10/2009 | Kobayashi et al. ............ 725/41 |
| 8,161,039 | B2 * | 4/2012 | Nielen et al. .................. 707/723 |
| 2002/0165937 | A1 * | 11/2002 | Nitta et al. ..................... 709/217 |
| 2004/0001087 | A1 * | 1/2004 | Warmus et al. ............... 345/745 |
| 2004/0068741 | A1 | 4/2004 | Kimura |
| 2004/0078814 | A1 * | 4/2004 | Allen ............................. 725/47 |
| 2004/0230651 | A1 * | 11/2004 | Ivashin ......................... 709/204 |
| 2005/0022236 | A1 * | 1/2005 | Ito et al. ........................ 725/39 |
| 2005/0098023 | A1 * | 5/2005 | Toivonen et al. ............. 84/615 |
| 2005/0273818 | A1 * | 12/2005 | Kobayashi ..................... 725/46 |
| 2005/0283803 | A1 * | 12/2005 | Kimura et al. ................. 725/46 |
| 2006/0069808 | A1 * | 3/2006 | Mitchell et al. ............... 709/246 |
| 2006/0179419 | A1 | 8/2006 | Narahara et al. |
| 2006/0212478 | A1 * | 9/2006 | Plastina et al. ............. 707/104.1 |
| 2006/0222338 | A1 * | 10/2006 | Kihara et al. .................. 386/95 |
| 2006/0253874 | A1 * | 11/2006 | Stark et al. ..................... 725/62 |
| 2007/0016931 | A1 * | 1/2007 | Ichioka et al. ................. 725/46 |
| 2007/0050778 | A1 * | 3/2007 | Lee et al. ..................... 718/107 |
| 2007/0079333 | A1 * | 4/2007 | Murakami et al. ............ 725/46 |
| 2007/0162945 | A1 * | 7/2007 | Mills ........................... 725/119 |
| 2007/0171282 | A1 * | 7/2007 | Yanagi .................... 348/207.99 |

| | | | | |
|---|---|---|---|---|
| 2008/0092173 | A1* | 4/2008 | Shannon et al. | 725/47 |
| 2008/0111822 | A1* | 5/2008 | Horowitz et al. | 345/530 |
| 2008/0155614 | A1* | 6/2008 | Cooper et al. | 725/91 |
| 2008/0189319 | A1* | 8/2008 | Nielen et al. | 707/102 |
| 2008/0295132 | A1* | 11/2008 | Icho et al. | 725/46 |

FOREIGN PATENT DOCUMENTS

| | | |
|---|---|---|
| JP | 2000 112977 | 4/2000 |
| JP | 2001 167565 | 6/2001 |
| JP | 2002 297473 | 10/2002 |
| JP | 2003 23589 | 1/2003 |
| JP | 2003 153119 | 5/2003 |
| JP | 2004 165836 | 6/2004 |
| JP | 2005 33601 | 2/2005 |
| JP | 2005 198260 | 7/2005 |
| JP | 2006 54747 | 2/2006 |
| JP | 2006 191486 | 7/2006 |
| JP | 10 42235 | 2/1998 |
| JP | 2000 112976 | 4/2000 |

\* cited by examiner

*Primary Examiner* — Patrick Riegler

(74) *Attorney, Agent, or Firm* — Frommer Lawrence & Haug LLP; William S. Frommer

(57) ABSTRACT

An information processing apparatus includes: a content-list creating unit for selecting, on the basis of a predetermined subject, contents out of recorded program contents, information contents concerning receivable program contents, contents acquired from an outside, and contents stored in the information processing apparatus in advance to thereby create a content list; a content-list selecting unit for selecting out of plural content lists created by the content-list creating unit, on the basis of at least one of contents of the content lists and a situation during user operation, plural content lists to be displayed; and a display control unit for causing a predetermined display unit to display the plural content lists selected by the content-list selecting unit.

25 Claims, 40 Drawing Sheets

PATTERN B

PATTERN D

PATTERN A

PATTERN C

FIG. 7

Tb1 LIST ATTRIBUTE INFORMATION TABLE

|  | DISPLAY PRIORITY PARAMETER | DISPLAY AREA SIZE |
|---|---|---|
| CONTENT LIST A | 10 | L |
| CONTENT LIST B | 8 | L |
| CONTENT LIST C | 8 | L |
| CONTENT LIST D | 7 | M |
| CONTENT LIST E | 6 | M |
| CONTENT LIST F | 6 | S |
| CONTENT LIST G | 5 | S |
| CONTENT LIST H | 9 | L |
| CONTENT LIST I | 7 | L |
| CONTENT LIST J | 6 | M |
| CONTENT LIST K | 6 | S |
| CONTENT LIST L | 4 | S |

FIG. 8

| FLUCTUATION FACTOR | PARAMETER ADJUSTMENT AMOUNT |
|---|---|
| 1. CONTENT LIST INCLUDING CONTENTS WITH HIGH PREFERENCE | +1 |
| 2. CONTENT LIST INCLUDING CONTENTS INCREASED FROM THOSE AT LAST OPERATION TIME | +1 |
| 3. CONTENT LIST INCLUDING CONTENTS EQUAL TO OR LARGER THAN PREDETERMINED NUMBER | +1 |
| 4. CONTENT LIST INCLUDING CONTENTS SAME AS THOSE AT LAST OPERATION TIME | -2 |
| 5. CONTENT LIST DISPLAYED AT LAST OPERATION TIME | -2 |

FIG. 9

Tb1 LIST ATTRIBUTE INFORMATION TABLE

|  | DISPLAY PRIORITY PARAMETER | DISPLAY AREA SIZE |
|---|---|---|
| CONTENT LIST A | 12 | L |
| CONTENT LIST B | 7 | L |
| CONTENT LIST C | 8 | L |
| CONTENT LIST D | 4 | M |
| CONTENT LIST E | 3 | M |
| CONTENT LIST F | 9 | S |
| CONTENT LIST G | 2 | S |
| CONTENT LIST H | 8 | L |
| CONTENT LIST I | 4 | L |
| CONTENT LIST J | 7 | M |
| CONTENT LIST K | 8 | S |
| CONTENT LIST L | 4 | S |

FIG. 10

Tb1 LIST ATTRIBUTE INFORMATION TABLE

|  | DISPLAY PRIORITY PARAMETER | DISPLAY AREA SIZE |
|---|---|---|
| CONTENT LIST A | 12 | L |
| CONTENT LIST F | 9 | S |
| CONTENT LIST C | 8 | L |
| CONTENT LIST H | 8 | L |
| CONTENT LIST K | 8 | S |
| CONTENT LIST B | 7 | L |
| CONTENT LIST J | 7 | M |
| CONTENT LIST D | 4 | M |
| CONTENT LIST I | 4 | L |
| CONTENT LIST L | 4 | S |
| CONTENT LIST E | 3 | M |
| CONTENT LIST G | 2 | S |

| PERIOD | EVENT KEYWORD |
|---|---|
| FEBRUARY IN YEAR OF $4n+2$ | WINTER OLYMPICS |
| AUGUST IN YEAR OF $4n$ | SUMMER OLYMPICS |
| JUNE IN YEAR OF $4n+2$ | SOCCER WORLD CUP |

| PERIOD | EVENT KEYWORD |
|---|---|
| JANUARY | NEW YEAR, EKIDEN |
| FEBRUARY | BEAN SCATTERING CEREMONY, SOCCER |
| MARCH | GIRLS' FESTIVAL |
| APRIL | ENTRANCE CEREMONY, CHERRY BLOSSOM |
| MAY | — |
| JUNE | RAINY SEASON |
| JULY | — |
| AUGUST | HIGH-SCHOOL BASEBALL TOURNAMENT, SUMMER VACATION |
| SEPTEMBER | — |
| OCTOBER | SPORTS DAY |
| NOVEMBER | — |
| DECEMBER | CHRISTMAS, END OF YEAR |

| PERIOD | EVENT KEYWORD |
|---|---|
| MAY 5 | CHILDREN'S DAY |
| JULY 7 | STAR FESTIVAL |
| DECEMBER 24 | CHRISTMAS EVE |
| DECEMBER 31 | SEEING OLD YEAR OUT, NEW YEAR'S EVE, LIVE |

| ID | RECORDING TIME | NUMBER OF TIMES OF REPRODUCTION | REPRODUCTION TIME | VIEW COUNTER | LAST REPRODUCTION DATE AND TIME | BOOKMARK POSITION | RECORD SETTING | PREFERENCE |
|---|---|---|---|---|---|---|---|---|
| 0 | 2006.1.14 13:00:00 | 1 | 1:00:00 | 0:20:15 | 2006.1.15 0:05:15 | 0:00:50 | SINGLE | 100 |
| 1 | 2006.1.13 14:30:00 | 0 | 0:30:00 | — | — | — | WEDNESDAY EVERY WEEK | 151 |
| 2 | 2006.3.17 10:00:00 | 1 | 0:45:00 | 0:13:20 | 2006.3.20 8:12:23 | 0:10:00 | EVERYDAY | 981 |
| 3 | 2005.12.10 8:15:00 | 0 | 1:30:00 | — | — | — | SINGLE | 23 |
| 4 | 2006.5.30 20:00:00 | 3 | 2:00:00 | 1:10:00 | 2006.6.10 23:08:00 | 0:41:15 | SINGLE | 340 |
| 5 | 2005.12.3 10:00:00 | 2 | 1:00:00 | 10:00:05 | 2005.12.8 9:42:45 | — | MONDAY TO FRIDAY EVERY WEEK | 227 |
| ... | ... | ... | ... | ... | ... | ... | ... | ... |

| CONTENT ID | PHOTOGRAPHING DATE AND TIME | DISPLAY COUNTER | ALBUM CREATION FLAG |
|---|---|---|---|
| 0 | APRIL 10, 2004 22:08 | 0 | 1 |
| 1 | JUNE 10, 2003 23:08 | 2 | 0 |
| 2 | DECEMBER 8, 2006 9:42 | 1 | 0 |
| 3 | JANUARY 1, 2005 0:01 | 0 | 0 |
| 4 | JANUARY 2, 2005 12:10 | 0 | 0 |
| 5 | AUGUST 20, 2005 19:38 | 1 | 1 |
| ... | ... | ... | ... |

Pi1

SOME PHOTOGRAPHS PHOTOGRAPHED ONE YEAR OR MORE BEFORE HAVE NOT BEEN SUBJECTED TO ALBUM CREATION.
YOU ARE RECOMMENDED TO CREATE ALBUM.

SERIES OF RECORDED PROGRAM "54 YEARS OLD MOTHER" SEEM TO HAVE ENDED.
YOU ARE RECOMMENDED TO DUB PROGRAM IN DVD.

| WORD | GENRE | CONTENT ID | TEXT CONTENTS | USE COUNTER |
|---|---|---|---|---|
| BASEBALL, IJIRO, BAT, SWIMMING, VOLLEYBALL, TENNIS, GOLF, NATIONAL ATHLETIC MEET, OLYMPICS, SOCCER, HOMERUN, PING PONG, WRESTLING, PROFESSIONAL WRESTLING | SPORTS | 0 | TEXT CONTENTS 0 | 2 |
| | | 1 | TEXT CONTENTS 1 | 2 |
| | | 2 | TEXT CONTENTS 2 | 1 |
| | | 3 | TEXT CONTENTS 3 | 1 |
| | | 4 | TEXT CONTENTS 4 | 1 |
| PIANO, GUITAR, ROCK, CLASSICAL MUSIC, KAREYON, BEETHOVEN, RHYTHM, ENKA, MUSIC, LATIN, BOSSA NOVA, JAZZ | MUSIC | 5 | TEXT CONTENTS 5 | 0 |
| | | 6 | TEXT CONTENTS 6 | 0 |
| | | 7 | TEXT CONTENTS 7 | 0 |
| | | 8 | TEXT CONTENTS 8 | 0 |
| | | 9 | TEXT CONTENTS 9 | 0 |
| | | 10 | TEXT CONTENTS 10 | 0 |
| | | 11 | TEXT CONTENTS 11 | 0 |
| ...... | ...... | ...... | ...... | ...... |

| REGION | CONTENT ID | TEXT CONTENT | USE COUNTER |
|---|---|---|---|
| HOKKAIDO | 0<br>1<br>2<br>3 | TEXT CONTENT 0<br>TEXT CONTENT 1<br>TEXT CONTENT 2<br>TEXT CONTENT 3 | 2<br>2<br>1<br>1 |
| AOMORI | 4<br>5 | TEXT CONTENT 4<br>TEXT CONTENT 5 | 0<br>0 |
| AKITA | 6 | TEXT CONTENT 6 | 0 |
| NIIGATA | 7 | TEXT CONTENT 7 | 0 |
| IWATE | 8 | TEXT CONTENT 8 | 0 |
| YAMAGATA | 9 | TEXT CONTENT 9 | 0 |
| FUKUSHIMA | 10 | TEXT CONTENT 10 | 0 |
| . . . . . . . | . . . . . . . | . . . . . . . | . . . . . . . |
| OKINAWA | 238 | INFORMATION 238 | 0 |

FIG. 27

| N | N+1 | N+2 | N+3 | N+4 | N+5 | N+6 | N+7 |

EPG INFORMATION DELIVERED
ON THE DATE (N DAY)

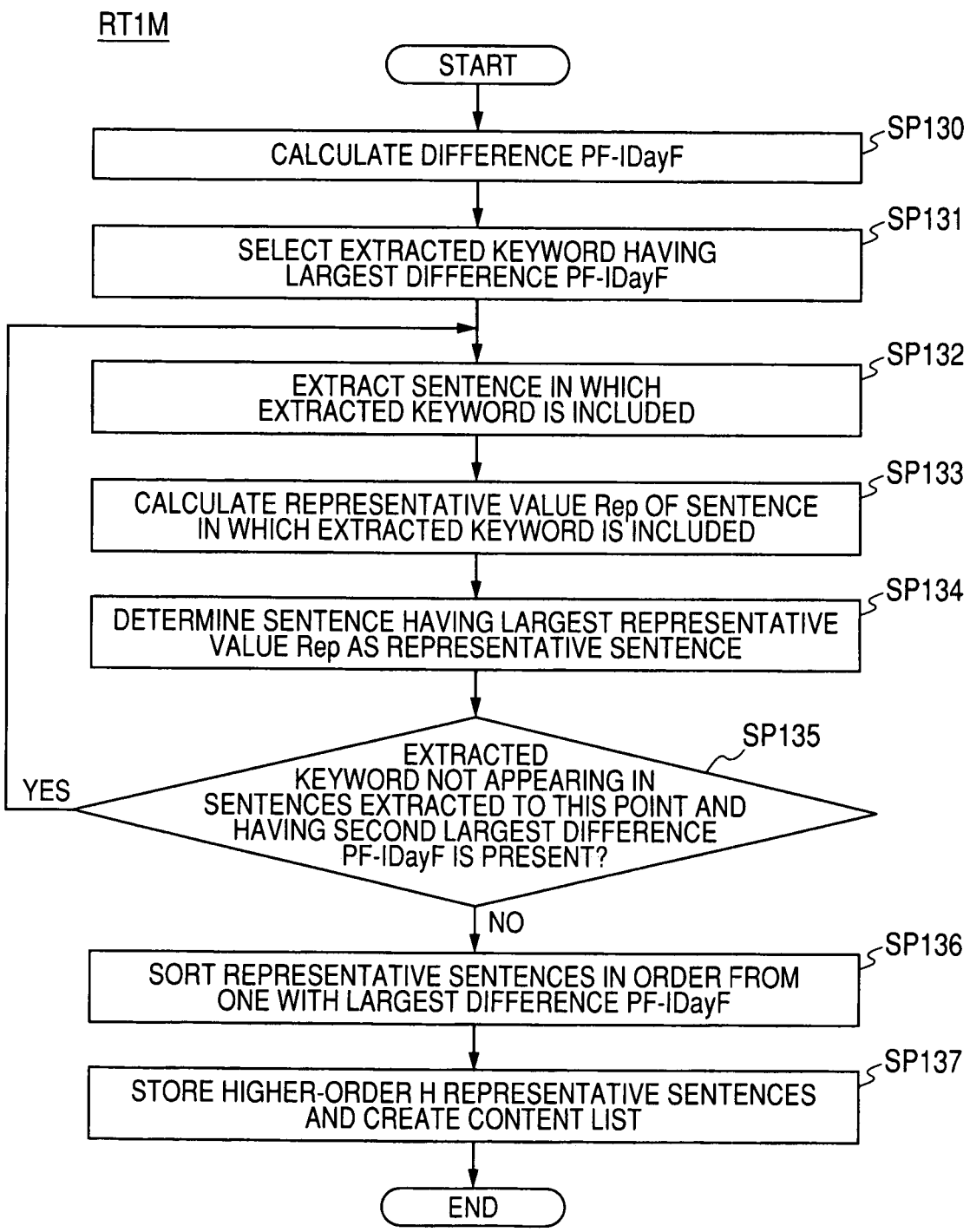

FIG. 33

- EXTRACTED SENTENCES (8 IN TOTAL)
  1. LIFE NOAH INVESTIGATION SITUATION
  2. SUSPECT HORIMO OF LIFE NOAH RESIGNED PRESIDENT
  3. SUDDEN ARREST OF SUSPECT HORIMO, LIFE NOAH PRESIDENT, GIVES LARGE SHOCK TO POLITICAL WORLD
  4. SERIES: SHOCK OF LIFE NOAH/TRACK OF RECKLESS BEHAVIORS
  5. HOW WILL FUTURE OF LIFE NOAH BE AS A RESULT OF RESIGNATION OF PRESIDENT HORIMO?
  6. FUTURE OF MANAGEMENT OF LIFE NOAH, HOW THAT WILL BE?
  7. DETAILS OF LIFE NOAH CASE
  8. LIFE NOAH SHOCK! WHAT HERO OF THE DAY HORIMO WAS?

- EXTRACTED KEYWORDS AND PF/N THEREOF
  1. (LIFE NOAH), INVESTIGATION (1/8), SITUATION (1/8)
  2. (LIFE NOAH), HORIMO (4/8), SUSPICION (2/8), PRESIDENT (3/8), RESIGNED (1/8)
  3. (LIFE NOAH), PRESIDENT (3/8), HORIMO (4/8), SUSPICION (2/8), SUDDEN (1/8), ARREST (1/8), POLITICAL WORLD (1/8), LARGE (1/8), SHOCK (1/8)
  4. SERIES (1/8), (LIFE NOAH), SHOCK (1/8), RECKLESS BEHAVIOR (1/8), TRACK (1/8)
  5. HORIMO (4/8), PRESIDENT (3/8), RESIGNATION (1/8), (LIFE NOAH), FUTURE (1/8)
  6. (LIFE NOAH)
  7. (LIFE NOAH), CASE (1/8), DETAILS (1/8)
  8. (LIFE NOAH), SHOCK (1/8), AGE (1/8), HERO OF THE DAY (1/8), HORIMO (4/8)

- REPRESENTATIVE VALUE (Rep)
  1. 0.125
  2. 0.3125 ⟵ SELECT 2 AS REPRESENTATIVE SENTENCE
  3. 0.2083
  4. 0.125
  5. 0.28125
  6. 0
  7. 0.125
  8. 0.28175

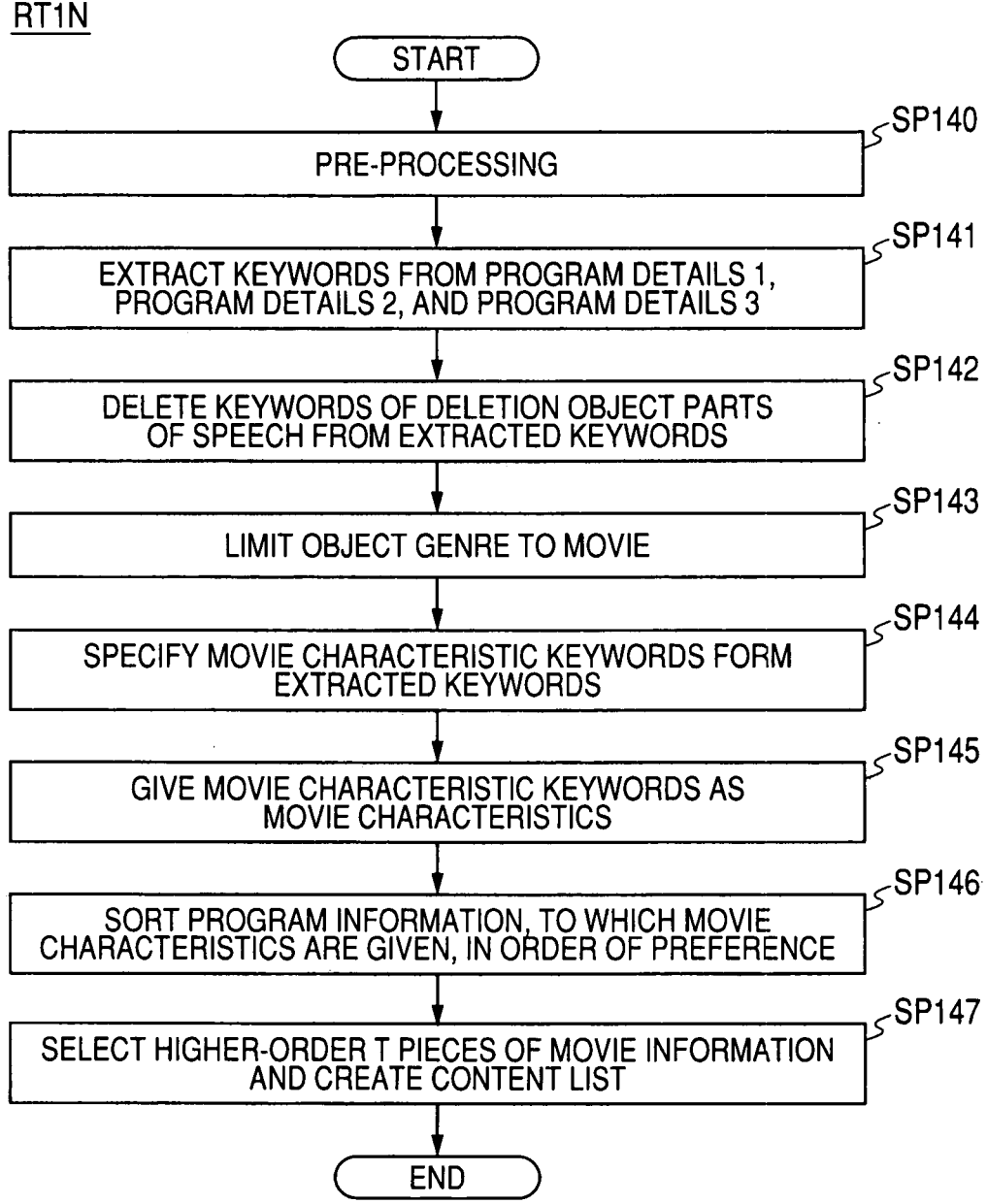

| CHARACTERISTIC | CLASSIFICATION | | MOVIE CHARACTERISTIC KEYWORD |
|---|---|---|---|
| MOVIE GENRE | SINGLE GENRE KEYWORD | | ACTION, HORROR, FANTASY, SUSPENSE, ROMANCE, ANIMATION, ... |
| | COMPOSITE GENRE KEYWORD | | ACTION HORROR, FANTASY ADVENTURE, CAR ACTION, CG ANIMATION, ... |
| | | | ADOLESCENCE ROMANCE, JAPANESE ANIMATION, MIDDLE AGE LOVE STORY, ... |
| | | | 60'S ACTION, 90'S HORROR, 70'S ANIMATION, ... |
| | OTHER GENRE KEYWORDS | | HONG KONG MOVIE, LOVE STORY, HISTORICAL, WESTERN, JAPAN AND CHINA JOINT PRODUCTION, ... |
| MOVIE CONTENT | CONTENT KEYWORD | | ANIMATED, ACTION MASTERPIECE, DOCUMENTARY, EUROPEAN, SOCIAL, REMAKE, EMOTIONAL LONG FILM, ... |
| HIGHLIGHT | HIGHLIGHT KEYWORD | | CAR CHASE, FULL CG, CO-STAR, ... |

INFORMATION PROCESSING APPARATUS, INFORMATION PROCESSING METHOD, AND INFORMATION PROCESSING PROGRAM FOR GENERATING CONTENT LISTS

CROSS-REFERENCES TO RELATED APPLICATIONS

The present invention contains subject matter related to Japanese Patent Application JP 2007-011898 filed in the Japanese Patent Office on Jan. 22, 2007, the entire contents of which being incorporated herein by reference.

BACKGROUND OF THE INVENTION

1. Field of the Invention

The present invention relates to an information processing apparatus, an information processing method, and an information processing program and is suitably applied to, for example, a digital recording apparatus that treats various contents.

2. Description of the Related Art

In the past, as a digital recording apparatus such as a hard disk recorder having a function of recording program contents, there is a digital recording apparatus having a function of selecting program contents out of recorded program contents on the basis of predetermined conditions and presenting a user with the selected program contents as recommended program contents to thereby recommend one or plural program contents among the recorded program contents to the user from an apparatus side.

The digital recording apparatus having such a function selects recommended program contents on the basis of program information obtained from EPG (Electronic Program Guide) information and a setting by the user such that, for example, program contents of a genre selected by the user or program contents including keywords selected by the user in titles thereof are presented as recommended program contents.

There is also a digital recording apparatus that analyzes a taste of a user on the basis of an operation history and the like to thereby automatically record and display recommended program contents as a list without depending on a setting by the user and the like. Further, there is a digital recording apparatus that selects recommended program contents on the basis of a result of matching of a taste vector representing a taste of a user and a program vector representing a characteristic of program contents obtained from EPG information and displays the selected recommended program contents together with a reason for the recommendation.

Moreover, as the digital recording apparatus having such a function, there is proposed a digital recording apparatus that displays selected plural recommended program contents of special feature program contents as a list, determines display priorities of the special feature program contents according to a taste of a user and the like, and changes, according to the display priorities, a display character form used in displaying the special feature program contents as a list to thereby effectively cause the user to recognize the special feature program contents (i.e., the selected recommended program contents) (see, for example, JP-A-2006-191486).

SUMMARY OF THE INVENTION

In recent years, according to the improvement of functions of digital recording apparatuses, there are many digital recording apparatuses that can treat not only program contents but also various contents such as moving image contents and still image contents captured from external apparatuses.

However, with the technique in the past, although program contents selected on the basis of various conditions can be presented as recommended program contents as described above, effective methods of selecting and presenting contents other than the program contents are not provided. Therefore, the digital recording apparatuses that treat various contents including the program contents can only provide, as the contents other than the program contents, for example, contents selected by a user. This spoils convenience for the user.

Therefore, it is desirable to provide an information processing apparatus, an information processing method, and an information processing program that can improve convenience in treating various contents.

According to an embodiment of the present invention, plural content lists are created by selecting, on the basis of predetermined subjects, contents out of recorded program contents, information contents concerning receivable program contents, contents acquired from the outside, and contents stored in an information recording apparatus, plural content lists to be displayed are selected out of the created plural content lists on the basis of contents of the content lists or a situation during user operation, and the selected plural content-lists are displayed on a predetermined display unit.

Consequently, it is possible to present a user with plural useful content lists selected out of the plural content lists, which are formed by the contents on the basis of the predetermined subjects out of not only program contents but also all contents treated by the information processing apparatus, on the basis of the contents of the content lists or the situation during user operation.

According to an embodiment of the present invention, plural content lists are created by selecting, on the basis of predetermined subjects, contents out of recorded program contents, information contents concerning receivable program contents, contents acquired from the outside, and contents stored in an information recording apparatus, plural content lists to be displayed are selected out of the created plural content lists on the basis of contents of the content lists or a situation during user operation, and the selected plural content lists are displayed on a predetermined display unit. Therefore, it is possible to present a user with plural useful content lists selected out of the plural content lists, which are formed by the contents on the basis of the predetermined subject out of not only program contents but also all contents treated by the information processing apparatus, on the basis of the contents of the content lists or the situation during user operation. Consequently, it is possible to realize an information processing apparatus, an information processing method, and an information processing program that can improve convenience in treating various contents.

BRIEF DESCRIPTION OF THE DRAWINGS

FIG. 7 is a schematic diagram showing the structure (at initial setting time) of a list attribute information table;

FIG. 8 is a schematic diagram showing a specific example of fluctuation factors;

FIG. 9 is a schematic diagram showing the structure (after parameter adjustment) of the list attribute information table;

FIG. 10 is a schematic diagram showing the structure (after sorting in order from a content list with a highest priority) of the list attribute information table;

FIGS. 12A to 12C are schematic diagrams showing the structure of an event table;

FIG. 14 is a schematic diagram showing the structure of a recorded content attribute information table;

FIG. 19 is a schematic diagram showing the structure of a still image content attribute information table;

FIG. 23 is a schematic diagram showing a message image created on the basis of the subject "recommend dubbing";

FIG. 25 is a schematic diagram showing the structure of a word table;

FIG. 26 is a schematic diagram showing the structure of a region table;

FIG. 27 is a schematic diagram showing the structure (1) of EPG information;

FIG. 32 is a flowchart showing a content list creation processing procedure based on a subject "news of topics";

FIG. 33 is a schematic diagram for explanation of an example of calculation of a representative value Rep;

FIG. 34 is a flowchart showing a content list creation processing procedure based on a subject "today's movie";

FIG. 35 is a schematic diagram showing the structure of a movie characteristic keyword table;

DESCRIPTION OF THE PREFERRED EMBODIMENTS

Embodiments of the present invention will be hereinafter explained with reference to the accompanying drawings.

Figure 1:
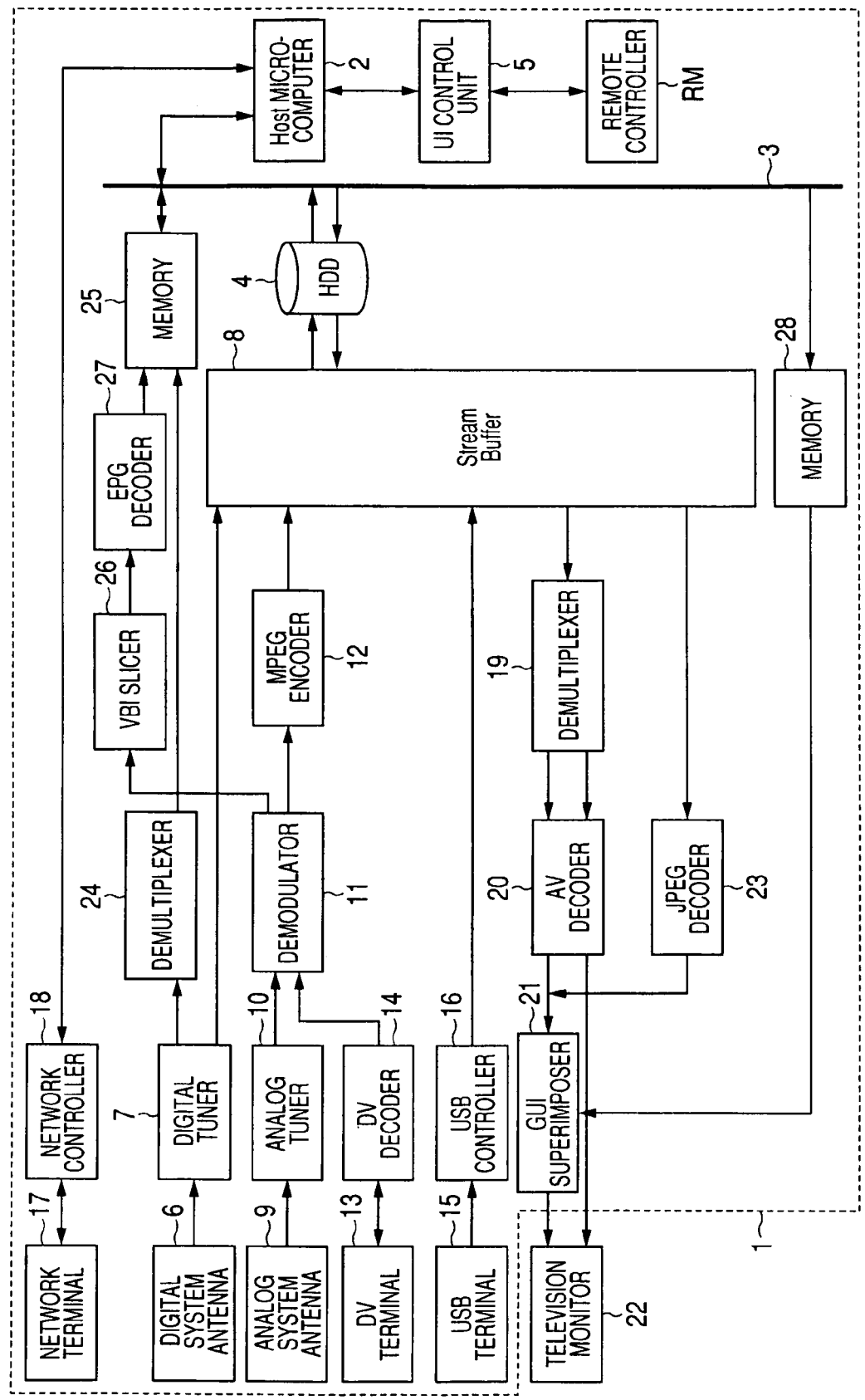
FIG. 1 is a block diagram showing a hardware configuration of a digital recording apparatus.

(1) First Embodiment (1-1) Hardware Configuration of a Digital Recording Apparatus In FIG. 1, reference numeral 1 denotes a hardware configuration of a digital recording apparatus according to a first embodiment of the present invention. The digital recording apparatus 1 has a function of recording and reproducing program contents of a digital broadcast and an analog broadcast, a function of acquiring EPG information, a function of recording and reproducing contents inputted from an external apparatus, and a function of reproducing contents stored in the digital recording apparatus 1 in advance. A host microcomputer 2 executes various kinds of processing in accordance with programs stored in a not-shown built-in memory or an HDD (Hard Disk Drive) 4 connected through a bus 3. The host microcomputer 2 receives an operation signal (i.e., an instruction from a user), which is inputted from a remote controller RM via a UI (User Interface) control unit 5, as a command and controls operations of respective units of the digital recording apparatus 1 according to the command.

Practically, the digital recording apparatus 1 receives, under the control by the host microcomputer 2, a digital broadcast signal inputted from a digital antenna 6 with a digital tuner 7 according to, for example, an instruction inputted by the user using the remote controller RM. Then, the digital recording apparatus 1 records the digital broadcast signal in the HDD 4 as video and sound data of program contents through a stream buffer 8 to thereby record program contents of the digital broadcast.

The digital recording apparatus 1 receives, under the control by the host microcomputer 2, an analog broadcast signal inputted from an analog antenna 9 with an analog tuner 10 according to, for example, an instruction inputted by the user using the remote controller RM. The digital recording apparatus 1 NTSC (National Television Standards Committee)-decodes the analog broadcast signal with a demodulator 11 to thereby convert the analog broadcast signal into an NTSC signal and MPEG-encodes the NTSC signal with an MPEG (Moving Picture Experts Group) encoder 12 to thereby convert the NTSC signal into video and sound data. Then, the digital recording apparatus 1 records the video and sound data in the HDD 4 as video and sound data of the program contents through the stream buffer 8 to thereby record program contents of the analog broadcast.

The digital recording apparatus 1 decodes, under the control by the host microcomputer 2, a moving image signal inputted from a not-shown DV apparatus (e.g., a DV system video camera), which is connected to a DV (Digital Video) terminal 13, through a DV terminal 13 with a DV decoder 14 according to, for example, an instruction inputted by the user using the remote controller RM. The digital recording apparatus 1 NTSC-encodes the moving image signal with the demodulator 11 and MPEG-encodes the moving image signal with the MPEG encoder 12 to thereby convert the moving image signal into video and sound data. Then, the digital recording apparatus 1 records the video and sound data in the HDD 4 through the stream buffer 8 to thereby record moving image contents inputted from the external apparatus (the DV apparatus).

The digital recording apparatus 1 records, under the control by the host microcomputer 2, a still image signal inputted from a not-shown USB apparatus (e.g., a digital still camera), which is connected to a USB (Universal Serial Bus) terminal 15, through the USB terminal in the HDD 4 as still image data sequentially through a USB controller 16 and the stream buffer 8 according to, for example, an instruction inputted by the user using the remote controller RM to thereby record still image contents inputted from the external apparatus (the USB apparatus).

The digital recording apparatus 1 receives, under the control by the host microcomputer 2, various contents transmitted from a not-shown network apparatus (e.g., a content server), which is network-connected to a network terminal 17, with the network terminal 17 according to, for example, an instruction inputted by the user using the remote controller RM. The digital recording apparatus 1 records the contents in the HDD 4 as various data sequentially through a network controller 18, the host microcomputer 2, and the bus 3.

The digital recording apparatus 1 separates, under the control by the host microcomputer 2, video and sound data read out from the HDD 4 into video data and sound data with a demultiplexer 19 through the stream buffer 8 according to, for example, an instruction inputted by the user using the remote controller RM. The digital recording apparatus 1 decodes the video data and the sound data with an AV decoder 20 to thereby convert the video data and the sound data into a video signal and a sound signal. Then, the digital recording apparatus 1 superimposes a graphics signal such as OSD (On Screen Display) on the video signal with a GUI (Graphical User Interface) superimposer 21 and outputs the video signal and the sound signal to a television monitor 22 externally connected by an AV cable or the like to thereby reproduce recorded program contents, moving image contents captured from the outside, moving image contents recorded in the HDD 4 in advance, and the like.

The digital recording apparatus 1 JPEG (Joint Photographic Experts Group)-decodes, under the control by the host microcomputer 2, still image data read out from the HDD 4 with a JPEG decoder 23 through the stream buffer 8 according to, for example, an instruction inputted by the user using the remote controller RM to thereby convert the still image data into a still image signal. Then, the digital recording apparatus 1 superimposes a graphics signal such as OSD on the still image signal with the GUI superimposer 21 and outputs the still image signal to the externally-connected television monitor 22 to thereby reproduce still image contents captured from the outside, still image contents recorded in the HDD 4 in advance, and the like.

In the digital recording apparatus 1, the host microcomputer 2 reads out, for example, information concerning EXIF (Exchangeable Image File Format) from still image data recorded in the HDD 4 through the bus 3 to thereby refer to photographing information of still image contents included in the information concerning EXIF.

The digital recording apparatus 1 receives, under the control by the host microcomputer 2, a digital broadcast signal inputted from the digital antenna 6 with the digital tuner 7. Then, the digital recording apparatus 1 extracts EPG information superimposed on the digital broadcast signal with a demultiplexer 24 to thereby acquire the EPG information of the digital broadcast and records the EPG information in a memory 25.

The digital recording apparatus 1 receives, under the control by the host microcomputer 2, an analog broadcast signal inputted from the analog antenna 9 with the analog tuner 10. The digital recording apparatus 1 NTSC-decodes the analog broadcast signal with the demodulator 11 to thereby convert the analog broadcast signal into an NTSC signal. Then, the digital recording apparatus 1 slices EPG information from a specific line of the NTSC signal with a VBI (Vertical Blanking Interval) slicer 26, decodes the EPG information with an EPG decoder 27 to thereby acquire the EPG information of the analog broadcast, and records the EPG information in the memory 25.

In the digital recording apparatus 1, the host microcomputer 2 reads out the EPG information, which is recorded in the memory 25 in this way, through the bus 3 to thereby refer to the EPG information of the digital broadcast and the analog broadcast.

The EPG information includes, for example, as program information of respective program contents scheduled to be broadcasted, broadcasting station names, broadcast date and times, program titles, genres, program outlines, program details, and performers. The host microcomputer 2 of the digital recording apparatus 1 records program contents using the EPG information. The host microcomputer 2 acquires, concerning program contents to be recorded, program information of the program contents from the EPG information and adds the program information to the program contents. Consequently, the program information can be referred to from the recorded program contents.

In the digital recording apparatus 1, the host microcomputer 2 writes GUI screen data and a GUI control command, which are generated on the basis of the EPG information recorded in the memory 25, the various contents recorded in the HDD 4, data for a GUI screen, and the like, in the memory 28 through the bus 3 according to, for example, an instruction inputted by the user using the remote controller RM. The host microcomputer 2 generates a GUI screen signal with the GUI superimposer 21 on the basis of the GUI screen data and the GUI control command and outputs the GUI screen signal to the externally-connected television monitor 22 to thereby cause the television monitor 22 to display a GUI screen (not shown).

In addition to the basic functions explained above, the digital recording apparatus 1 has a function of selecting contents under conditions defined for respective plural subjects (e.g., "newly arrived recommended title", "new program of interest", "recent photograph", and the like) out of contents treated by the digital recording apparatus 1 to thereby create content lists corresponding to the respective subjects and selecting plural content lists on the basis of contents (i.e., what kinds of contents are included) and the like of the content lists out of the created plural content lists, and displaying the content lists as a table (hereinafter referred to as content list table display function). The content list table display function is explained below starting from an overview thereof.

The contents treated by the digital recording apparatus 1 are the recorded program contents (also referred to as recorded contents), the contents captured from an external apparatus, and the contents stored in the digital recording apparatus 1 in advance described above. The EPG information is also contents treated by the digital recording apparatus 1 as information contents concerning program contents scheduled to be broadcasted. A content list in this case is formed by one or more contents.

(1-2) Overview of the Content List Table Display Function

First, an overview of the content list table display function is explained. The host microcomputer 2 of the digital recording apparatus 1 recognizes, on the basis of an operation signal inputted from the UI control unit 5, that a not-shown power button of the remote controller RM is pressed in a power off state or an icon corresponding to the content list table display function is selected from a menu on a not-shown GUI screen. The host microcomputer 2 starts up the content list table display function and causes the television monitor 22 to display a content list table screen 30 shown in FIG. 2 as a GUI screen.

In the content list table screen 30, plural display areas 31 (31A to 31F) of various sizes are arranged. In each of the plural display areas 31 (31A to 31F), a content list (in this embodiment, a part of the content list) selected out of content lists created by the host microcomputer 2 on the basis of respective plural subjects is displayed. The content list table screen 30 is displayed on the basis of a layout pattern selected by the host microcomputer 2 out of plural layout patterns prepared in advance (patterns of the number and arrangement of the display areas 31) prepared in advance.

Figure 2:
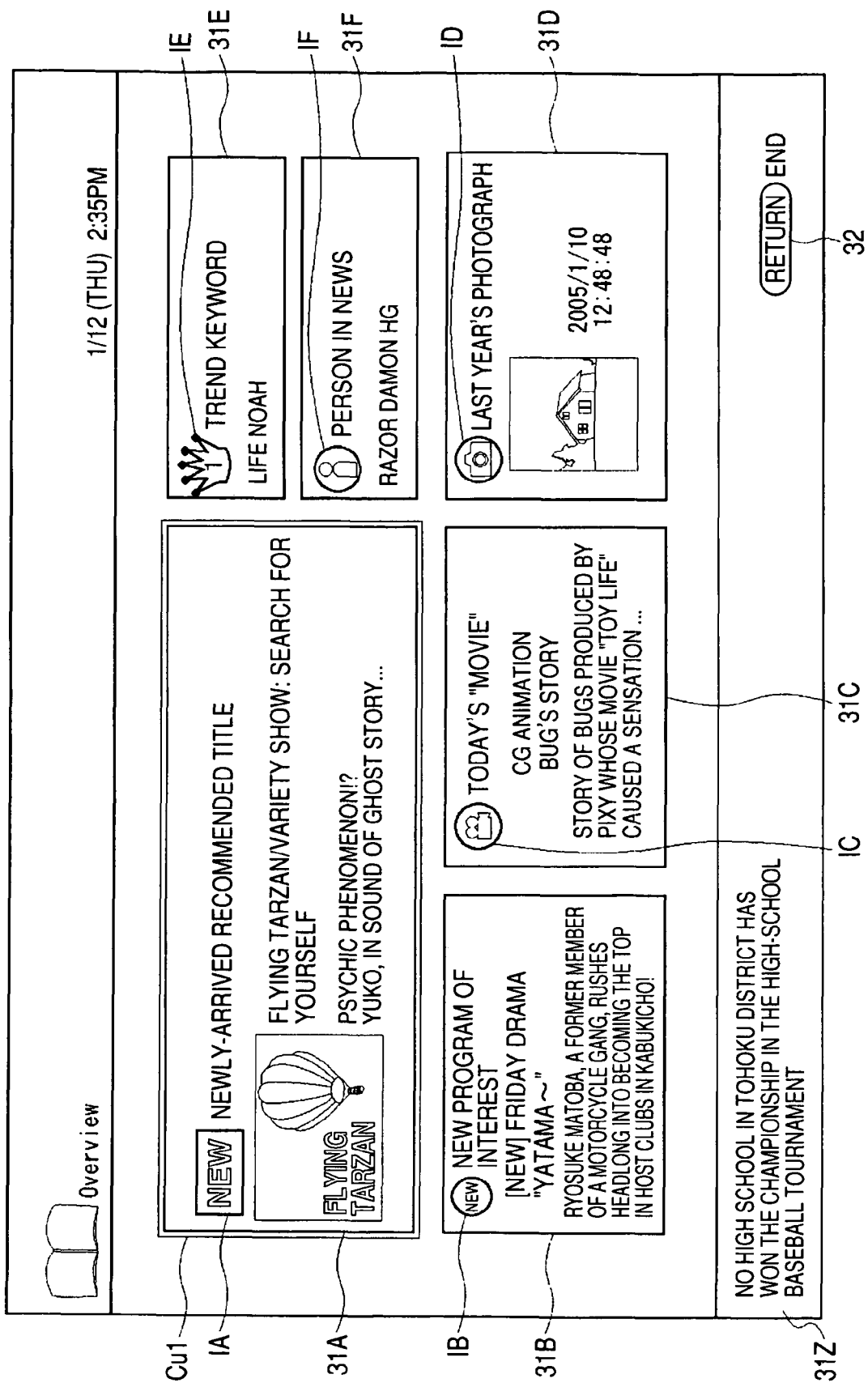
FIG. 2 is a schematic diagram showing the structure of a content list screen.

Practically, the content list table screen 30 shown in FIG. 2 is an example of a content list table screen displayed in a layout pattern in which the display area 31A formed by an L-size horizontally long rectangle is arranged at the upper left, the display areas 31E and 31F formed by S-size (about ½ of the L size both vertically and horizontally) horizontally long rectangles are arranged vertically side by side on the right side of the display area 31A, and the display areas 31B, 31C, and 31D formed by M-size (½ of the L size horizontally) horizontally long rectangles are arranged horizontally side by side below the L-size display area 31A and the S-size display areas 31E and 31F.

In the content list table screen 30, besides the plural display areas 31 (31A to 31F) arranged in a predetermined layout pattern, a present date and time is displayed at an upper end right corner of the screen. A belt-like display area 31z extending in a left to right direction in the screen is fixedly arranged. In the display area (hereinafter also referred to as fixed display area) 31z, a part of the content lists created by the host microcomputer 2 on the basis of the subjects are displayed.

In this embodiment, in the L-size display area 31A, a subject "newly arrived recommended title" and an icon IA corresponding to the subject "newly arrived recommended title" are displayed. In addition, as a part of a list (a content list) of recorded contents selected by the host microcomputer 2 out of recorded contents on the basis of the subject "newly arrived recommended title", one recorded content included in the content list is displayed. Specifically, information indicating contents of the recorded content (e.g., information including a thumbnail image, a program title, and a program outline; hereinafter referred to as content information) is displayed.

In the M-size display area 31B, a subject "new program of interest" and an icon IB corresponding to the subject "new program of interest" are displayed. In addition, as a part of a list (a content list) of program information selected by the host microcomputer 2 from EPG information (i.e., program information of program contents scheduled to be broadcasted) on the basis of the subject "new program of interest", one piece of program information included in the content list is displayed. In the example shown in FIG. 2, a program title and a program outline of the program information are displayed.

In the M-size display area 31C, a subject "today's movie" and an icon IC corresponding to the subject "today's movie" are displayed. In addition, as a part of a list (a content list) of program information selected by the host microcomputer 2 from the EPG information on the basis of the subject "today's movie", one piece of program information included in the content list is displayed. In the example shown in FIG. 2, a movie characteristic, a program title, and a program outline of the program information are displayed.

In the M-size display area 31D, a subject "last year's photograph" and an icon ID corresponding to the subject "last year's photograph" are displayed. In addition, as a part of a list (a content list) of still image contents selected by the host microcomputer 2 out of still image contents recorded in the HDD 4 on the basis of the subject "last year's photograph", one still image content included in the content list is displayed. Specifically, content information (e.g., information including a thumbnail image and a photographing date and time) of the still image content is displayed.

In the S-size display area 31E, a subject "trend keyword" and an icon IE corresponding to the subject "trend keyword" are displayed. In addition, as a part of a list (a content list) of keywords selected by the host microcomputer 2 from program information included in the EPG information on the basis of the subject "trend keyword", one keyword included in the content list is displayed.

In the S-size display area 31F, a subject "person in news" and an icon IF corresponding to the subject "person in news" are displayed. In addition, a list (a content list) of keywords selected by the host microcomputer 2 from the program information included in the EPG information on the basis of the subject "person in news", one keyword included in the content list is displayed.

In the fixed display area 31Z arranged at a lower corner in the screen, as a part of a list (a content list) of text contents selected by the host microcomputer 2 out of text contents (details are described later) recorded in the HDD 4 in advance on the basis of a subject "one word material", one text content included in the content list is displayed. At a right corner of the fixed display area 31z, a return button 32 operable by the remote controller RM for resetting the content list table screen 30 to a previous screen (i.e., for finishing the content list table display function) is also displayed.

By causing the television monitor 22 to display such a content list table screen 30, the digital recording apparatus 1 can present not only program contents but also plural content lists created on the basis of various contents treated by the apparatus on an identical screen. In other words, the digital recording apparatus 1 can present the user, via the content list table screen 30, what kinds of contents are currently present as contents treated by the apparatus (i.e., contents that can be reproduced and recorded).

Each of the plural display areas 31 (31A to 31F) displayed on the content list table screen 30 can be selected by placing a display cursor Cu1 operable by not-shown direction buttons of the remote controller RM on the display area.

Figure 3:
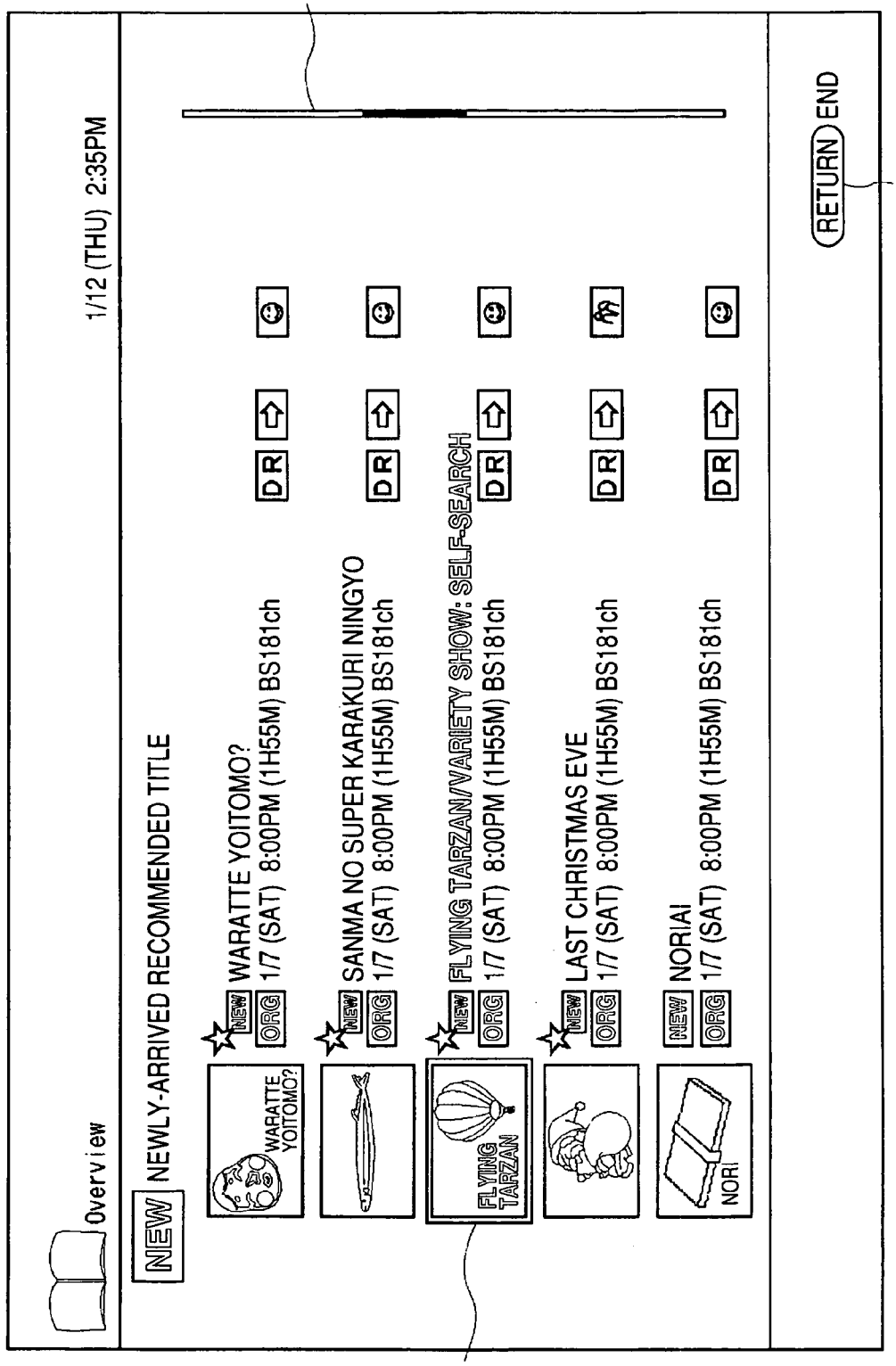
FIG. 3 is a schematic diagram showing the structure of a selected content list table display screen.

The host microcomputer 2 of the digital recording apparatus 1 recognizes that a not-shown determination button of the remote controller RM is depressed in a state in which an arbitrary display area 31 (e.g., the display area 31A) is selected by the display cursor Cu1. The host microcomputer 2 selects a content list, a part of which is displayed in the display area 31A, and causes the television monitor 22 to display, instead of the content list table screen 30, a selected content list display screen 40 capable of displaying all parts of the selected content list as shown in FIG. 3.

The selected content list display screen 40 is substantially entirely a display area for a content list. For example, when the selected content list is a list of recorded contents, the selected content list display screen 40 can display maximum five recorded contents included in the content list. Specifically, pieces of content information (in this case, information including a thumbnail image, a program title, a record starting date and time, a recording time, a broadcast channel, and an icon representing an attribute of recorded contents) of maximum five recorded contents are vertically arranged and displayed. One of these pieces of information is content information of the recorded content displayed in the display area 31A of the content list table screen 30.

Each of the recorded contents displayed on the selected content list display screen 40 can be selected by placing a display cursor Cu2 operable by the not-shown direction buttons (an upward button and a downward button) of the remote controller RM on the recorded content. When the selected content list display screen 40 is displayed, first, the display cursor Cu2 is placed on the recorded content displayed in the display area 31A of the content list table screen 30.

When the number of recorded contents included in the content list exceeds five, i.e., when all parts of the content list may be unable to be displayed at a time, the selected content list display screen 40 can display all the parts of the content list by scrolling the content list in the vertical direction according to the operation of the display cursor Cu2. In this case, a scroll bar SB indicating a displayed part among all the parts of the content list is displayed at a right corner of the screen. When all the parts of the content list may be unable to be displayed at a time in this way, first, the selected content list display screen 40 displays a part including the recorded program content displayed in the display area 31A of the content list table screen 30.

In addition, on the selected content list display screen 40, a present date and time is displayed at an upper end right corner of the screen. A return button 41 operable by the remote controller RM for returning the selected content list display screen 40 to the previous screen (i.e., the content list table screen 30) is also displayed at a lower end right corner of the screen.

By displaying such a selected content list display screen 40 on the television monitor 22, the digital recording apparatus 1 can cause the user to check, on the content list table screen 30, all parts of a content list that the user takes interest in.

The host microcomputer 2 of the digital recording apparatus 1 recognizes that the not-shown determination button of the remote controller RM is depressed in a state in which arbitrary recorded content is selected by the display cursor Cu2 via the selected content list display screen 40. The host microcomputer 2 reproduces the recorded content to thereby output a video and sound based on the recorded content from the television monitor 22.

A content list displayed on the selected content list display screen 40 may be a list of still image contents. In such a case, when the not-shown determination button of the remote controller RM is depressed in a state in which arbitrary still image content is selected by the display cursor Cu2, the host microcomputer 2 reproduces the still image content to thereby output an image based on the still image content from the television monitor 22.

A content list displayed on the selected content list display screen 40 may be a list of program contents scheduled to be broadcasted. In such a case, when the not-shown determination button of the remote controller RM is depressed in a state in which arbitrary program content scheduled to be broadcasted is selected by the display cursor Cu2, the host microcomputer 2 causes the selected content list display screen 40 to display a confirmation message for confirming whether the program content should be record-scheduled. When the not-shown determination button of the remote controller RM is depressed in response to the confirmation message, the host microcomputer 2 performs record scheduling for the program content.

In this way, when arbitrary content is selected and determined from the content list displayed on the selected content list display screen 40, the digital recording apparatus 1 can provide the user with the content that the user takes interest in by performing processing corresponding to the selected and determined content.

The outline of the content list table display function is explained above. According to such a content list table display function, the digital recording apparatus 1 can cause the user to recognize what kinds of contents are currently present as contents treated by the apparatus. The digital recording apparatus 1 can provide the user with contents that the user takes interest in among the contents.

(1-3) Processing for Starting Up the Content List Table Display Function (1-3-1) Overview of Startup Processing Processing from the startup of the content list table display function to the display of the content list table screen 30 (hereinafter referred to as processing for starting up the content list table display function) is explained starting from an overview thereof. This startup processing is processing executed by the host microcomputer 2 of the digital recording apparatus 1 in accordance with a program stored in the not-shown built-in memory or the HDD 4.

Figure 4:
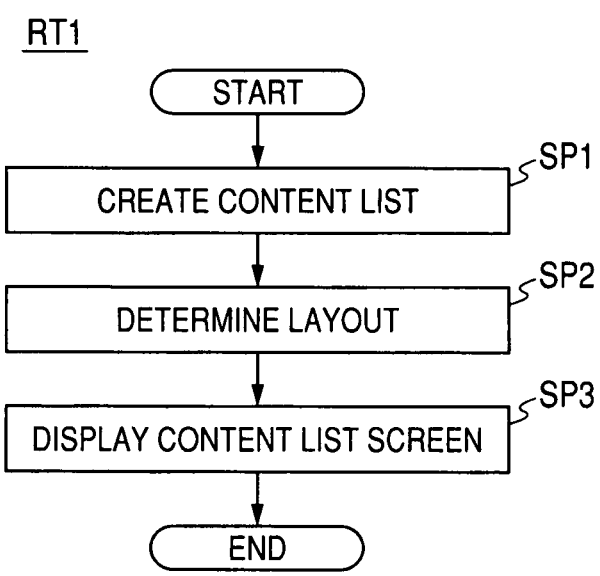
FIG. 4 is a flowchart showing an outline of a startup processing procedure.

As shown in a flowchart shown in FIG. 4, the host microcomputer 2 recognizes that the not-shown power button of the remote controller RM is depressed in a power-off state or an icon corresponding to the content list table display function is selected from the menu on the not-shown GUI screen. The host microcomputer 2 starts a startup processing procedure RT1, i.e., starts the startup of the content list table display function and shifts to step SP1.

In step SP1, the host microcomputer 2 selects contents out of contents treated by the digital recording apparatus 1 under conditions defined for respective plural subjects set in advance to thereby create content lists corresponding to the respective plural subjects and shifts to the next step SP2.

In step SP2, the host microcomputer 2 selects a layout pattern of the content list table screen 30, for example, at random out of plural layout patterns prepared in advance. Then, the host microcomputer 2 selects content lists displayed in the respective plural display areas 31 (including the fixed display area 31Z), which are arranged in the selected layout pattern, out of the plural content lists created in step SP1 on the basis of, for example, contents of the content lists to thereby determine a display layout of the content list table screen 30 and shifts to the next step SP3.

In step SP3, the host microcomputer 2 displays the content list table screen 30, in which the selected contents are displayed in the plural display areas 31 (including the fixed display area 31Z), respectively, on the television monitor 22 in the display layout based on the layout pattern selected in step SP2 and finishes the startup processing procedure RT1.

According to such a startup processing procedure RT1, the digital recording apparatus 1 starts the startup of the content list table display function and displays the content list table screen 30.

(1-3-2) Processing for Determining a Layout Performed in the Startup Processing

Figure 5:
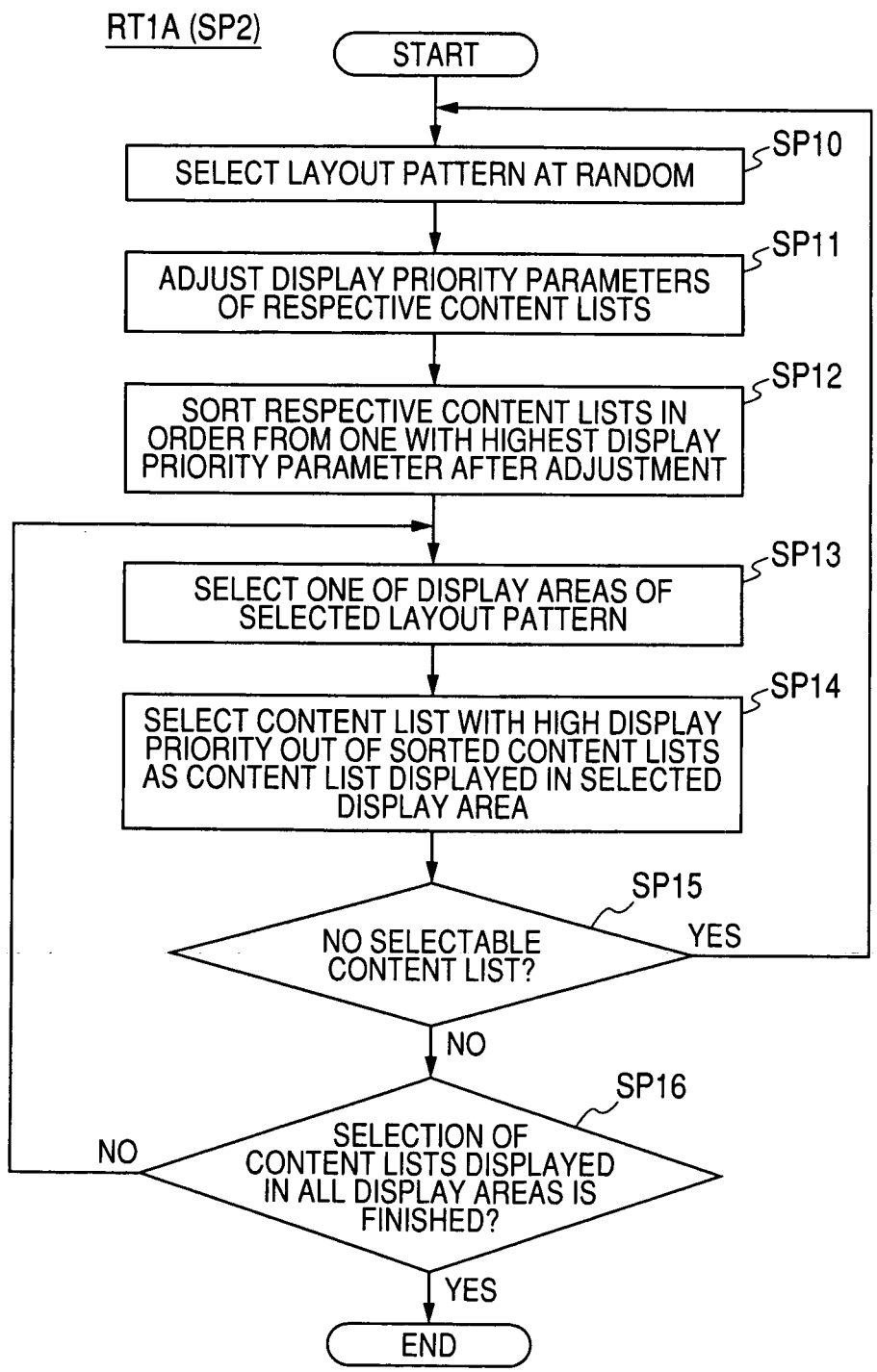
FIG. 5 is a flowchart showing a layout determination processing procedure.

A procedure of the processing for determining a display layout of the content list table screen 30 (hereinafter referred to as display layout determination processing) performed in step SP2 of the startup processing procedure RT1 is specifically explained according to a flowchart shown in FIG. 5.

When the host microcomputer 2 shifts to step SP2 of the startup processing procedure RT2, the host microcomputer 2 starts a display layout determination processing procedure RT1A and shifts to step SP10. In step SP10, the host microcomputer 2 selects one layout pattern at random out of plural layout patterns prepared in advance.

Figure 6B:
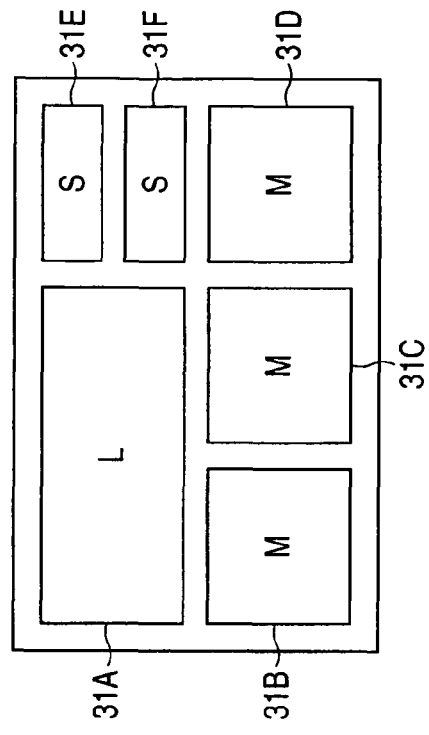
FIGS. 6A to 6D are schematic diagrams showing specific examples of a layout pattern.
Figure 6D:
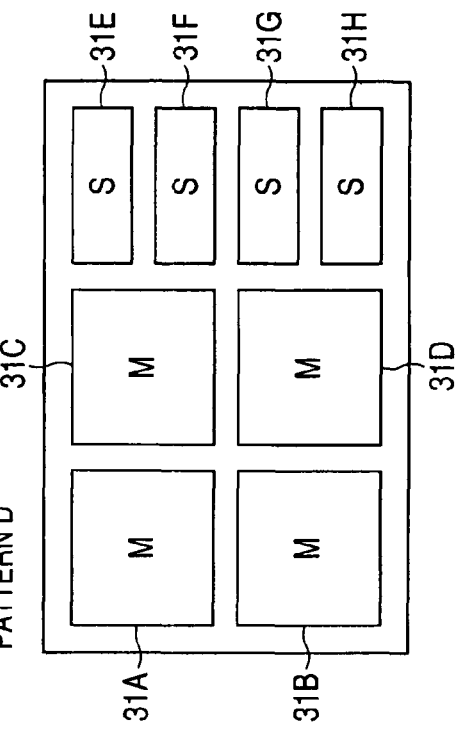
Figure 6A:
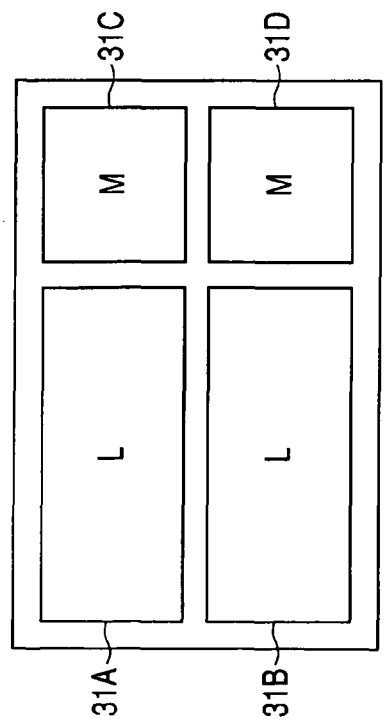

Practically, in the HDD 4 of the digital recording apparatus 1, for example, four layout patterns A to D shown in FIGS. 6A to 6D are recorded in advance. The layout pattern A shown in FIG. 6A is a pattern in which L-size display areas 31A and 31B are vertically arranged on the left side and M-size display areas 31C and 31D are vertically arranged on the right side of the L-size display areas 31A and 31B.

Figure 6C:
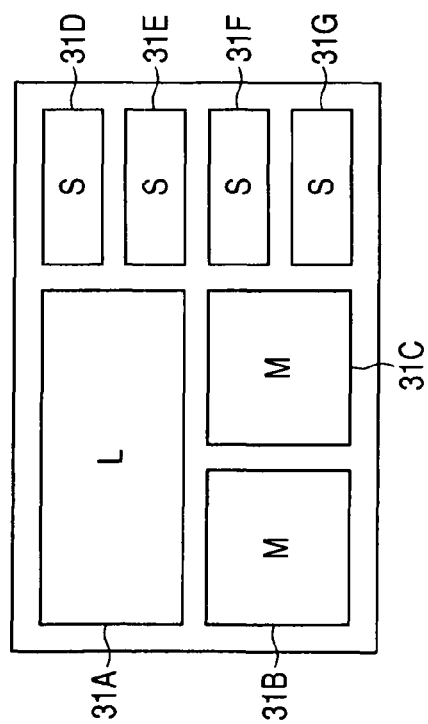

The layout pattern B shown in FIG. 6B is a pattern in which L-size display area 31A is arranged on the upper left, S-size display areas 31E and 31F are arranged vertically side by side on the right side of the L-size display area 31A, and M-size display areas 31B, 31C, and 31D are arranged horizontally side by side below the L-size display area 31A and the S-size display areas 31E and 31F (i.e., the layout pattern shown in FIG. 2). The layout pattern C shown in FIG. 6C is a pattern in which L-size display area 31A is arranged on the upper left, M-size display areas 31B and 31C are arranged horizontally side by side below the L-size display area 31A, and S-size display areas 31D, 31E, 31F, and 31G are arranged vertically side by side on the right side of the L-size display area 31A and the M-size display area 31C. The layout pattern D shown in FIG. 6D is a pattern in which M-size display areas 31A and 31B are arranged vertically side by side at a left corner, M-size display areas 31C and 31D are arranged vertically side by side on the right side of the display areas 31A and 31B (i.e., in the center), and S-size display areas 31E, 31F, 31G, and 31H are arranged vertically side by side on the right side of the display areas 31C and 31D.

The host microcomputer 2 selects one layout pattern at random out of these four layout patterns A to D. When the layout pattern is selected in this way, the host microcomputer 2 shifts to the next step SP11 (FIG. 5). Here, it is assumed that the layout pattern B is selected.

In step SP11, the host microcomputer 2 adjusts display priority parameters indicating display priorities of the respective content lists created in step SP1.

Practically, in each of the content lists (i.e., a content lists corresponding to each of the plural subjects), a display priority parameter and a display area size indicating in which size display area 31 the list is displayed are attached as attribute information (hereinafter also referred to as list attribute information). The list attribute information is managed for each of the content lists by a list attribute information table Tb1 shown in FIG. 7, which is created in the HDD 4 of the digital recording apparatus 1.

In the display priority parameter for each of the content lists, for example, one of numerical values from "4" (a display priority is low) to "10" (a display priority is high) is set as an initial value. In the display area size, one of "L", "M", and "S" corresponding to the sizes of the display areas 31 is set. The list attribute information table Tb1 shown in FIG. 7 is an example in which the initial value of the display priority parameter is set as "10" and the display area size is set to "L" for the content list A, the initial value of the display priority parameter is set as "8" and the display area size is set as "L" for the content list B, the initial value of the display priority parameter is set as "8" and the display area size is set as "L" for the content list C, the initial value of the display priority parameter is set as "7" and the display area size is set as "M" for the content list D, the initial value of the display priority parameter is set as "6" and the display area size is set as "M" for the content list E, the initial value of the display priority parameter is set as "6" and the display area size is set as "S" for the content list F, the initial value of the display priority parameter is set as "5" and the display area size is set as "S" for the content list G, the initial value of the display priority parameter is set as "9" and the display area size is set as "L" for the content list H, the initial value of the display priority parameter is set as "7" and the display area size is set as "L" for the content list I, the initial value of the display priority parameter is set as "6" and the display area size is set as "M" for the content list J, the initial value of the display priority parameter is set as "6" and the display area size is set as "S" for the content list K, and the initial value of the display priority parameter is set as "4" and the display area size is set as "S" for the content list L.

In step SP11, the host microcomputer 2 adjusts the display priority parameters for the respective content lists initially set in this way. Specifically, the host microcomputer 2 adjusts the display priority parameters for the respective content lists on the basis of plural fluctuation factors as conditions for adjusting the display priority parameters and adjustment amounts associated with the respective plural fluctuation factors.

In this embodiment, as the plural fluctuation factors and the adjustment amounts for the respective fluctuation factors, for example, as shown in FIG. 8, a first fluctuation factor "content list including contents with high preference" and an adjustment amount "+1" for the fluctuation factor, a second fluctuation factor "content list including contents increased from those at the last operation time" and a fluctuation amount "+1" for the fluctuation factor, a third fluctuation factor "content list including contents equal to or larger than a predetermined number" and an adjustment amount "+1" for the fluctuation factor, a fourth fluctuation factor "content list including contents same as those at the last operation time" and an adjustment amount "−2" for the fluctuation factor, and a fifth fluctuation factor "content list displayed at the last operation time" and an adjustment amount "−2" for the fluctuation factor are set in the digital recording apparatus 1 in advance.

"The last operation time" in this case is a date and time when startup operation for the content list table display function was performed last time. A method of calculating preference of contents in this case is not specifically limited. For example, a method of calculating the preference on the basis of user operation for contents such as recording, reproduction, and editing only has to be adopted. In this embodiment, concerning program contents, for example, higher preference is set for program contents with a larger number of times of reproduction, higher preference is set for program contents with a higher ratio of viewing time to a reproduction time length, higher preference is set for program contents record-scheduled every week, and higher preference is set for program contents set with bookmarks.

In this way, in the digital recording apparatus 1, the first to fifth fluctuation factors and the adjustment amounts for the respective fluctuation factors are set to raise a display priority of a content list when contents of the content list are favorite contents of the user, when the contents are new, or when the content list includes a large number of contents and lower a display priority when contents of a content list are not new or when the content list was displayed last time.

For example, when the content list A corresponds to the first fluctuation factor and the second fluctuation factor among the first to fifth fluctuation factors, the host microcomputer 2 adds the adjustment amount "+1" for the first fluctuation factor and the adjustment amount "+1" for the second fluctuation factor to the display priority parameter "10" for the content list A to adjust the display priority parameter "10" for the content list A to "12". Similarly, the host microcomputer 2 also adjusts the display priority parameters for the content lists B to L.

As a result, the attribute information table Tb1 is updated as shown in FIG. 9. The attribute information table Tb1 in this case is an example in which the display priority parameter for the content list A is adjusted to "12", the display priority parameter for the content list B is adjusted to "7", the display priority parameter for the content list C is adjusted to "8", the display priority parameter for the content list D is adjusted to "4", the display priority parameter for the content list E is adjusted to "3", the display priority parameter for the content list F is adjusted to "9", the display priority parameter for the content list G is adjusted to "2", the display priority parameter for the content list H is adjusted to "8", the display priority parameter for the content list 1 is adjusted to "4", the display priority parameter for the content list J is adjusted to "7", and the display priority parameter for the content list L is adjusted to "4".

In this way, the host microcomputer 2 adjusts the display priority parameters for the respective content lists on the basis of the first to fifth fluctuation factors and the adjustment amounts for the respective fluctuation factors (i.e., on the basis of contents of the content lists and display situations of the content lists). Then, the host microcomputer 2 shifts to the next step SP12 (FIG. 5).

In step SP12, the host microcomputer 2 sorts the content lists A to L of the attribute information table Tb1 in order from one with a largest numerical value of the display priority parameter. As a result, in the attribute information table Tb1, as shown in FIG. 10, the content lists are rearranged, with the content list A having a highest display priority at the top, in order of the content lists F, C, H, K, B, J, D, I, L, E, and G (i.e., in order from one with a highest display priority). Consequently, thereafter, the host microcomputer 2 can select content lists with high display priorities in order from the top of the attribute information table Tb1. After sorting the content lists A to L of the attribute information table Tb1, the host microcomputer 2 shifts to the next step SP13 (FIG. 5).

In step SP13, the host microcomputer 2 selects one of the plural display areas 31 arranged in the layout pattern selected in step SP10 and shifts to the next step SP14. Here, it is assumed that the host microcomputer 2 selects the L-size display area 31A among the six display areas 31A to 31D arranged in the layout pattern B.

In step SP14, the host microcomputer 2 selects a content list with a high display priority from the attribute information table Tb1 as a content list displayed in the selected L-size display area 31A. In this case, the host microcomputer 2 searches from the top of the attribute information table Tb1 and selects the content list A found first as a content list with a display area size "L" (i.e., the content list A with a highest display priority among content lists with a display area size "L"). After selecting the content list A as a content list displayed in the L-size display area 31A, the host microcomputer 2 shifts to the next step SP15.

In step SP15, the host microcomputer 2 judges whether a content list selectable in the preceding step SP14 is not present in the attribute information table Tb1. In this case, as described above, since the content list A is present in the attribute information table Tb1 as the selectable content list, the host microcomputer 2 obtains a negative result in step SP15 and shifts to step SP16.

In step SP16, the host microcomputer 2 judges whether content lists displayed in all of the plural display areas 31 arranged in the layout pattern selected in step SP10 have been selected. Here, only the content list A displayed in the display area 31A among the plural display areas 31 arranged in the layout pattern B is selected. Therefore, the host microcomputer 2 obtains a negative result in step SP16, returns to step SP13, and selects the M-size display area 31B of the layout pattern B.

In the following step SP14, the host microcomputer 2 selects a content list displayed in the M-size display area 31B from the attribute information table Tb1 (in this case, selects the content list J with a highest display priority among content lists with the display area size "M"). In the following steps SP15 and SP16, the host microcomputer 2 obtains negative results, returns to step SP13 again, and selects the M-size display area 31C of the layout pattern B.

In this way, the host microcomputer 2 repeats the processing in steps SP13 to SP16 until content lists displayed in all of the plural display areas 31 of the layout pattern selected in step SP10 are selected. In selecting content lists, a content list once selected is excluded from selection objects.

As a result, for example, the content list A is selected as a content list displayed in the L-size display area 31A of the layout pattern B, the content lists J, D, and E are selected as content lists displayed in the M-size display areas 31B, 31C, and 31D, respectively, and the content lists F and K are selected as content lists displayed in the S-size display areas 31E and 31F. Consequently, a display layout of the content list table screen 30 is the display layout shown in FIG. 2.

The host microcomputer 2 finishes selecting content lists displayed in all of the plural display areas 31 of the layout pattern in this way. Then, in step SP16, the host microcomputer 2 obtains an affirmative result in step SP16 and finishes the layout determination processing procedure RT1A.

In some case, for example, there are only a small number of content lists of a predetermined display area size and a content list selectable in a predetermined display area size is not present in the attribute information table Tb1 in step SP14. In such a case, the host microcomputer 2 obtains a negative result in step SP15, returns to step SP10, and selects a layout pattern again.

In this case, the host microcomputer 2 only has to select a layout pattern other than a layout pattern selected before. For example, when there are insufficient content lists of the display area size "S", the host microcomputer 2 only has to select a layout pattern with a smaller number of S-size display areas 31.

According to such a layout determination processing procedure RT1A, the digital recording apparatus 1 determines a display layout of the content list table screen 30.

As explained above, according to the content list table display function, the digital recording apparatus 1 can present the user with plural content lists selected out of content lists, which are created by selecting contents on the basis of the respective plural subjects out of all contents treated by the apparatus, on the basis of contents of the content lists and display situations of the content lists at that point. In other words, the digital recording apparatus 1 can present the user with plural content lists useful for the user.

(1-3-3) Content List Creation Processing Performed in the Startup Processing

In the digital recording apparatus 1, besides the subjects "newly arrived recommended title", "new program of interest", "today's movie", "last year's photograph", "trend keyword", "person in news", and "one work material" described above, various subjects "recommended event program", "title not viewed yet", "title viewed halfway", and "title often viewed" for creating a content list desired by the user are set. Processing for creating a content list on the basis of the respective such various subjects (i.e., content creation processing performed at step SP1 in the startup processing procedure RT1) is explained in detail for each of the subjects according to procedures for the processing.

Procedures of content list creation processing based on the respective subjects "recommended event program", "title not viewed yet", "title viewed halfway", "title often viewed", "title set with a bookmark", "last year's photograph", "recommend album creation", "recommend dubbing", "one word material", "trend keyword", "news of topics", and "today's movie" among the various subjects are explained in order.

Figure 11:
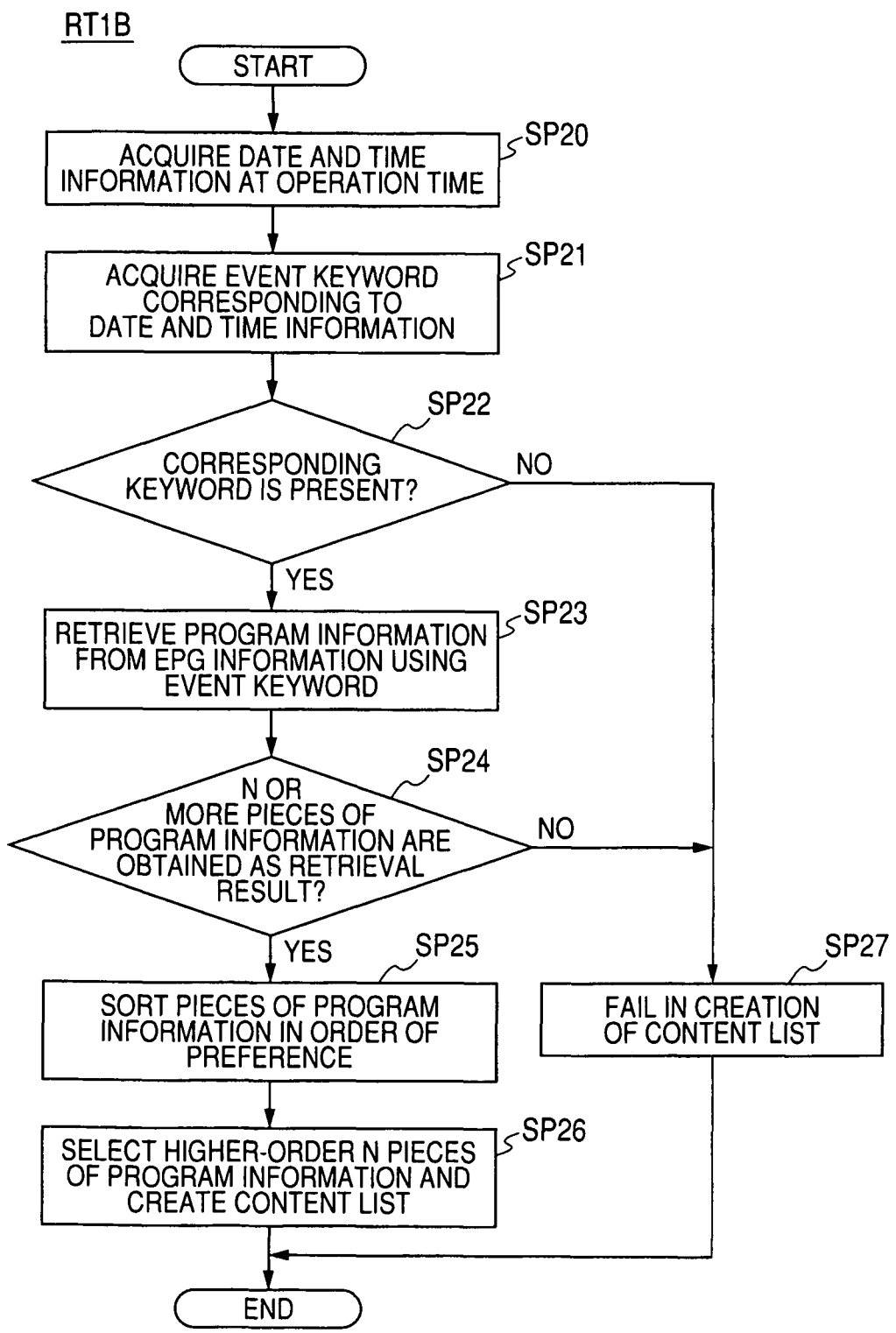
FIG. 11 is a flowchart showing a content list creation processing procedure based on a subject "recommended event program"

First, a procedure of content list creation processing based on the subject "recommended event program" is explained in detail with reference to a flowchart shown in FIG. 11. The content list creation processing based on the subject "recommended event program" is processing for selecting program information corresponding to "recommended event program" from the EPG information and creating a content list.

In step SP1 of the startup processing procedure RT1, the host microcomputer 2 starts content list creation processing procedure RT1B based on the subject "recommended event program" and shifts to step SP20.

In step SP20, the host microcomputer 2 acquires date and time information indicating an operation date and time when startup operation for the content list table display function is performed this time, i.e., a present date and time from a not-shown timer and shifts to the next step SP21.

In step SP21, the host microcomputer 2 acquires a keyword indicating an event corresponding to the operation date and time (i.e., the present date and time) indicated by the acquired date and time information (hereinafter referred to as an event keyword) from event tables Tb2 (Tb2A to Tb2C) showing in FIGS. 12A to 12C, which are created in the HDD 4.

In the event tables Tb2 (Tb2A to Tb2C), event keywords (e.g., "Christmas") and a period when the event is held (e.g., "December") are registered in association with each other. The host microcomputer 2 acquires an event keyword corresponding to a period in which the present date and time is included, i.e., an event keyword of an event held in a predetermined period including the present from the event tables Tb2 (Tb2A to Tb2C).

Specifically, in this embodiment, the event table Tb2A in which event keywords (e.g., "Soccer World Cup") of events held in specific years and months (e.g., "June in the year of 4n+2 (n is an integer)" as period are registered, the event table Tb2B in which event keywords (e.g., "girl's festival") of events held in specific month every year (e.g., "March") as periods are registered, and the event table Tb2C in which event keywords (e.g., "star festival") of events held in specific months and dates every year (e.g., "July 7") as periods are registered are created in the HDD 4. The host microcomputer 2 acquires an event keyword of an event held in a predetermined period including the present from these plural event tables Tb2A to Tb2C. If plural events are held in the predetermined period including the present, the host microcomputer 2 may acquire plural event keywords. If no event is present, the host microcomputer 2 cancels the acquisition of an event keyword.

When an event keyword corresponding to the date and time information is acquired in this way, the host microcomputer 2 shifts to the next step SP22. In step SP22, the host microcomputer 2 determines whether an event keyword is acquired in the preceding step SP21.

When an affirmative result is obtained in step SP22, this means that at least one event keyword is acquired in step SP21. The host microcomputer 2 shifts to step SP23. In step SP23, the host microcomputer 2 retrieves program information from the EPG information (i.e., the program information of program contents scheduled to be broadcasted) recorded in the memory 25 using the event keyword acquired in step SP21 and shifts to the next step SP24.

In step SP24, the host microcomputer 2 judges whether N (N is an integer) pieces of program information matching the event keyword are acquired as a result of the retrieval in the preceding step SP23. When an affirmative result is obtained in step SP24, this means that there are N or more pieces of program information matching the event keyword, i.e., there are N or more pieces of program information of program contents scheduled to be broadcasted related to events held in the predetermined period including the present. The host microcomputer 2 shifts to step SP25.

In step SP25, the host microcomputer 2 sorts the N or more pieces of program information matching the event keyword in order from one with highest preference and shifts to the next step SP26. In step SP26, the host microcomputer 2 selects higher-order N pieces of program information out of the sorted program information and creates a content list. Then, the host microcomputer 2 finishes the content list creation processing procedure RT1B based on the subject "recommended event program".

The preference of the program information in this case is calculated on the basis of a word representing a taste of the user (hereinafter referred to as taste word) included in the program information. The taste word is extracted, for example, when user operation for program content such as recording, reproduction, and editing is performed, from program information of the program content and stored in the HDD 4. Preference is also set in the taste word itself. For example, the host microcomputer 2 sets higher preference for a taste word extracted a larger number of times. In other words, in this embodiment, the host microcomputer 2 sets higher preference for program information including a larger number of taste words with high preference.

In this way, the host microcomputer 2 creates, as a content list based on the subject "recommended event program", a content list including program information with high preference among the program information of program contents scheduled to be broadcasted related to events held in the predetermined period including the present.

On the other hand, when a negative result is obtained in step SP22, i.e., when an event keyword corresponding to the present date and time may not be able to be acquired, and when a negative result is obtained in step SP24, i.e., when N or more pieces of program information matching the event keyword are not present, the host microcomputer 2 shifts to step SP27. The host microcomputer 2 judges that the host microcomputer 2 has failed in creation of a content list and finishes the content list creation processing procedure RT1B based on the subject "recommended event program".

According to such a content list creation processing procedure RT1B, the digital recording apparatus 1 creates a content list corresponding to the subject "recommended event program".

The host microcomputer 2 displays one piece of program information (e.g., a piece of program information at the top in the list, i.e., a piece of program information with highest preference) in the program information, which is included in the content list based on the subject "recommended event program" created in this way, in a predetermined display area 31 of the content list table screen 30 shown in FIG. 2. Consequently, the host microcomputer 2 can cause the user to recognize what kinds of contents are broadcasted as recommended program contents that the user takes interest in among program contents related to recent events.

Figure 13:
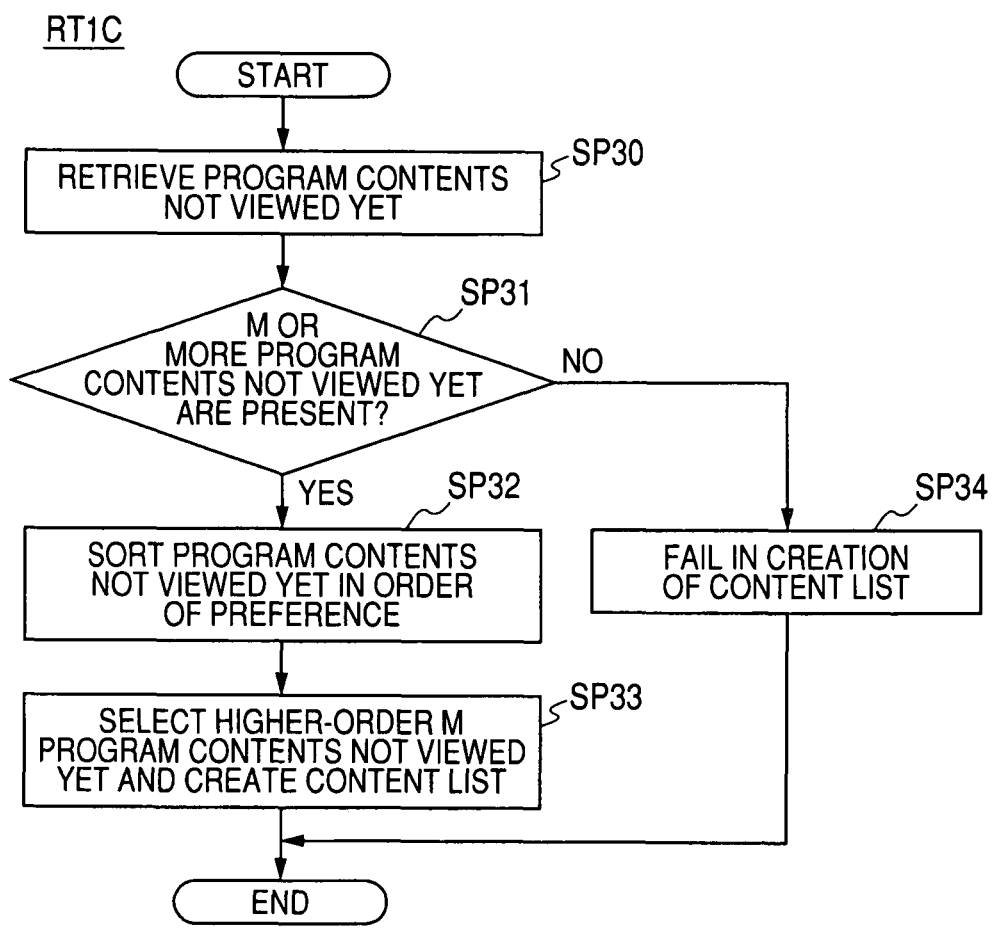
FIG. 13 is a flowchart showing a content list creation processing procedure based on a subject "title not viewed yet"

A procedure of content list creation processing based on the subject "title not viewed yet" is explained in detail with reference to a flowchart shown in FIG. 13. The content list creation processing based on the subject "title not viewed yet" is processing for selecting recorded contents corresponding to "title not viewed yet" and creating a content list. The host microcomputer 2 starts a content list creation processing procedure RT1C based on the subject "title not viewed yet" in step SP1 of the startup processing procedure RT1 and shifts to step SP30.

In step SP30, the host microcomputer 2 retrieves recorded contents not viewed yet out of the program contents (i.e., the recorded contents) recorded in the HDD 4.

Practically, in each of the recorded contents recorded in the HDD 4, an ID (hereinafter also referred to as content ID), a recording date and time indicating a date and time when the recorded content was recorded, the number of times of reproduction indicating the number of times the recorded content is reproduced, a reproduction length of time indicating a length of time of the recorded content, a view counter indicating to which part the recorded content is viewed, a last reproduction date and time indicating a date and time when the recorded content was reproduced last, a bookmark position indicating a position of a book mark set in the recorded content, a record setting indicating whether the recorded content is recorded content recorded by every network scheduling such as every day scheduling, Monday to Friday every week scheduling, and Thursday every week scheduling, and preference indicating preference of the user are attached as attribute information (hereinafter also referred to as recorded content attribute information). The recorded content attribute information is managed for each content ID by a recorded content attribute information table Tb3 shown in FIG. 14, which is created in the HDD 4.

The recorded content attribute information table Tb3 shown in FIG. 14 is an example indicating that, as attribute information of recorded content with a content ID "0", the recording date and time is "2006.1.14, 13:00:00", the number of times of reproduction is "1", the reproduction length of time is "1:00:00", a value of the view counter is "0:20:15", the last reproduction date and time is "2006.1.15, 0:05:15", the bookmark position is "0:00:50", the record setting is "single" (independent scheduling rather than every-time scheduling), and the preference is "100" and, as attribute information of recorded content with a content ID "1", the recording date and time is "2006.1.13, 14:30:00", the number of times of reproduction is "0", the reproduction length of time is "0:30:00", a value of the view counter is "–" (not viewed), the last reproduction date and time is "–" (not viewed), the bookmark position is "–" (not set), the record setting is "Wednesday every week" (every-time scheduling on Wednesday every week), and the preference is "151".

In other words, the host microcomputer 2 retrieves, recorded content with the number of times of reproduction "0" from the recorded content attribute information table Tb3 as recorded content not viewed yet. After finishing such retrieval, the host microcomputer 2 shifts to the next step SP31.

In step SP31, the host microcomputer 2 judges whether M (M is an integer) or more recorded contents not viewed yet are obtained as a result of the retrieval in the preceding step SP30. When an affirmative result is obtained in step SP31, this means that M or more recorded contents not viewed yet are present. The host microcomputer 2 shifts to step SP32.

In step SP32, the host microcomputer 2 sorts the M or more recorded contents not viewed yet in order from one with highest preference and shifts to the next step SP33. In step SP33, the host microcomputer 2 selects higher-order M recorded contents out of the sorted recorded contents and creates a content list. Then, the host microcomputer 2 finishes the content list creation processing procedure RT1C based on the subject "title not viewed yet".

In this way, the host microcomputer 2 creates, as a content list based on the subject "title not viewed yet", a content list including recorded contents with high preference among recorded contents with the number of times of reproduction "0".

On the other hand, when a negative result is obtained in step SP31, i.e., M or more recorded contents not viewed yet are not present, the host microcomputer 2 shifts to step SP34. The host microcomputer 2 judges that the host microcomputer 2 has failed in creation of a content list and finishes the content list creation processing procedure RT1C based on the subject "title not viewed yet".

According to such a content list creation processing procedure RT1C, the digital recording apparatus 1 creates a content list corresponding to the subject "title not viewed yet".

The host microcomputer 2 displays one recorded content (e.g., recorded content at the top in the list, i.e., recorded content with highest preference) among the recorded contents, which are included in the content list based on the subject "title not viewed yet" created in this way, in a predetermined display area 31 of the content list table screen 30 shown in FIG. 2. Consequently, the host microcomputer 2 can cause the user to recognize what kinds of titles are present as titles that the user takes interest in among titles not viewed yet.

Figure 15:
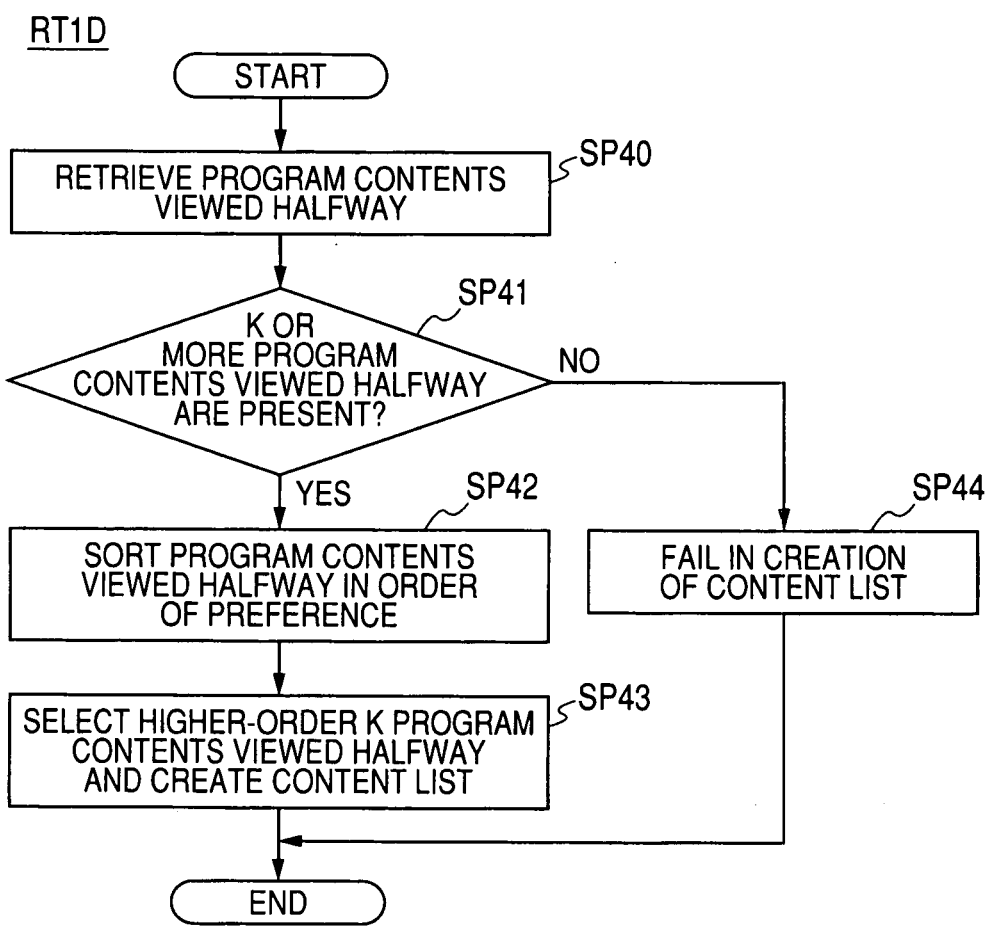
FIG. 15 is a flowchart showing a content list creation processing procedure based on a subject "title viewed halfway"

A procedure of content list creation processing based on the subject "title viewed halfway" is explained in detail with reference to a flowchart shown in FIG. 15. The content list creation processing based on the subject "title viewed halfway" is processing for selecting recorded contents corresponding to "title viewed halfway" and creating a content list. The host microcomputer 2 starts a content list creation processing procedure RT1D based on the subject "title viewed halfway" in step SP1 of the startup processing procedure RT1 and shifts to step SP40.

In step SP40, the host microcomputer 2 retrieves recorded contents viewed halfway out of the program contents (i.e., the recorded contents) recorded in the HDD 4.

In this case, the host microcomputer 2 retrieves recorded contents with the number of times of reproduction equal to or larger than "1" and a ratio of a value of the view counter to the reproduction length of time smaller than, for example, 80% from the recorded content attribute information table Tb3 shown in FIG. 14 as recorded contents viewed halfway. After finishing such retrieval, the host microcomputer 2 shifts to the next step SP41.

In step SP41, the host microcomputer 2 judges whether K (K is an integer) or more recorded contents viewed halfway are obtained as a result of the retrieval in the preceding step SP40. When an affirmative result is obtained in step SP41, this means that K or more recorded contents viewed halfway are present. The host microcomputer 2 shifts to step SP42.

In step SP42, the host microcomputer 2 sorts the K or more recorded contents viewed halfway in order from one with highest preference and shifts to the next step SP43. In step SP43, the host microcomputer 2 selects higher-order K recorded contents out of the sorted recorded contents and creates a content list. Then, the host microcomputer 2 finishes the content list creation processing procedure RT1D based on the subject "title viewed halfway".

In this way, the host microcomputer 2 creates, as a content list based on the subject "title viewed halfway", a content list including recorded contents with high preference among recorded contents with a ratio of a value of the view counter to the reproduction length of time smaller than a predetermined value.

On the other hand, when a negative result is obtained in step SP41, i.e., when K or more recorded contents viewed halfway are not present, the host microcomputer 2 shifts to step SP44. The host microcomputer 2 judges that the host microcomputer 2 has failed in creation of a content list and finishes the content list creation processing procedure RT1D based on the subject "title viewed halfway".

According to such a content list creation processing procedure RT1D, the digital recording apparatus 1 creates a content list corresponding to the subject "title viewed halfway".

The host microcomputer 2 displays one recorded content (e.g., recorded content at the top in the list, i.e., recorded content with highest preference) among the recorded contents, which are included in the content list based on the subject "title viewed halfway" created in this way, in a predetermined display area 31 of the content list table screen 30 shown in FIG. 2. Consequently, the host microcomputer 2 can cause the user to recognize what kinds of titles are present as titles that the user takes interest in among titles viewed halfway.

Figure 16:
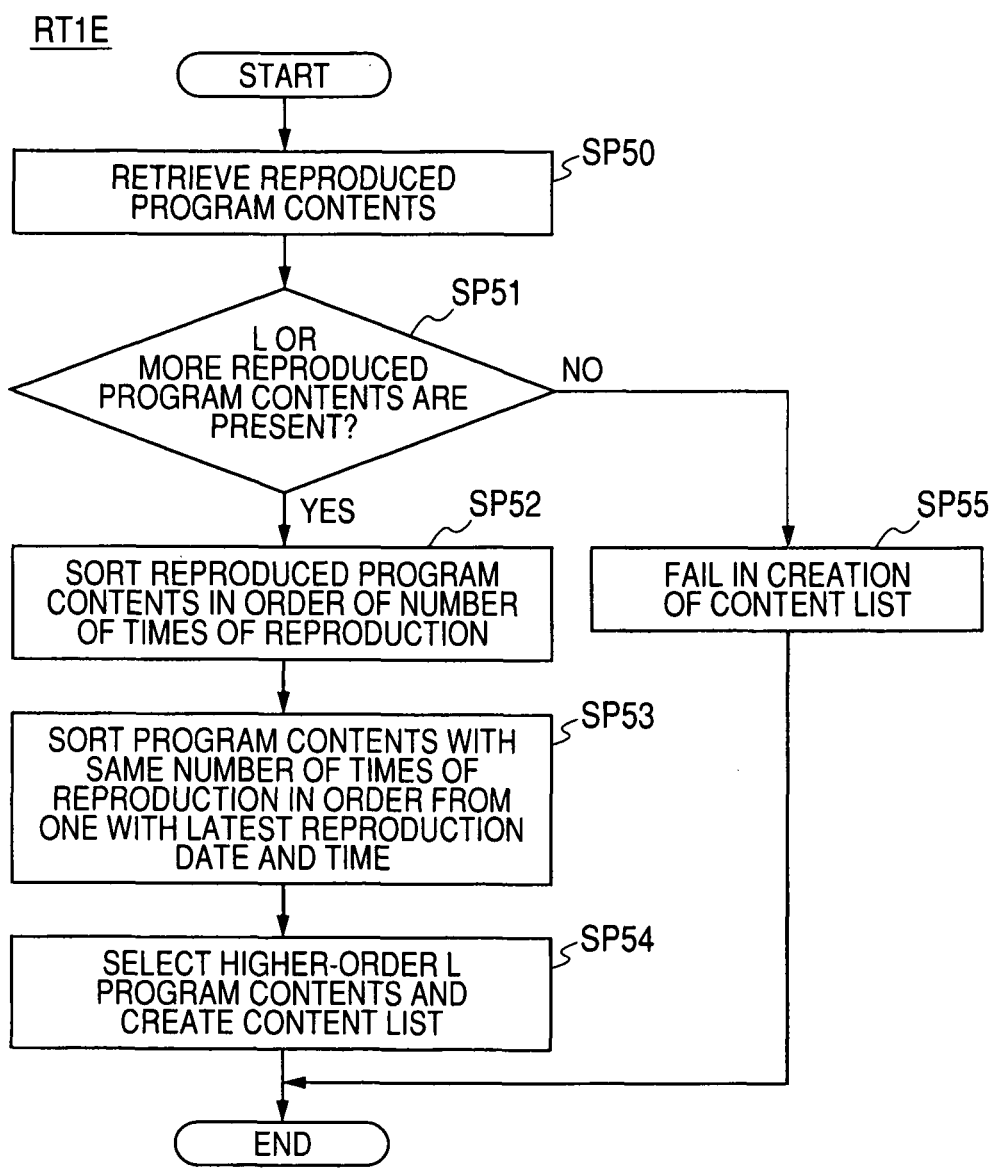
FIG. 16 is a flowchart showing a content list creation processing procedure based on a subject "title often viewed"

A procedure of content list creation processing based on the subject "title often viewed" is explained in detail with reference to a flowchart shown in FIG. 16. The content list creation processing based on the subject "title often viewed" is processing for selecting recorded contents corresponding to "title often viewed" and creating a content list. The host microcomputer 2 starts a content list creation processing procedure RT1E based on the subject "title often viewed" in step SP1 of the startup processing procedure RT1 and shifts to step SP50.

In step SP50, the host microcomputer 2 retrieves reproduced recorded contents out of the program contents (i.e., the recorded contents) recorded in the HDD 4.

In this case, the host microcomputer 2 retrieves recorded contents with the number of times of reproduction equal to or larger than "1" from the recorded content attribute information table Tb3 shown in FIG. 14 as reproduced recorded contents. After finishing such retrieval, the host microcomputer 2 shifts to the next step SP51.

In step SP51, the host microcomputer 2 judges whether L (L is an integer) or more reproduced recorded contents are obtained as a result of the retrieval in the preceding step SP50. When an affirmative result is obtained in step SP51, this means that L or more reproduced recorded contents are present. The host microcomputer 2 shifts to step SP52.

In step SP52, the host microcomputer 2 sorts the L or more reproduced recorded contents in order from one with a largest number of times of reproduction and shifts to the next step SP53. In step SP53, when there are recorded contents with the same number of times of reproduction in the sorted recorded contents, the host microcomputer 2 further sorts the recorded contents in order from one with a latest reproduction date and time and shifts to the next step SP54.

In step SP54, the host microcomputer 2 selects higher-order L recorded contents out of the recorded contents sorted in steps SP52 and SP53 and creates a content list. Then, the host microcomputer 2 finishes the content list creation processing procedure RT1E based on the subject "title often viewed".

In this way, the host microcomputer 2 creates a content list including recorded contents with a large number of times of reproduction as a content list based on the subject "title often viewed".

On the other hand, when a negative result is obtained in step SP51, namely when the number of the reproduced recorded contents is less that L, the host microcomputer 2 shifts to step SP55. The host microcomputer 2 judges that the host microcomputer 2 has failed in creation of a content list and finishes the content list creation processing procedure RT1E based on the subject "title often viewed".

According to such a content list creation processing procedure RT1E, the digital recording apparatus 1 creates a content list corresponding to the subject "title of ten viewed".

The host microcomputer 2 displays one recorded content (e.g., recorded content at the top in the list, i.e., recorded content with highest preference) among the recorded contents, which are included in the content list based on the subject "title often viewed" created in this way, in a predetermined display area 31 of the content list table screen 30 shown in FIG. 2. Consequently, the host microcomputer 2 can cause the user to recognize what kinds of titles are present as titles that the user often views.

Figure 17:
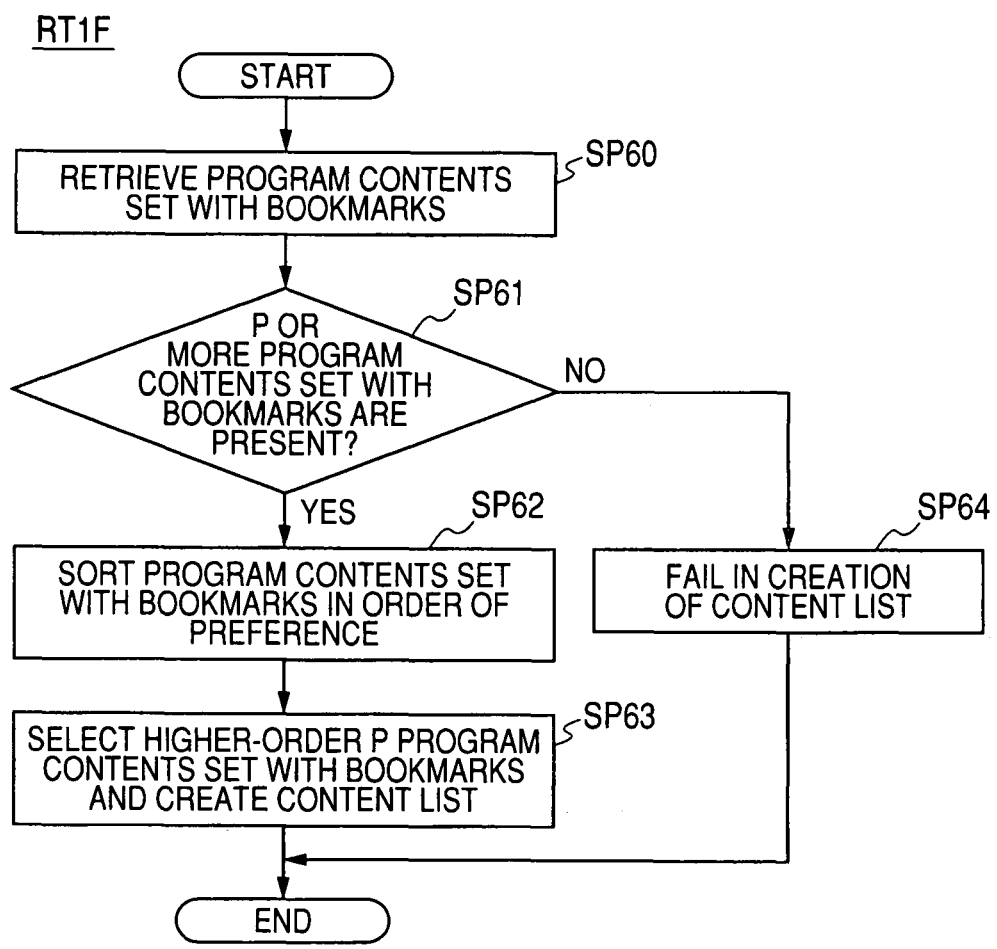
FIG. 17 is a flowchart showing a content list creation processing procedure based on a subject "title set with a bookmark"

A procedure of content list creation processing based on the subject "title set with a bookmark" is explained in detail with reference to a flowchart shown in FIG. 17. The content list creation processing based on the subject "title set with a bookmark" is processing for selecting recorded contents corresponding to "title set with a bookmark" and creating a content list. The host microcomputer 2 starts a content list creation processing procedure RT1F based on the subject "title set with a bookmark" in step SP1 of the startup processing procedure RT1 and shifts to step SP60.

In step SP60, the host microcomputer 2 retrieves recorded contents set with bookmarks out of the program contents (i.e., the recorded contents) recorded in the HDD 4.

In this case, the host microcomputer 2 retrieves recorded contents set with bookmark positions from the recorded content attribute information table Tb3 shown in FIG. 14 as recorded contents set with bookmarks. After finishing such retrieval, the host microcomputer 2 shifts to the next step SP61.

In step SP61, the host microcomputer 2 judges whether P (P is an integer) or more recorded contents set with bookmarks are obtained as a result of the retrieval in the preceding step SP60. When an affirmative result is obtained in step SP61, this means that P or more recorded contents set with bookmarks are present. The host microcomputer 2 shifts to step SP62.

In step SP62, the host microcomputer 2 sorts the P or more recorded contents set with bookmarks in order from one with highest preference and shifts to the next step SP63. In step SP63, the host microcomputer 2 selects higher-order P recorded contents out of the sorted recorded contents and creates a content list. Then, the host microcomputer 2 finishes the content list creation processing procedure RT1F based on the subject "title set with a bookmark".

In this way, the host microcomputer 2 creates a content list including recorded contents with high preference among the recorded contents set with bookmark positions as a content list based on the subject "title set with a bookmark".

On the other hand, when a negative result is obtained in step SP61, i.e., P or more recorded contents set with bookmarks are not present, the host microcomputer 2 shifts to step SP64. The host microcomputer 2 judges that the host microcomputer 2 has failed in creation of a content list and finishes the content list creation processing procedure RT1F based on the subject "title set with a bookmark".

According to such a content list creation processing procedure RT1F, the digital recording apparatus 1 creates a content list corresponding to the subject "title set with a bookmark".

The host microcomputer 2 displays one recorded content (e.g., recorded content at the top in the list, i.e., recorded content with highest preference) among the recorded contents, which are included in the content list based on the subject "title set with a bookmark" created in this way, in a predetermined display area 31 of the content list table screen 30 shown in FIG. 2. Consequently, the host microcomputer 2 can cause the user to recognize what kinds of titles are present as titles that the user takes interest in among titles set with bookmarks.

Figure 18:
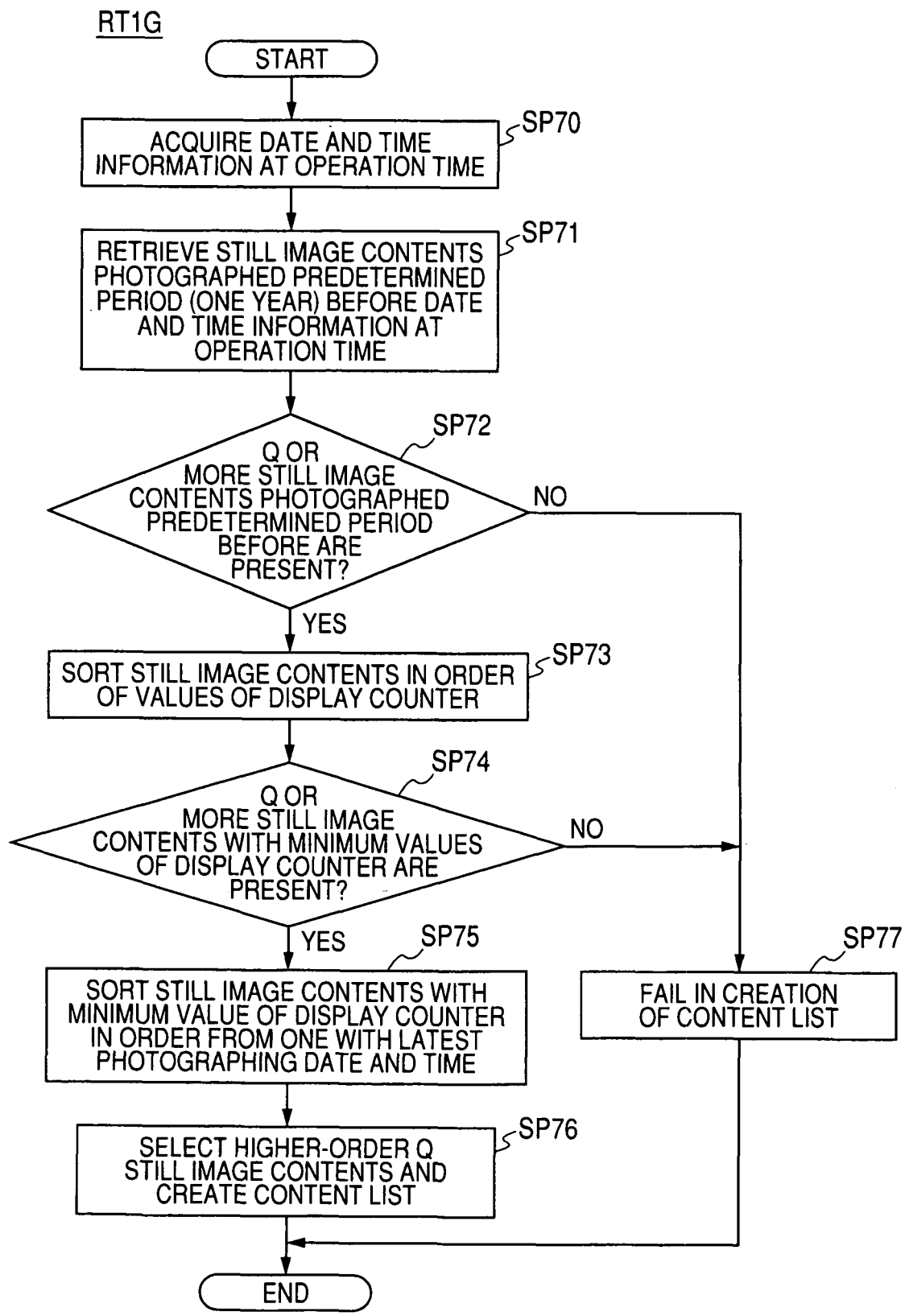
FIG. 18 is a flowchart showing a content list creation processing procedure based on a subject "last year's photograph"

A procedure of content list creation processing based on the subject "last year's photograph" is explained in detail with reference to a flowchart shown in FIG. 18. The content list creation processing based on the subject "last year's photograph" is processing for selecting still image contents corresponding to "last year's photograph" and creating a content list. The host microcomputer 2 starts a content list creation processing procedure RT1G based on the subject "last year's photograph" in step SP1 of the startup processing procedure RT1 and shifts to step SP70.

In step SP70, the host microcomputer 2 acquires date and time information indicating an operation date and time when startup operation for the content list table display function is performed this time, i.e., date and time information indicating a present date and time from the not-shown timer and shifts to the next step SP71.

In step SP71, the host microcomputer 2 retrieves still image contents photographed a predetermined period before (here, one year before) the operation date and time (i.e., the present date and time) indicated by the acquired date and time information out of the still image contents recorded in the HDD 4.

Practically, in each of the still image contents recorded in the HDD 4, a photographing date and time, the number of times of display indicating the number of times the still image content is displayed on the content list table screen 30 as a content list, and an album creation flag indicating whether the still image content is a still image content subjected to album creation operation on an application for creating an album using the still image content are attached as attribute information (hereinafter also referred to as still image content attribute information). The still image content attribute information is managed for each of the content IDS by a still image content attribute information table Tb4 shown in FIG. 19, which is created in the HDD 4.

The still image content attribute information table Tb4 shown in FIG. 19 is an example indicating that, as attribute information of a still image content with a content ID "0", the photographing date and time is "Apr. 10, 2004, 22:08", a value of the display counter is "0", and the album creation flag is "1" (i.e., the still image content is already subjected to album creation operation) and, as attribute information of a still image content with a content ID "1", the photographing date and time is "Jun. 10, 2003, 23:08", a value of the display counter is "2", and the album creation flag is "0" (i.e., the still image content is not subjected to album creation operation yet".

In other words, the host microcomputer 2 retrieves still image contents with photographing date and times the predetermined period before (one year before) the present date and time from the still image content attribute information table Tb4.

Predetermined latitude is provided for the predetermined period as a retrieval condition. For example, when the predetermined period is represented as R, the latitude is represented as α, the operation date and time (i.e., the present date and time) is represented as S, and the photographing date and time is represented as T, a relation of the following formula (1) holds:

$$R-\alpha \leq S-T \leq R+\alpha \Lambda\Lambda \tag{1}$$

For example, when the predetermined period is one year and the latitude is one week, the host microcomputer 2 retrieves still image contents, photographing date and times of which are included in a period of one week before and after a date and time just one year before the present date and time, as still image contents with a photographing date and time in immediately preceding year (i.e., last year). After finishing such retrieval, the host microcomputer 2 shifts to SP72.

In step SP72, the host microcomputer 2 judges whether Q (Q is an integer) or more still image contents photographed the predetermined period before the present date and time are acquired as a result of the retrieval in the preceding step SP71. When an affirmative result is obtained in step SP72, this means that Q or more still image contents photographed the predetermined period before the present date and time are present. The host microcomputer 2 shifts to step SP73.

In step SP73, the host microcomputer 2 sorts the Q or more still image contents photographed the predetermined period before the present date and time in order from one with a minimum value of the display counter and shifts to the next step SP74. In step SP74, the host microcomputer 2 judges whether Q or more still image contents with a minimum value of the display counter are present.

When an affirmative result is obtained in step SP74, this means that Q or more still image contents photographed the predetermined period before the present date and time and with the minimum value of the display counter are present. The host microcomputer 2 shifts to step SP75. In step SP75, the host microcomputer 2 further sorts the Q or more still image contents photographed the predetermined period before the present date and time and with the minimum value of the display counter in order from one with a latest photographing date and time and shifts to the next step SP76. In step SP76, the host microcomputer 2 selects higher-order Q still image contents out of the sorted still image contents and creates a content list. Then, the host microcomputer 2 finishes the content list creation processing procedure RT1G based on the subject "last year's photograph".

In this way, the host microcomputer 2 creates, as a content list based on the subject "last year's photograph", a content list including still image contents with photographing date and times included in one week before and after a date and time just one year before the present date and time and with a small number of times of display on the content list table screen 30.

On the other hand, when a negative result is obtained in step SP72, i.e., when Q or more still image contents photographed the predetermined period before the present date and time are not present, and when a negative result is obtained in step SP74, i.e., Q or more still image contents photographed the predetermined period before the present date and time and with the minimum value of the display counter are not present, the host microcomputer 2 shifts to step SP77. The host microcomputer 2 judges that the host microcomputer 2 has failed in creation of a content list and finishes the content list creation processing procedure RT1G based on the subject "last year's photograph".

According to such a content list creation processing procedure RT1G, the digital recording apparatus 1 creates a content list corresponding to the subject "last year's photograph".

The host microcomputer 2 displays one still image content (e.g., still image content at the top in the list, i.e., still image content with a latest photographing date and time) among the still image contents, which are included in the content list based on the subject "last year's photograph" created in this way, in a predetermined display area 31 of the content list table screen 30 shown in FIG. 2. Consequently, the host microcomputer 2 can cause the user to recognize what kinds of photographs are present as photographs that the user has not often seen among last year's photographs.

Figure 20:
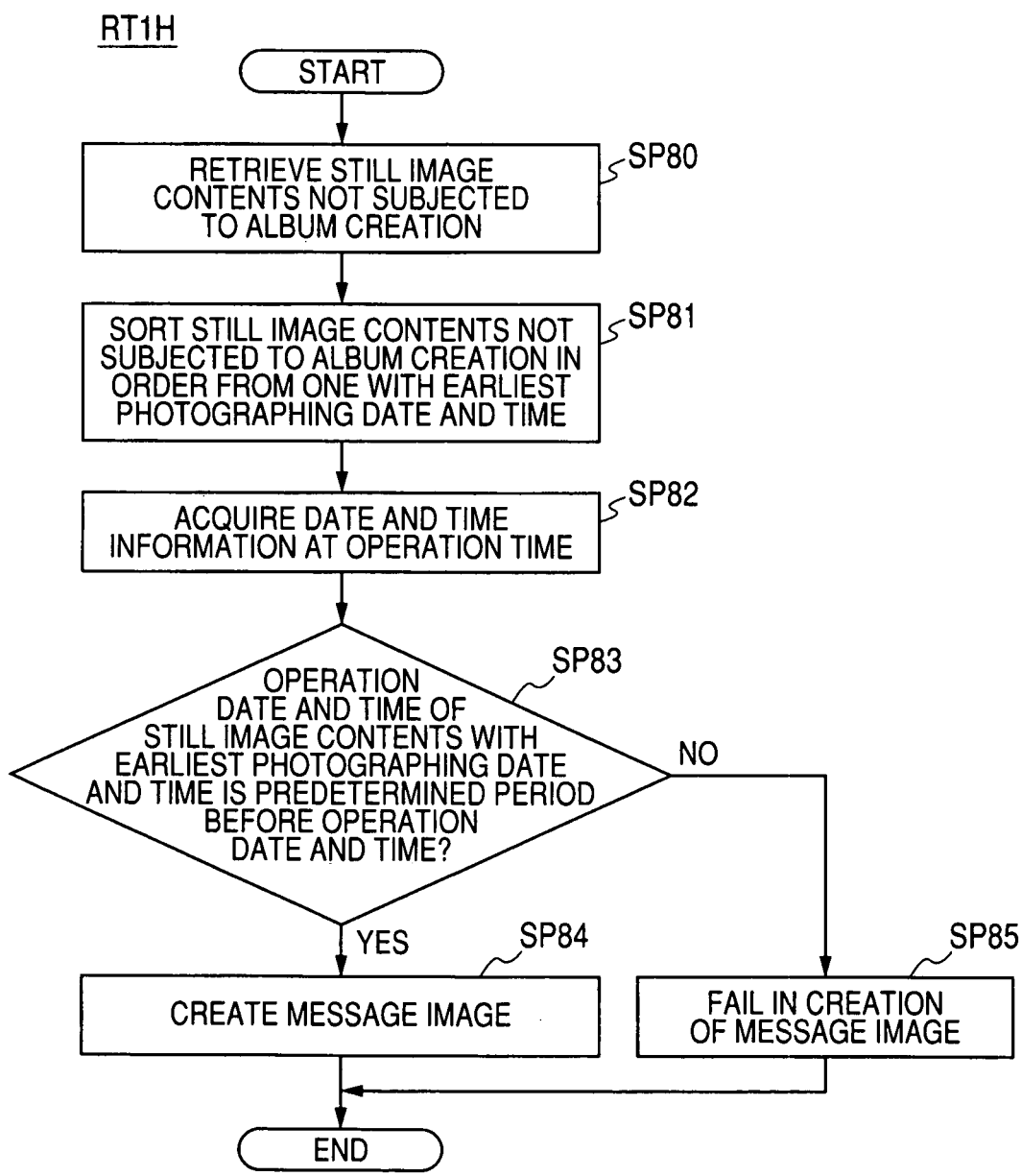
FIG. 20 is a flowchart showing a message image creation processing procedure based on a subject "recommend album creation"

A procedure of processing based on the subject "recommend album creation" is explained. The processing based on the subject "recommend album creation" and processing based on the subject "recommend dubbing" described later are different from processing based on the other subjects and are processing for creating a message image showing a predetermined message instead of a content list. First, a procedure of message image creation processing based on the subject "recommend album creation" is explained in detail with reference to a flowchart shown in FIG. 20.

Like the other content list creation processing, the message image creation processing based on the subject "recommend album creation" is also processing performed in step SP1 of the startup processing procedure RT1.

The host microcomputer 2 starts a message image creation processing procedure RT1H based on the subject "recommend album creation" in step SP1 of the startup processing procedure RT1 and shifts to step SP80.

In step SP80, the host microcomputer 2 retrieves still image contents not subjected to album creation operation out of the still image contents recorded in the HDD 4. In this case, the host microcomputer 2 retrieves still image contents with an album creation flag "0" (i.e., not set with a flag) from the still image content attribute information table Tb4 shown in FIG. 19 as still image contents not subjected to album creation operation. After finishing such retrieval, the host microcomputer 2 shifts to the next step SP81.

In step SP81, the host microcomputer 2 sorts the still image contents not subjected to album creation operation obtained as a result of the retrieval in the preceding step SP80 in order from one with an earliest photographing date and time and shifts to the next step SP82. In step SP82, the host microcomputer 2 acquires date and time information indicating an operation date and time when startup operation for the content list table display function is performed this time, i.e., date and time information indicating a present date and time from the not-shown timer and shifts to the next step SP83.

In step SP83, the host microcomputer 2 judges whether a photographing date and time of still image content with an earliest photographing date and time among the still image contents not subjected to album creation operation sorted in step SP80 is a predetermined period or more (e.g., one year or more) before the operation date and time (i.e., the present date and time) indicated by the acquired date and time information.

Figure 21:
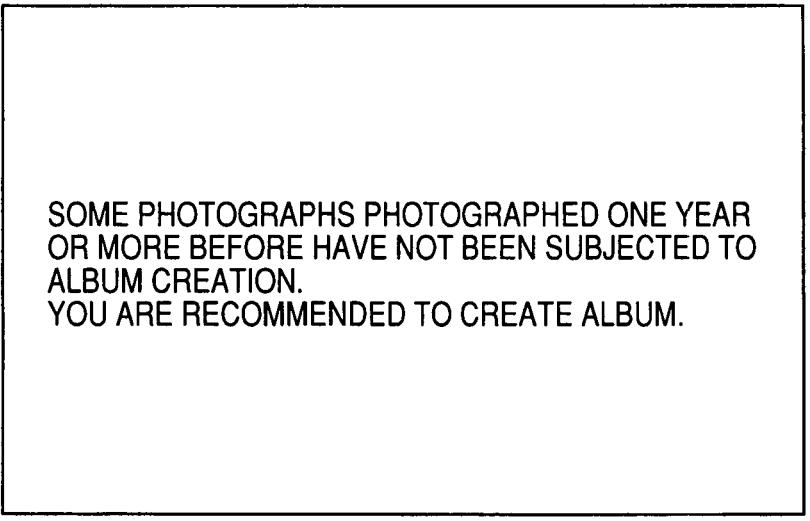
FIG. 21 is a schematic diagram showing a message image created on the basis of the subject "recommend album creation"

When an affirmative result is obtained in step SP83, this means that still image contents photographed the predetermined period or more (one year or more) before the present date and time are present among the still image contents not subjected to album creation operation. The host microcomputer 2 shifts to step SP84. In step SP84, as shown in FIG. 21, the host microcomputer 2 creates a message image Pi1 showing a message indicating that the still image contents photographed the predetermined period or more (one year or more) before the present date and time and not subjected to album creation operation yet are present and a message indicating that album creation is recommended. Then, the host microcomputer 2 finishes the message image creation processing procedure RT1H based on the subject "recommend album creation".

The message image Pi1 created in this way is treated by the host microcomputer 2 in the same manner as a content list (i.e., as a kind of a content list). Therefore, like the other plural content lists, the message image Pi1 is also an object of display in the plural display regions 31 of the content list table screen 30. When the message image Pi1 is selected as a message image displayed in any one of the plural display areas 31 by the layout determination processing, the message image Pi1 is displayed in the display area 31.

On the other hand, when a negative result is obtained in step SP83, i.e., when still image contents photographed the predetermined period or more (one year or more) before the present date and time are not present in the still image contents not subjected to album creation operation, the host microcomputer 2 shifts to step SP85. The host microcomputer 2 judges that the host microcomputer 2 has failed in creation of a message image and finishes the message image creation processing procedure RT1H based on the subject "recommend album creation".

According to such a message image creation processing procedure RT1H, the digital recording apparatus 1 creates the message image Pi1 corresponding to the subject "recommend album creation".

The host microcomputer 2 displays the message image Pi1 based on the subject "recommend album creation" created in this way in a predetermined display area 31 of the content list table screen 30 shown in FIG. 2. Consequently, the host microcomputer 2 can cause the user to recognize that still image contents photographed the predetermined period or more (one year or more) before the present date and time and not subjected to album creation operation yet are present and can urge the user to create an album for the still image contents.

Figure 22:
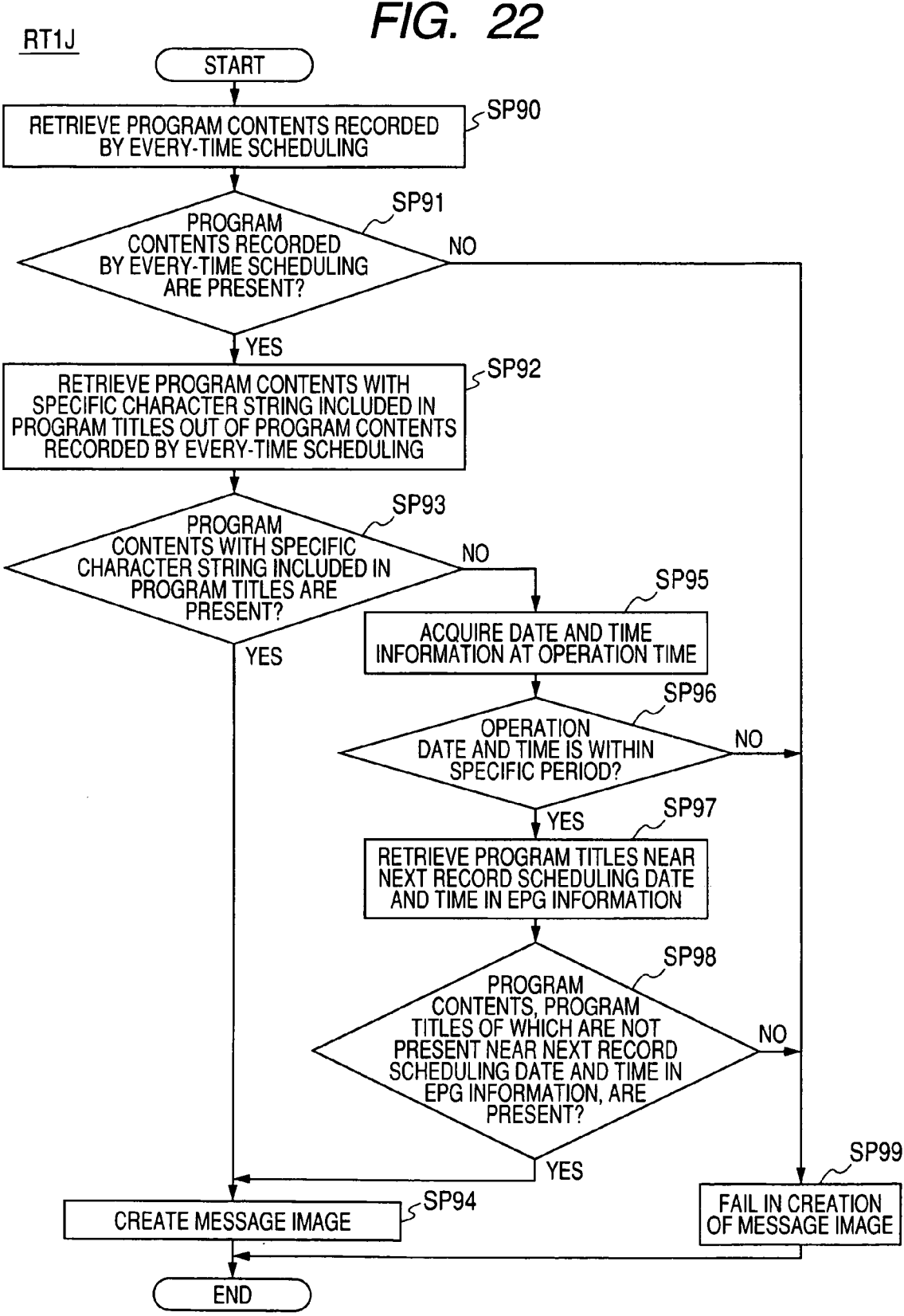
FIG. 22 is a flowchart showing a message image creation processing procedure based on a subject "recommend dubbing"

A procedure of message image creation processing based on the subject "recommend dubbing" is explained in detail with reference to a flowchart shown in FIG. 22. Like the other content list creation processing, the message image creation processing based on the subject "recommend dubbing" is processing performed in step SP1 of the startup processing procedure RT1.

The host microcomputer 2 starts a message image creation processing procedure RT1J based on the subject "recommend dubbing" in step SP1 of the startup processing procedure RT1 and shifts to step SP90. In step SP90, the host microcomputer 2 retrieves recorded contents recorded by every-time scheduling (hereinafter referred to as every-time recorded contents) out of the program contents (i.e., the recorded contents) recorded in the HDD 4.

In this case, the host microcomputer 2 retrieves recorded contents, recording settings for which are not "single", i.e., recording contents, recording settings for which are "every day", "Wednesday every week", and the like, from the recorded content attribute information table Tb3 shown in FIG. 14 as every-time recorded contents. After finishing such retrieval, the host microcomputer 2 shifts to the next step SP91.

In step SP91, the host microcomputer 2 judges whether one or more every-time recorded contents are obtained as a result of the retrieval in the preceding step SP90. When an affirmative result is obtained in step SP91, the host microcomputer 2 shifts to step SP92.

In step SP92, the host microcomputer 2 retrieves every-time recorded contents including special character strings, which indicate that the every-time recorded contents are last episodes of series, in program titles out of the every-time recorded contents and shifts to the next step SP93. The special character strings in this case are, for example, "end", "last episode", and "conclude".

In step SP93, the host microcomputer 2 judges whether one or more every-time recorded contents including special character strings, which indicate that the every-time recorded contents are last episodes of series, in program titles are obtained as a result of the retrieval in the preceding step SP92. When an affirmative result is obtained in step SP93, this means that at one or more every-time recorded contents, which are last episodes of series, are present in the every-time recorded contents. The host microcomputer 2 shifts to step SP94.

In step SP94, the host microcomputer 2 selects one of the every-time recorded contents, which are last episodes of series, and creates a message image Pi2 showing a message indicating that the series of the selected every-time recorded content have ended and a message recommending dubbing of the series as shown in FIG. 23. Then, the host microcomputer 2 finishes the message image creation processing procedure RT1J based on the subject "recommend dubbing".

The dubbing in this case means, for example, copying the recorded contents recorded in the HDD 4 to a DVD (Digital Versatile Disc) inserted in a not-shown DVD drive connected to the USB terminal 15 of the digital recording apparatus 1.

On the other hand, when a negative result is obtained in step SP93, i.e., when no every-time recorded content including a special character string, which indicates that the every-time recorded content is a last episode of a series, in a program title is not present in the every-time recorded contents, the host microcomputer 2 shifts to step SP95. In step SP95, the host microcomputer 2 acquires date and time information indicating an operation date and time when startup operation for the content list table display function is performed this time, i.e., date and time information indicating a present date and time from the not-shown timer and shifts to the next step SP96.

In step SP96, the host microcomputer 2 judges whether the operation date and time (i.e., the present date and time) indicated by the acquired date and time information is within a specific period. The specific period in this case means a period as break of broadcast cours when a series of program content would end, i.e., a period from the end of March to the beginning of April and a period from the end of September to the beginning of October. In other words, in step SP96, the host microcomputer 2 judges whether the operation date and time (the present date and time) is included in the period from the end of March to the beginning of April or the period from the end of September to the beginning of October.

When an affirmative result is obtained in step SP96, this means that the present date and time is in the period as break of broadcast cours, i.e., it is likely that every-time recorded contents, series of which have ended, are present. The host microcomputer 2 shifts to step SP97. In step SP97, the host microcomputer 2 retrieves program titles of every-time recorded contents from program information near the next record-scheduled date and time of the every-time recorded contents (e.g., in the case of Wednesday every week recording, near the next Wednesday) included in the EPG information (i.e., program information of respective program contents scheduled to be broadcasted) recorded in the memory 25 and shifts to the next step SP98.

In step SP98, the host microcomputer 2 judges whether one or more every-time recorded contents, program titles of which are not present in the program information near the next record-scheduled date and time, are present on the basis of a result of the retrieval in the preceding step SP97. When an affirmative result is obtained in step SP98, this means that one or more every-time recorded contents, program titles of which are not present in the program information near the next record-scheduled date and time, i.e., every-time recorded contents, series of which have ended, are present. The host microcomputer 2 shifts to step SP94.

In step SP94, the host microcomputer 2 selects one of the every-time recorded contents, series of which have ended, and creates the message image Pi2 (FIG. 22) showing a message indicating that a series of the selected every-time recorded contents has ended and a massage recommending dubbing of the series. Then, the host microcomputer 2 finishes the message image creation processing procedure RT1J based on the subject "recommend dubbing".

The message image Pi2 created in this way is treated by the host microcomputer 2 in the same manner as a content list (i.e., as a kind of a content list). Therefore, like the other plural content lists and the message image Pi1, the message image Pi2 is also an object of display in the plural display regions 31 of the content list table screen 30. When the message image Pi2 is selected as a message image displayed in any one of the plural display areas 31 by the layout determination processing, the message image Pi2 is displayed in the display area 31.

On the other hand, when a negative result is obtained in step SP91, i.e., when no every-time recorded content is present, when a negative result is obtained in step SP96, i.e., when the present date and time is outside the period as break of broadcast cours, and when a negative result is obtained in step SP98, i.e., no every-time recorded content, a series of which has ended, is present, the host microcomputer 2 shifts to step SP99. The host microcomputer 2 judges that the host microcomputer 2 has failed in creation of a message image and finishes the message image creation processing procedure RT1J based on the subject "recommend dubbing".

According to such a message image creation processing procedure RT1J, the digital recording apparatus 1 creates the message image Pi2 corresponding to the subject "recommend dubbing".

The host microcomputer 2 displays the message image Pi2 based on the subject "recommend dubbing" created in this way in a predetermined display area 31 of the content list table screen 30 shown in FIG. 2. Consequently, the host microcomputer 2 can cause the user to recognize that every-time recorded contents, series of which have ended, are present and can urge the user to dub the every-time recorded contents.

Figure 24:
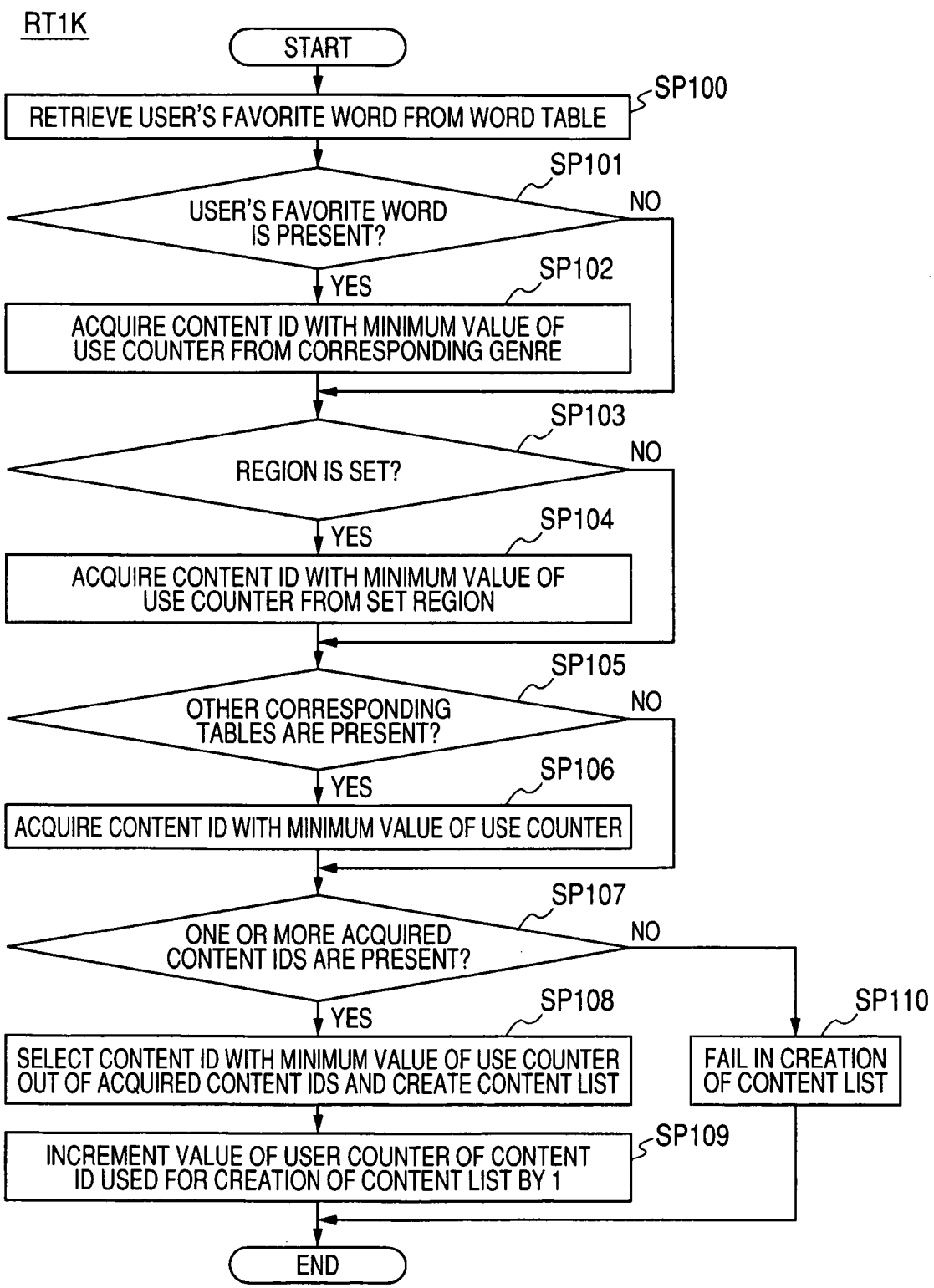
FIG. 24 is a flowchart showing a content list creation processing procedure based on a subject "one word material"

A procedure of content list creation processing based on the subject "one word material" is explained in detail with reference to a flowchart shown in FIG. 24. The content list creation processing based on the subject "one word material" is processing for selecting text contents corresponding to "one word material" and creating a content list. The host microcomputer 2 starts a content list creation processing procedure RT1K based on the subject "one word material" in step SP1 of the startup processing procedure RT1 and shifts to step SP100.

In step SP100, the host microcomputer 2 retrieves, on the basis of user operation for contents, a taste word (i.e., a taste word representing a taste of the user actually using the digital recording apparatus 1) stored in the HDD 4 from a word table Tb5 shown in FIG. 25.

In the word table Tb5, plural words are classified by genre and registered in advance. For each of genres, one or more text contents are registered together with IDs of the respective text contents (hereinafter also referred to as content IDs) and a use counter indicating the number of times the respective text contents are used for creation of a content list. Each of the text contents registered in the taste word table Tb5 is equivalent to "one word material".

The taste word table Tb5 shown in FIG. 25 is an example indicating that words "baseball", "Ijiro", "bat", "swimming", "volleyball", and the like are classified into a genre "sports" and registered and text contents "0", "1", "2", and the like with content IDs "0", "1", "2", and the like are registered with respect to the genre "sports" together with values of the use counter "2", "2", "1", and the like for the respective text contents, and words "piano", "guitar", "rock", "classical music", "Kareyon", and the like are classified into a genre "music" and registered and text contents "5", "6", "7", and the like with content IDs "5", "6", "7", and the like are registered with respect to the genre "music" together with values of the use counter "0", "0", "0", and the like for the respective text contents.

The host microcomputer 2 retrieves a taste word from such a word table Tb5. After finishing such retrieval, the host microcomputer 2 shifts to the next step SP101. In step SP101, the host microcomputer 2 judges whether a taste word is obtained from the word table Tb5 as a result of the retrieval in the preceding step SP100.

When an affirmative result is obtained in step SP101, this means that a word same as the taste word is present in the word table Tb5. The host microcomputer 2 shifts to step SP102. In step SP102, the host microcomputer 2 acquires a content ID of a minimum value of the use counter among text contents associated with a genre, to which the word same as the taste word belongs, from the word table Tb5 and shifts to the next step SP103.

The host microcomputer 2 selects text contents corresponding to the taste word, i.e., "one word material" matching the taste of the user from the word table Tb5.

On the other hand, when a negative result is obtained in step SP101, this means that word same as the taste word is not present in the word table Tb5. The host microcomputer 2 shifts to step SP103 without acquiring a content ID from the taste word table Tb5.

In step SP103, the host microcomputer 2 judges whether a region is set in the digital recording apparatus 1. Practically, in the digital recording apparatus 1, prefecture regions such as Akita-ken, Tokyo-to, and Kanagawa-ken can be set by the user as regions where the digital recording apparatus 1 is used. The host microcomputer 2 judges whether such a prefecture region is set as a region.

When an affirmative result is obtained in step SP103, i.e., when it is judged that a region is set in the digital recording apparatus 1, the host microcomputer 2 shifts to step SP104. In step SP104, the host microcomputer 2 acquires content IDS of text contents associated with the region set in the digital recording apparatus 1 from a region table Tb6 shown in FIG. 26, which is created in the HDD 4.

In the region table Tb6 in this case, forty seven prefectures from Hokkaido to Okinawa are registered as regions. One or more text contents are registered for each of the regions together with IDs (content IDs) and values of the use counter for the respective text contents.

The region table Tb6 shown in FIG. 26 is an example indicating that text contents "0", "1", "2", and "3" with content IDs "0", "1", "2", and "3" are registered with respect to the region "Hokkaido" together with values of the use counter "2", "2", "1", and "1" for the respective text contents and text contents "4" and "5" with content IDs "4" and "5" are registered with respect to the region "Aomori" together with values of the use counter "0" and "0" for the respective text contents.

The host microcomputer 2 acquires a content ID with a minimum value of the use counter among the text contents associated with the region set in the digital recording apparatus 1 from such a region table Tb6 and shifts to the next step SP105.

In this way, the host microcomputer 2 selects text contents corresponding to the region set in the digital recording apparatus 1, i.e., "one word material" matching the region of the user.

On the other hand, when a negative result is obtained in step SP103, this means that a region is not set in the digital recording apparatus 1. The host microcomputer 2 shifts to step SP105 without acquiring a content ID from the region table Tb6.

In step SP105, if there is a table (not shown) in which text contents, IDs of the text contents, and values of the use counter for the text contents are registered in association with predetermined information other than the taste word table Tb5 and the region table Tb6, the host microcomputer 2 judges, for example, whether specific information concerning the user of the digital recording apparatus 1 is present in such another table in the same manner as the case of the taste word table Tb5 and the region table Tb6.

When an affirmative result is obtained in step SP105, the host microcomputer 2 shifts to step SP106. In step SP106, the host microcomputer 2 acquires a content ID of text content with a minimum value of the use counter among the text contents associated with the specific information concerning the user of the digital recording apparatus 1 from the another table and shifts to step SP107.

On the other hand, when a negative result is obtained in step SP105, the host microcomputer 2 shifts to step SP107 without acquiring a content ID from the another table.

In step SP107, the host microcomputer 2 judges whether the number of content IDs acquired by the processing up to this point is equal to or larger than one. When an affirmative result is obtained in step SP107, this means that a content ID is acquired at least in one of steps SP102, SP104, and SP106. The host microcomputer 2 shifts to step SP108.

In step SP108, the host microcomputer 2 selects text content with a minimum value of the use counter out of text contents corresponding to the acquired one or more content IDs, creates a content list, and shifts to the next step SP109. In step SP109, the host microcomputer 2 increments a value of the use counter of the text content used for creation of the content list (i.e., the text content with a minimum value of the use counter among the text contents corresponding to the acquired content IDs) by one and finishes the content list creation processing procedure RT1K based on the subject "one word material".

In this way, the host microcomputer 2 creates, as a content list based on the subject "one word material", a content list including text contents with small numbers of times of use for creation of a content list among text contents matching the taste and the region of the user.

On the other hand, when a negative result is obtained in step SP107, i.e., when no content ID is acquired, the host microcomputer 2 shifts to step SP110. The host microcomputer 2 judges that the host microcomputer 2 has failed in creation of a content list and finishes the content list creation processing procedure RT1K based on the subject "one word material".

According to such a content list creation processing procedure RT1K, the digital recording apparatus 1 creates a content list corresponding to the subject "one word material".

The host microcomputer 2 displays one text content (e.g., text content at the top in the list, i.e., text content with a smallest number of times of use for creation of the list) among the text contents, which are included in the content list based on the subject "one word material" created in this way, in the fixed display area 31Z of the content list table screen 30 shown in FIG. 2. Consequently, the host microcomputer 2 can provide the user with information matching the taste and the region of the user.

A procedure of content list creation processing based on the subject "trend keyword" is explained. The content list creation processing based on the subject "trend keyword" is processing for extracting keywords corresponding to "trend keyword" from EPG information and creating a content list. First, the specific structure of the EPG information is explained and, then, the procedure of the content list creation processing is explained.

The EPG information includes, as shown in FIG. 27, data for a predetermined broadcast schedule period (in this embodiment, eight days). For example, EPG information delivered on the day (N day) includes eight data, i.e., data N+1 of the following day, data N+2 of two days later, . . . , and data N+7 of seven days later (these data are also referred to as day data). Each of these eight day data includes program information of respective program contents scheduled to be broadcasted on the day from respective broadcasting stations.

Figure 28:
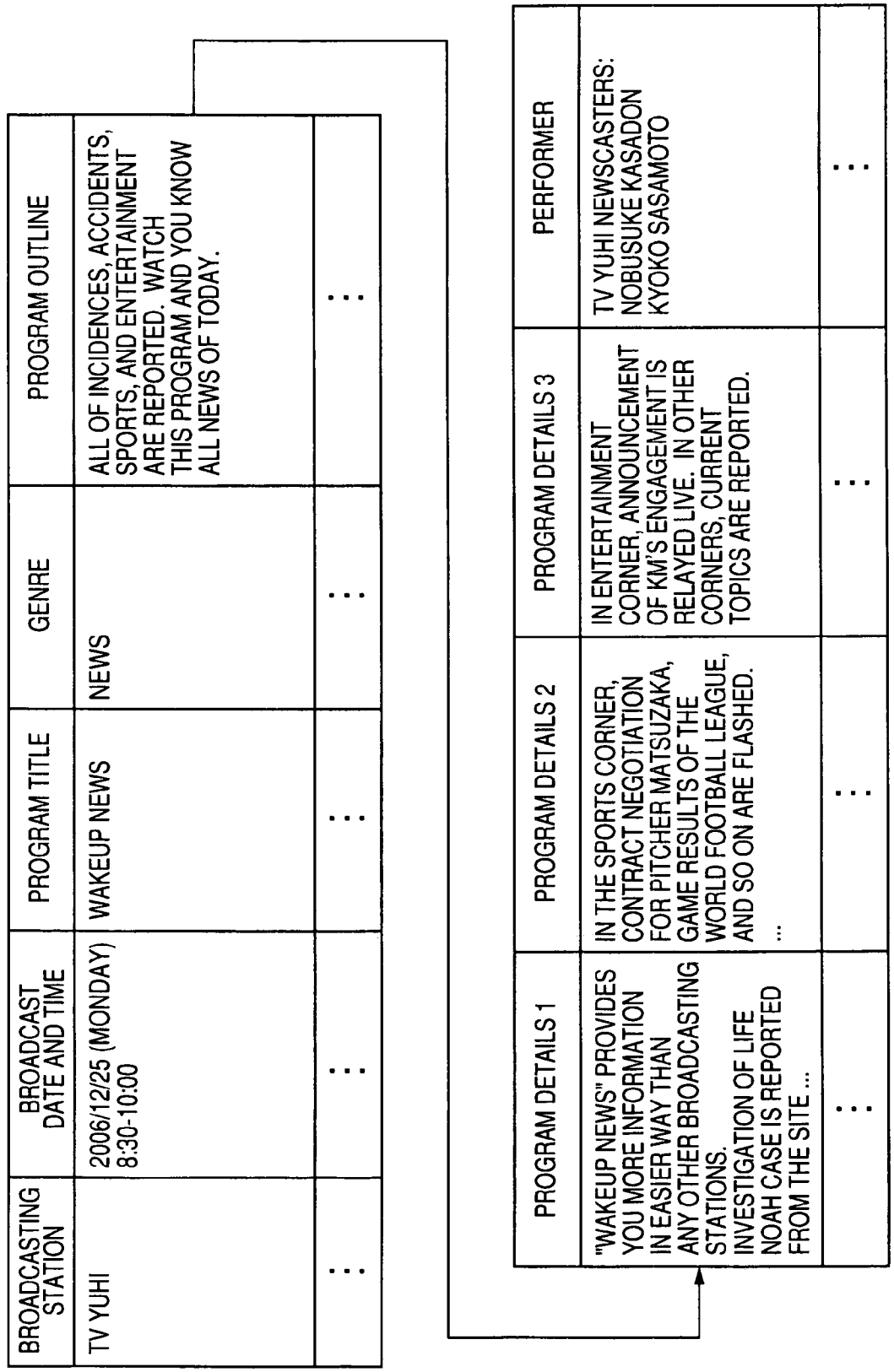
FIG. 28 is a schematic diagram showing the structure (2) of EPG information.

Each piece of the program information includes, as shown in FIG. 28, a broadcasting station that broadcast the program content, a broadcasting date and time when the program content is broadcasted, a program title of the program content, a genre of the program content, a program outline of the program content, program details (a program detail 1, a program detail 2, and a program detail 3) of the program content, and a performer.

The program information shown in FIG. 28 is an example indicating that, for a program title "Wakeup News" broadcasted at 8:30 to 10:00 on Monday, Dec. 15, 2006 in a broadcasting station "TV Yuhi", the genre is "news", the program outline is "all of incidences, accidents, sports, and entertainment are reported", the program detail 1 is "'Wakeup News' provides you more information in easier way than any other broadcasting stations", the program detail 2 is "in the sports corner, contract negotiation for the pitcher Matsuzaka . . . ", and the program detail 3 is "in the entertainment corner, announcement of KM's engagement is relayed live. In other . . . ", and the performer is "TV Yuhi newscasters: Nobusuke Kasadon and Kyoko Sasamoto".

Figure 29:
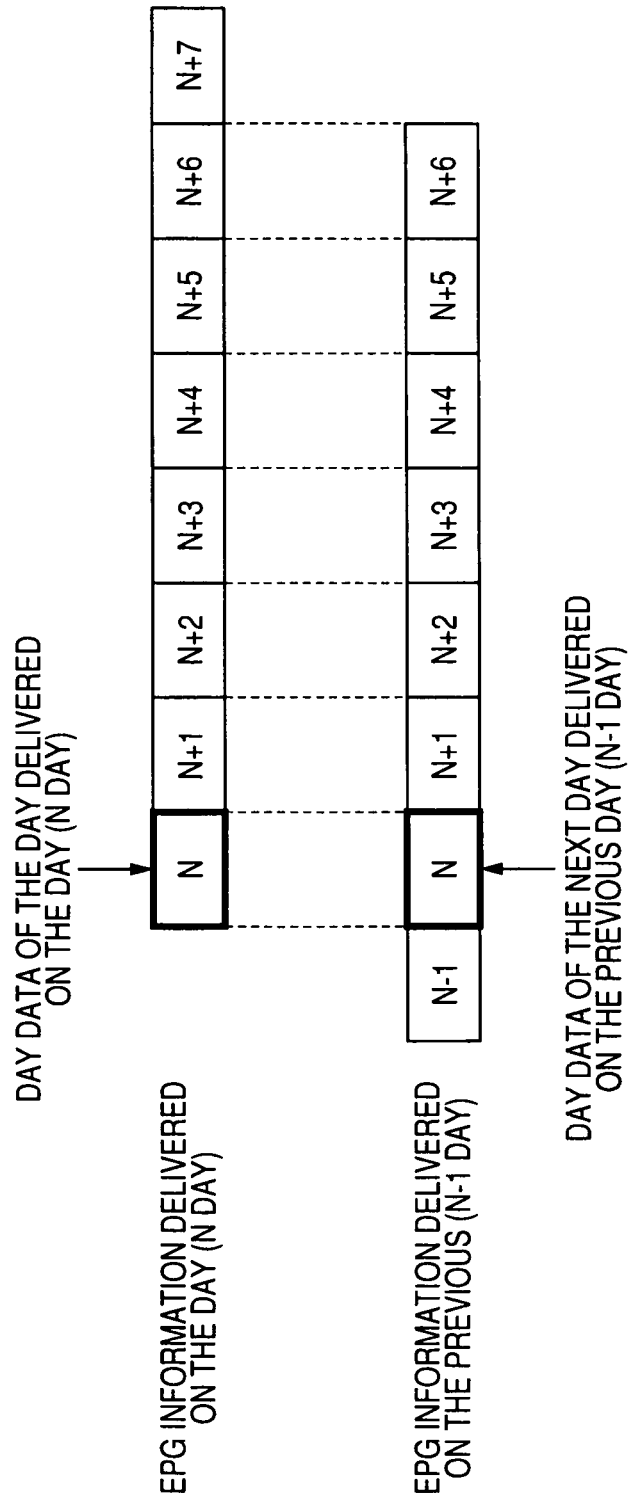
FIG. 29 is a schematic diagram for explanation of EPG information stored by a digital recording apparatus.

The digital recording apparatus 1 stores, as shown in FIG. 29, not only the EPG information delivered on the day (N day) but also the EPG information delivered on the previous day (N−1 day) in order to calculate PF-IDayF described later. In the memory 25, day data N, N+1, N+2, . . . , and N+7 delivered on the day (N day) and day data N−1, N, N+1, . . . , and N+6 delivered on the previous day (N−1 day) are stored. For example, as the day data N of the day, two day data, i.e., the day data N of the day delivered on the day (N day) and the day data N of the following day delivered on the previous day (N−1 day) are present.

Figure 30:
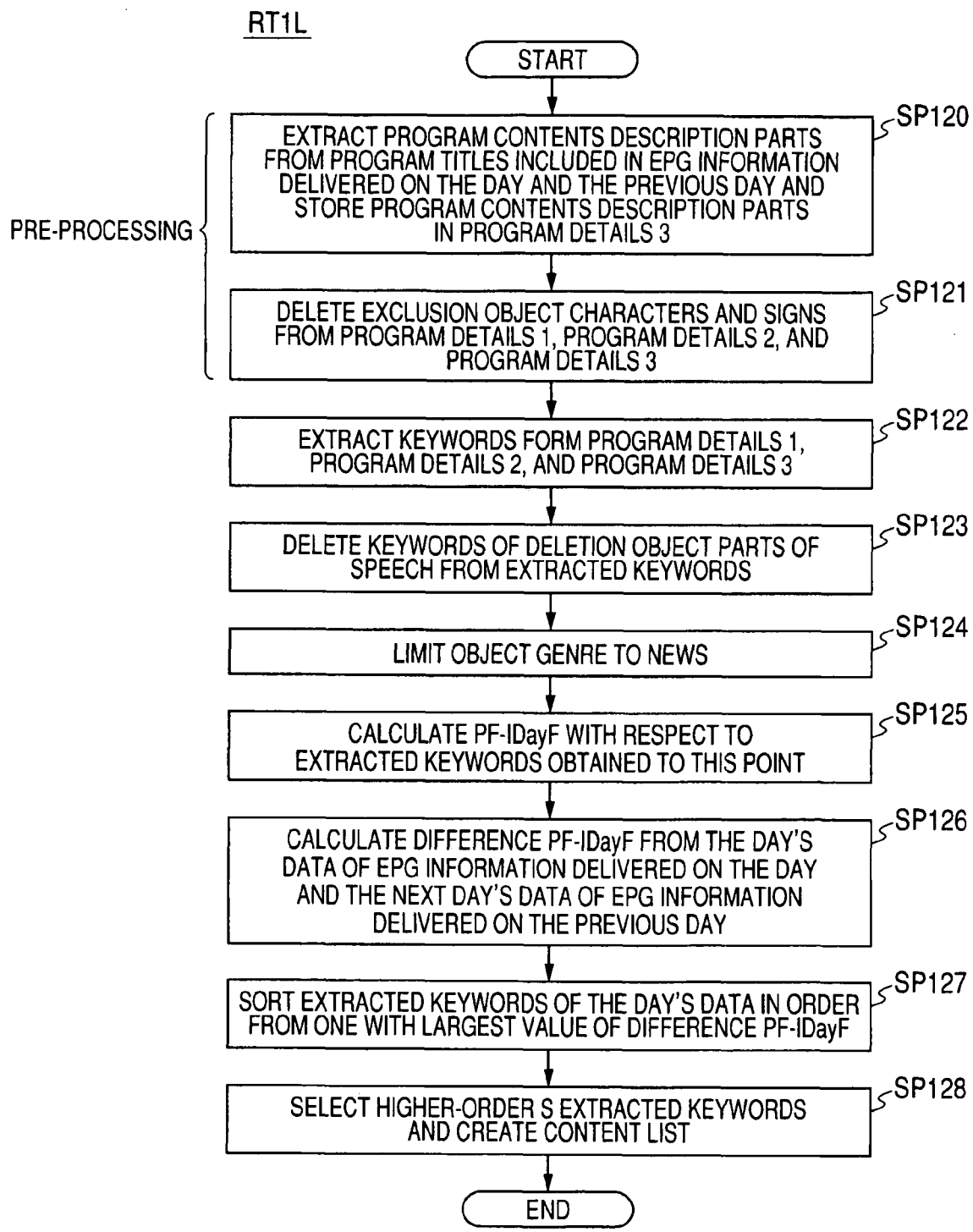
FIG. 30 is a flowchart showing a content list creation processing procedure based on a subject "trend keyword"

On the premise of such a situation, the procedure of the content list creation processing based on the subject "trend keyword" is explained with reference to a flowchart shown in FIG. 30. The host microcomputer 2 starts a content list creation processing procedure RT1L based on the subject "trend keyword" in step SP1 of the startup processing procedure RT1 and shifts to step SP120.

In step SP120, the host microcomputer 2 extracts program content description parts from program titles of respective pieces of program information included in EPG information delivered on the day and EPG information delivered on the previous day and stores the program content description parts in the program detail 3 of the respective pieces of program information. Practically, in some case, in the program titles included in the program information, program content of the program "Increasing Working Poor" is described in addition to a title of program content "Documentary Special" in such a manner as "Documentary SpecialVIncreasing Working Poor". Parts other than the title are divided and extracted with specific characters and signs (e.g., "V" and "•") as boundaries and stored in the program detail 3 separately.

After finishing the extraction of the program content description parts in this way, the host microcomputer 2 shifts to the next step SP121. In step SP121, the host microcomputer 2 deletes exclusion object characters and signs from the program detail 1, the program detail 2, and the program detail 3 of the respective pieces of program information. This processing in step SP121 is processing for appropriately extracting keywords from the program detail 1, the program detail 2, and the program detail 3. For example, the host microcomputer 2 deletes characters and signs such as "V", "!", and "•••" from the program detail 1, the program detail 2, and the program detail 3.

The processing up to this point, i.e., the processing in steps SP120 and SP121 is pre-processing performed before actually extracting keywords from EPG information. After finishing such pre-processing, the host microcomputer 2 shifts to the next step SP122.

In step SP122, the host microcomputer 2 extracts keywords from the program detail 1, the program detail 2, and the program detail 3 of the respective pieces of program information and shifts to the next step SP123. Specifically, the host microcomputer 2 subjects text data of the program detail 1, the program detail 2, and the program detail 3 to morphological analysis using, for example, predetermined dictionary data to thereby extract keywords in units of parts of speech from the text data.

In step SP123, the host microcomputer 2 deletes, among the keywords extracted from the text data (hereinafter also referred to as extracted keywords), the extracted keywords of deletion object parts of speech and shifts to the next step SP124. In this case, for example, with parts of speech other than nouns set as deletion objects, the extracted keywords of the parts of speech other than nouns are deleted.

In step SP124, the host microcomputer 2 limits the extracted keywords remaining without being deleted to the extracted keywords extracted from program information with the genre "news" and shifts to the next step SP125. Practically, since the extracted keywords that can be "trend word"

are often included in program information of news programs, in this embodiment, the genre is limited to "news".

In step SP125, in order to select the extracted keywords of current topics that can be "trend keyword" out of the extracted keywords obtained by the processing up to this point, i.e., the extracted keywords extracted from the program detail 1, the program detail 2, and the program detail 3 of the program information with the genre "news", first, the host microcomputer 2 collates the extracted keywords for each of day data and, then, calculates PF-IDayF for the respective extracted keywords collated for each of the day data.

PF-IDayF is calculated to "evaluate keywords often appearing concentratedly on one day (i.e., keywords of current topics) high among data for a predetermined number of days (eight days) of EPG information delivered at a time" using a general idea of TF-IDF used in extracting keywords from plural documents, i.e., an idea that "keywords frequently appearing only in a small number of documents in a document set are evaluated high".

Specifically, when the number of times of appearance of a certain keyword in a certain document is represented as TF (Term Frequency), the number of documents in which the keyword appears is represented as DF (Document Frequency), and a total number of documents is represented as N, TF-IDF for the keyword is calculated by the following formula (2).

$$TF - IDF = TF \times \left( \log\left(\frac{N}{DF}\right) + 1 \right) \quad (2)$$

On the other hand, when the number of program contents in which a certain extracted keyword appears in data of a certain day of EPG information is represented as PF (Program Frequency), the number of days in which the extracted keyword appears in a processing object period (here, eight days that is a broadcast schedule period for program information included in EPG information delivered at a time) is represented as DayF (Day Frequency), and the number of days of the processing object period is represented as "n" (here, "8"), PF-IDayF for the extracted keyword is calculated by the following formula (3).

$$PF - IDayF = PF \times \left( \log\left(\frac{n}{DayF}\right) + 1 \right) \quad (3)$$

As described above, PF-IDayF is obtained by replacing, on the basis of the idea of TF-IDF, TF (the number of times of appearance of a certain keyword in a certain document) of TD-IDF with PF (the number of program contents in which a certain extracted keyword appears in data of a certain day of EPG information), replacing DF (the number of documents in which the keyword appears) of TF-IDF with DayF (the number of days in which the extracted keywords appears in a pressing object period (here, 8 days)), and replacing N (a total number of documents) of TF-IDF with "n" (the number of days of the processing object period (here, "8")).

Consequently, PF-IDayF takes a value with which "keywords of current topics often appearing concentratedly on one day are evaluated high among data for eight days of EPG information delivered at a time". In other words, PF-IDayF takes a value with which "even if keywords often appear concentratedly in data for eight days of EPG information delivered at a time (i.e., a value of PF is high), when the keywords appear almost everyday (i.e., mere keywords for introducing programs), the keywords are evaluated low because the keywords appears almost everyday (i.e., a value of log(n/DayF)+1 is small)".

Figure 31:
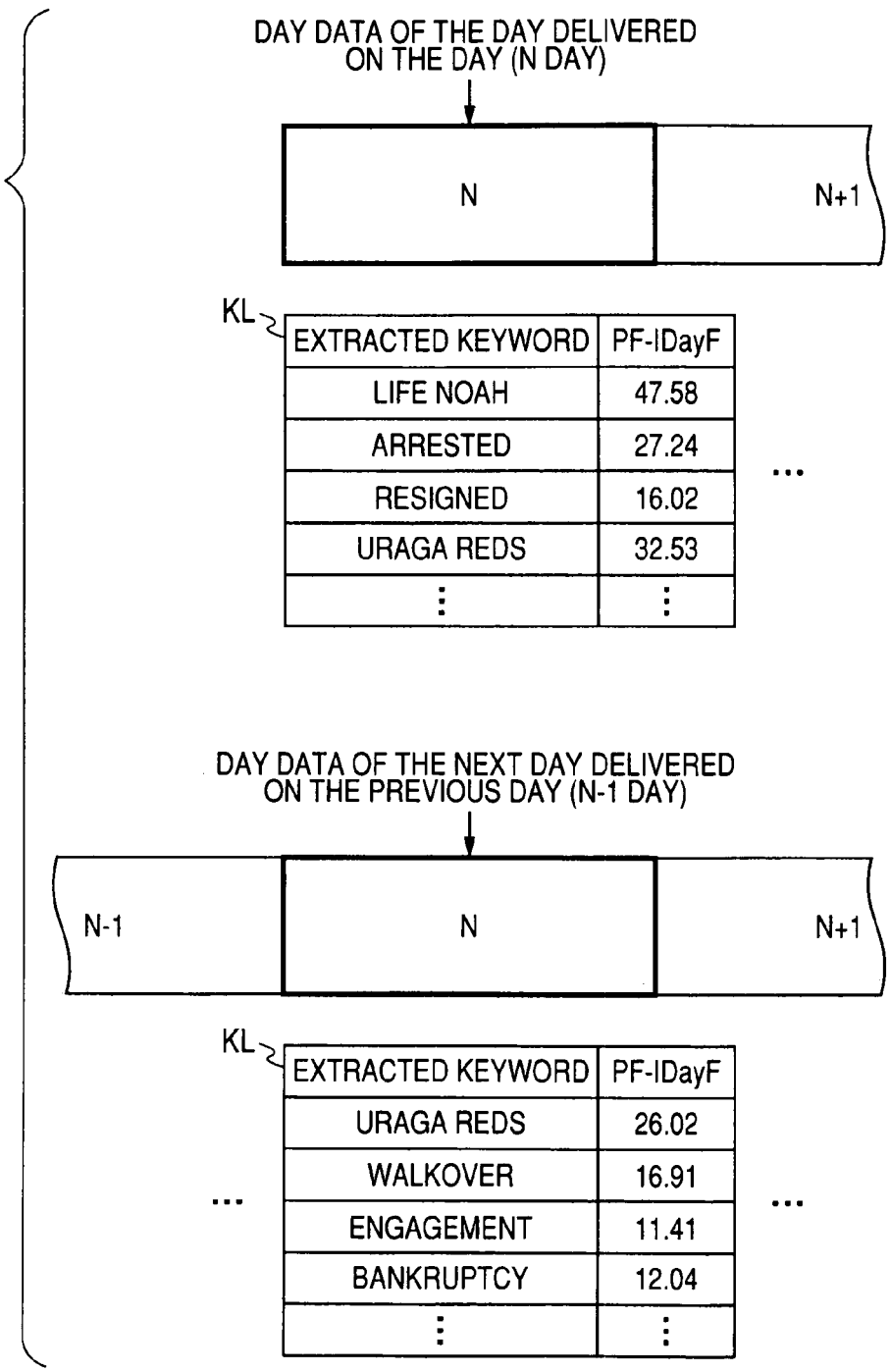
FIG. 31 is a schematic diagram showing the structure of an extracted keyword list.

In other words, the host microcomputer 2 calculates PF-IDayF for the respective extracted keywords collated for each of the day data to thereby weight each of the extracted keywords such that "keywords of current topics often appearing concentratedly on one day are evaluated high among data for eight days of EPG information delivered at a time". Further, on the basis of a result of the calculation, as shown in FIG. 31, the host microcomputer 2 creates an extracted keyword list KL, in which extracted keywords and values of PF-IDayF of the extracted keywords are associated with each other, for each day data of EPG information delivered on the day (N day) and for each day data of EPG information delivered on the previous day (N−1 day).

As a result, for example, concerning the extracted keyword list KL for the day data N of the day, the extracted keyword list KL for the day data N of the day delivered on the day (N day) and the extracted keyword list KL for the day data N of the following day delivered on the previous day (N−1 day) are created. The day data N of the day delivered on the day (N day) is newer than the day data N of the following day delivered on the previous day (N−1 day). In the day data N of the day, for example, information of current topics such as program contents of news programs is updated. Therefore, the extracted keyword list KL for the day data N of the day included in EPG information delivered on the day (N day) and the extracted keyword list KL for the day data N of the following day included in EPG information delivered on the previous day (N−1 day) are lists of the same day but include different contents.

After finishing calculating PF-IDayF for the respective extracted keywords collated for each of the day data (i.e., finishing creating the extracted keyword list KL), the host microcomputer 2 shifts to the next step SP126. In step SP126, the host microcomputer 2 calculates differences PF-IDayF for the respective extracted keywords extracted from the day data N of the day included in the EPG information delivered on the day (N day) (i.e., extracted keyword described in the extracted keyword list KL for the day data N of the day).

The difference PF-IDayF is a value for solving a problem of PF-IDayF described above to make it possible to more accurately select extracted keywords of current topics as "trend keyword". The problem of PF-IDayF is as described below. Usually, PF-IDayF takes a value with which "keywords often appearing concentratedly on one day are evaluated high among data for eight days of EPG information delivered at a time". However, since a value of log(n/DayF)+1 for an extracted keyword appearing only in one day is about "1.90" and a value of log(n/DayF)+1 for an extracted keyword appearing everyday (eight days) is "1", for example, if a value of PF of the extracted keyword appearing everyday is about twice as large as a value of PF of the extracted keyword appearing only in one day, a value of PF-IDayF of the extracted keyword appearing everyday is larger than a value of PF-IDayF of the extracted keyword appearing only in one day. As a result, evaluation of the extracted keyword appearing everyday is higher than that of the extracted keyword appearing only in one day.

This problem can occur when a value of PF of a specific extracted keyword is extremely high, i.e., a large number of identical keywords are included in data of the same day of EPG information.

Specifically, for example, when an identical news program is broadcasted in plural channels at the same time of day or when a news program of about several minutes by an identical newscaster is broadcasted plural times in the same day, a value of PF of an extracted keyword for program introduction (e.g., a newscaster name or a name of a corner in the program) extracted from program information of the news program of this type is extremely high. As a result, evaluation of the extracted keyword for program introduction is higher than an extracted keyword of current topics.

Therefore, in this embodiment, the host microcomputer 2 calculates, for each of extracted keywords extracted from the day data N of the day included in the EPG information delivered on the day (N day), on the basis of two ideas described below, the difference PF-IDayF that is a difference between a value of PF-IDayF in the day data N of the day included in the EPG information delivered on the day (N day) and a value of PF-IDayF in the day data N of the following day included in the EPG information delivered on the previous day (N−1 day). One idea is that "since a keyword of current topics often appears in EPG information only on the day, a value of PF-IDayF in the EPG information delivered on the day is high but a value of PF-IDayF in the EPG information delivered on the previous day is low. The other idea is that "since a keyword for program introduction appears the same in the EPG information delivered on the previous day and the EPG information delivered on the day, both a value of PF-IDayF in the EPG information delivered on the day and a value of PF-IDayF in the EPG information delivered on the previous day are high".

Specifically, when PF-IDayF in the day data N of the day included in the EPG information delivered on the day (N day) of a certain extracted keyword is represented as PF-IDayF(N) and PF-IDayF in the day data N of the following day included in the EPG information delivered on the previous day (N−1 day) of the extracted keyword is represented as PF-IDayF(N−1), a difference PF-IDayF for the extracted keyword is calculated by the following formula (4).

$$PF\text{-}IDayF = PF\text{-}IDayF(N) - PF\text{-}IDayF(N-1) \land \land \qquad (4)$$

As described above, the difference PF-IDayF is a difference between a value of PF-IDayF in the day data N of the day included in the EPG information delivered on the day of a certain extracted keyword and a value of PF-IDayF in the day data N of the following day included in the EPG information delivered on the previous day of the extracted keyword. Therefore, when the extracted keyword is an extracted keyword of current topics, a value of the difference PF-IDayF is large. When the extracted keyword is an extracted keyword for program introduction, a value of the difference PF-IDayF is small. In other words, the difference PF-IDayF takes a value with which "extracted keywords of current topics often appearing concentratedly on the day are evaluated high" regardless of whether a large number of identical keywords are included in data of the day of EPG information.

In other words, the host microcomputer 2 calculates differences PF-IDayF for the respective extracted keywords extracted from the day data N of the day included in the EPG information delivered on the day (N day) to thereby weight each of the extracted keywords such that "keywords of current topics often appearing concentratedly on the day are evaluated high". Consequently, the host microcomputer 2 can accurately select extracted keywords of current topics as "trend keyword". In calculating the difference PF-IDayF, the host microcomputer 2 calculates the difference PF-IDayF using, for example, the extracted keyword list KL for the day data N of the day included in the EPG information delivered on the day (N day) and the extracted keyword list KL for the day data N of the following data included in the EPG information delivered on the previous day (N−1 day) shown in FIG. 31.

After finishing calculating the difference PF-IDayF of each of the extracted keywords extracted from the day data N of the data included in the EPG information delivered on the day (N day), the host microcomputer 2 shifts to the next step SP127.

In step SP127, the host microcomputer 2 sorts the extracted keywords extracted from the day data N of the day included in the EPG information delivered on the day (N day) in order from one with a largest value of the difference PF-IDayF and shifts to the next step SP128. In step SP128, the host microcomputer 2 selects higher-order S (S is an integer) extracted keywords (i.e., extracted keywords highly likely to be current topics) out of the sorted extracted keywords and creates a content list. Then, the host microcomputer 2 finishes the content creation processing procedure RT1L based on the subject "trend keyword".

In this way, the host microcomputer 2 creates, as a content list based on the subject "trend keyword", a content list including extracted keywords with large values of the differences PF-IDayF (extracted keywords highly likely to be current topics) among the extracted keywords extracted from the day data N of the day included in the EPG information delivered on the day (N day).

According to such a content list creation processing procedure RT1L, the digital recording apparatus 1 creates a content list corresponding to the subject "trend keyword".

The host microcomputer 2 displays one extracted keyword (e.g., an extracted keyword at the top in the list, i.e., an extracted keyword with a largest value of the difference PF-IDayF) among the extracted keywords, which are included in the content list based on the subject "trend keyword" created in this way, in a predetermined display area 31 of the content list table screen 30 shown in FIG. 2. Consequently, the host microcomputer 2 can provide the user with keywords representing a present trend.

A procedure of content list creation processing based on the subject "news of topics" is explained with reference to a flowchart shown in FIG. 32. The content list creation processing based on the subject "news of topics" is processing for extracting sentences corresponding to "news of topics" from EPG information and creating a content list.

The host microcomputer 2 starts a content list creation processing procedure RT1M based on the subject "news of topics" in step SP1 of the startup processing procedure RT1 and shifts to step SP130. In step SP130, the host microcomputer 2 performs processing same as the processing in steps SP120 to SP126 of the content list creation processing procedure RT1L based on the subject "trend keyword" to thereby calculate differences PF-IDayF of the respective extracted keywords extracted from the day data N of the day included in the EPG information delivered on the day (N day) and shifts to the next step SP131.

In step SP131, the host microcomputer 2 selects an extracted keyword with a largest difference PF-IDayF (i.e., a keyword currently most talked about" out of the extracted keywords extracted from the day data N of the day included in the EPG information delivered on the day (N day) and shifts to the next step SP132.

In step SP132, the host microcomputer 2 extracts sentences including the extracted keyword selected in step SP132 (i.e., the extracted keyword with a largest difference PF-IDayF) from, for example, program information with a genre "news" of the day data N of the day included in the EPG information delivered on the day (N day) and shifts to the next step SP133.

In step SP133, in order to select, out of the sentences extracted from the program information (hereinafter also referred to as extracted sentence), an extracted sentence represented as "news of topics" (hereinafter referred to as representative sentence), the host microcomputer 2 calculates representative values Rep for the respective extracted sentence.

Specifically, when the number of extracted sentences in which respective keywords forming a certain sentence appear is represented as PF, a total number of extracted sentences is represented as N, and a number obtained by subtracting the number of keywords appearing in all the extracted sentences from a total number of the keywords forming the extracted sentence is represented as M, a representative value Rep for the extracted sentence is calculated according to the following formula (5):

$$Rep = \frac{1}{M} \sum_j \frac{PF_j}{N} \quad (5)$$

(j is a total number of keywords forming a certain extracted sentence; PF/N is not included in a sum when PF=N).

An example of calculation of the representative value Rep is specifically explained with reference to FIG. 33. For example, "Life Noah" is selected as an extracted keyword with a largest difference PF-IDayF. Further, eight sentences in which "Life Noah" is included, i.e., "Life Noah investigation situation", "suspect Horimo of Life Noah resigned president", "sudden arrest of suspect Horimo, Life Noah President, gives large shock to the political world", "series: shock of Life Noah/track of reckless behaviors", "how will future of life Noah be as a result of resignation of President Horimo?", "future of management of Life Noah, how that will be?", "details of Life Noah case", and "Life Noah shock! What the hero of the day Horimo was?" are extracted as extracted sentences.

First, the host microcomputer 2 extracts keywords from the respective eight extracted sentences. For example, keywords "Life Noah", "investigation", and "situation" are extracted from the extracted sentence "Life Noah investigation situation". Keywords "Life Noah", "Horimo", "Suspect", "president", and "resigned" are extracted from the extracted sentence "suspect Horimo of Life Noah resigned president". Similarly, keywords are extracted from the respective extracted sentences "sudden arrest of suspect Horimo, Life Noah President, gives large shock to the political world", "series: shock of Life Noah/track of reckless behaviors", "how will future of life Noah be as a result of resignation of President Horimo?", "future of management of Life Noah, how that will be?", "details of Life Noah case", and "Life Noah shock! What the hero of the day Horimo was?"

Subsequently, the host microcomputer 2 calculates PF/N for the respective keywords extracted from the respective extracted sentences (the extracted keywords). However, the host microcomputer 2 does not calculate PF/N for "Life Noah", which is the extracted keyword appearing in all the extracted sentences (i.e., the extracted keyword for which PF=N). As a result, for example, a value of PF/N for the extracted keyword "investigation" extracted from the extracted sentence "Life Noah investigation situation" is "1/8" because the extracted keyword "investigation" appears only in the extracted sentence "Life Noah investigation situation". A value of PF/N for the extracted keyword "situation" extracted from the same extracted sentence "Life Noah investigation situation" is "1/8" because the extracted keyword "situation" appears only in the extracted sentence "Life Noah investigation situation".

A value of PF/N for the extracted keyword "Horimo" extracted from the extracted sentence "suspect Horimo of Life Noah resigned president" is "4/8" because the extracted keyword "Horimo" appears in the four extracted sentences in total "suspect Horimo of Life Noah resigned president", "sudden arrest of suspect Horimo, Life Noah President, gives large shock to the political world", "how will future of life Noah be as a result of resignation of President Horimo?", and "Life Noah shock! What the hero of the day Horimo was?". A value of PF/N for the extracted keyword "suspect" extracted from the same extracted sentence "suspect Horimo of Life Noah resigned president" is "2/8" because the extracted keyword "suspect" appears in the two extracted sentence in total "suspect Horimo of Life Noah resigned president" and "sudden arrest of suspect Horimo, Life Noah President, gives large shock to the political world". A value of PF/N for the extracted keyword "president" extracted from the same extracted sentence "suspect Horimo of Life Noah resigned president" is "3/8" because the extracted keyword "president" appears in the three extracted sentences in total "suspect Horimo of Life Noah resigned president", "sudden arrest of suspect Horimo, Life Noah President, gives large shock to the political world", and "how will future of life Noah be as a result of resignation of President Horimo?". A value of PF/N for the extracted keyword "resigned" extracted from the same sentence "suspect Horimo of Life Noah resigned president" is "1/8" because the extracted keyword "resigned" appears only in the extracted sentence "suspect Horimo of Life Noah resigned president".

Similarly, values of PF/N for the respective extracted keywords extracted from the other extracted sentences are calculated.

After finishing calculating PF/N for the respective keywords extracted from the respective extracted sentences (the extracted sentences), the host microcomputer 2 calculates representative values Rep for the respective extracted sentences using values of PF/N.

As a result, for example, a representative value Rep of the extracted sentence "Life Noah investigation situation" is a value "2/16", i.e., "0.125" obtained by multiplying "2/8", which is a sum of the value of PF/N "1/8" for the extracted keyword "investigation" and the value of PF/N "1/8" for the extracted keyword "situation", with a value "1/2", which is a value of 1/M (M is the number of extracted keywords excluding "Life Noah").

A representative value Rep of the extracted sentence "suspect Horimo of Life Noah resigned president" is a value "10/32", i.e., "0.3125", obtained by multiplying "10/8", which is a sum of the value of PF/N "4/8" for the extracted keyword "Horimo", the value of PF/N "2/8" for the extracted keyword "suspect", the value of PF/N "3/8" for the extracted keyword "president", and the value of PF/N "1/8" for the extracted keyword "resigned", with a value "1/4" of 1/M.

Similarly, a representative value Rep of the extracted sentence "sudden arrest of suspect Horimo, Life Noah President, gives large shock to the political world" is "0.2083", a representative value Rep of the extracted sentence "series: shock of Life Noah/track of reckless behaviors" is "0.125", a representative value Rep of "how will future of life Noah be as a result of resignation of President Horimo?" is "0.28125", a representative value Rep of "future of management of Life Noah, how that will be?" is "0", a representative value Rep of "details of Life Noah case" is "0.125", and a representative value Rep of "Life Noah shock! What the hero of the day Horimo was?" is "0.28175".

As it is evident from this example of calculation, a value of the representative value Rep is higher for an extracted sentence including a smaller number of keywords and including keywords appearing in a larger number of extracted sentences. In other words, it can be said that an extracted sentence with a higher value of the representative value Rep is an extracted sentence plainly representing contents of plural extracted sentences (i.e., an extracted sentence representing plural extracted sentences).

The host microcomputer 2 calculates representative values Rep of the respective extracted sentences to thereby weight the respective extracted sentences such that "evaluation of an extracted sentence plainly representing contents of plural extracted sentence is high". Consequently, the host microcomputer 2 can accurately select a representative sentence as "news of topics".

After finishing calculating the representative values Rep for the respective extracted sentences in this way, the host microcomputer 2 shifts to the next step SP134. In step SP134, the host microcomputer 2 selects the extracted sentence with a largest representative value Rep out of the extracted sentences, determines the extracted sentence as a representative sentence as "news of topics", and shifts to the next step SP135. In the case of the example of calculation described above, the host microcomputer 2 determines the extracted sentence "suspect Horimo of Life Noah resigned president" with the highest representative value Rep "0.3125" as a representative sentence representing the eight extracted sentences.

In step SP135, the host microcomputer 2 judges whether an extracted keyword that does not appear in the extracted sentences extracted by the processing up to this point (e.g., the eight extracted sentences) and has a second largest difference PF-IDayF following the extracted keyword selected in step SP131 is present.

When an affirmative result is obtained in step SP135, this means that an extracted keyword that does not appear in the extracted sentences extracted by the processing up to this point and has a second largest difference PF-IDayF following the extracted keyword selected in step SP131 is present. The host microcomputer 2 selects the extracted keyword, returns to step SP132, and extracts sentences including the selected extracted keyword.

In this way, the host microcomputer 2 repeats the processing in steps SP132 to SP134 until a negative result is obtained in step SP135, i.e., an extracted keyword that does not appear in the extracted sentences extracted by the processing up to that point and has a second largest difference PF-IDayF following the extracted keyword selected in step SP131 is not present.

After obtaining one or more representative sentences and obtaining a negative result is obtained in step SP135, the host microcomputer 2 shifts to step SP136. In step SP136, the host microcomputer 2 sorts the representative sentences in order from one with a largest value of the difference PF-IDayF of the extracted keywords used in extracting the representative sentences and shifts to the next step SP137. In step SP137, the host microcomputer 2 selects higher-order H (H is an integer) representative sentences out of the sorted representative sentences and creates a content list. Then, the host microcomputer 2 finishes the content creation processing procedure RT1M based on the subject "news of topics".

In this way, the host microcomputer 2 creates, as a content list based on the subject "news of topics", a content list including extracted sentences with largest values of representative values Rep (i.e., representative sentences) of extracted sentences including extracted key words with large values of the differences PF-IDayF.

According to such a content list creation processing procedure RT1M, the digital recording apparatus 1 creates a content list corresponding to the subject "news of topics".

The host microcomputer 2 displays one extracted sentence (e.g., an extracted sentence at the top in the list, i.e., an extracted sentence including an extracted keyword with a largest value of the difference PF-IDayF) among the extracted sentences, which are included in the content list based on the subject "news of topics" created in this way, in a predetermined display area 31 of the content list table screen 30 shown in FIG. 2. Consequently, the host microcomputer 2 can provide the user with current news of topics.

A procedure of content list creation processing based on the subject "today's movie" is explained with reference to a flowchart shown in FIG. 34. The content list creation processing based on the subject "today's movie" is processing for selecting program information corresponding to "today's movie" from EPG information and creating a content list.

A host microcomputer 2 starts a content list creation processing procedure RT1N based on the subject "today's movie" in step SP1 of the startup processing procedure RT1 and shifts to step SP140. In step SP140, the host microcomputer 2 performs processing (pre-processing) same as the processing in steps SP120 and SP121 of the content list creation processing procedure RT1L based on the subject "trend keyword" and shifts to the next step SP141.

In step SP141, the host microcomputer 2 extracts keywords from the program detail 1, the program detail 2, and the program detail 3 of respective pieces of program information and shifts to the next step SP142. Specifically, the host microcomputer 2 subjects text data of the program detail 1, the program detail 2, and the program detail 3 to morphological analysis to thereby extract keywords in units of parts of speech from the text data.

In step SP142, the host microcomputer 2 deletes, among the keywords extracted from the text data (extracted keywords), the extracted keywords of deletion object parts of speech and shifts to the next step SP143. In this case, for example, with parts of speech other than nouns set as deletion objects, the extracted keywords of the parts of speech other than nouns are deleted.

In step SP143, the host microcomputer 2 limits the extracted keywords remaining without being deleted to the extracted keywords extracted from program information with the genre "movie" and shifts to the next step SP144.

In step SP144, the host microcomputer 2 specifies, for each of the pieces of program information with the genre "movie", extracted keywords plainly representing characteristics of movie contents identified by the program information (hereinafter referred to as movie characteristic keywords) out of the extracted keywords extracted from the respective pieces of program information.

Practically, in detail information 1, detailed information 2, and detailed information 3 of the program information of the movie contents, keywords (e.g., "horror", "adolescence romance", "documentary work", and "first appearance on terrestrial broadcast") plainly representing characteristics such as genres, contents, and climaxes of the movie contents are often included. If it is possible to present such keywords to the user as movie characteristics, it is possible to easily cause the user to recognize the characteristics of the movie contents and cause the user take interest in the movie contents.

Therefore, the host microcomputer 2 specifies, for each of the pieces of program information with the genre "movie", movie characteristic keywords out of the extracted keywords extracted from the respective pieces of program information.

Specifically, the host microcomputer 2 retrieves the extracted keywords, which are extracted from the respective pieces of program information with the genre "movie", from a movie characteristic keyword table Tb7 shown in FIG. 35, which is created in the HDD 4.

In the move characteristic keyword table Tb7, plural movie characteristic keywords are classified by characteristics such as a movie genre, movie content, and a climax and registered in advance. The movie characteristic keywords classified into the movie genre are further finely classified into single genres such as "action" and "horror", composite genres such as "action horror" and "car action", and other genres.

The movie characteristic keyword table Tb7 shown in FIG. 35 is an example in which movie characteristic keywords "action", "horror", "fantasy", and the like are classified into the single genres of the movie genre and registered, movie characteristic keywords "action horror" "car action", "adolescence romance", "Japanese animation", "60'th action", "70'th animation", and the like are classified into the composite genres of the movie genre and registered, movie characteristic keywords "Hong Kong movie", "love story", "Western", and the like are classified into the other genres of the movie genre and registered, movie characteristic keywords "animated", "social", "remake", and the like are classified into the movie content and registered, and movie characteristic keywords "car chase", "full CG", "costar", and the like are classified into the climax and registered.

The host microcomputer 2 retrieves the extracted keywords extracted from the respective pieces of program information with the genre "movie" from such a movie characteristic keyword table Tb7. When the extracted keywords are obtained by the movie characteristic keyword table Tb7 as a result of the retrieval, movie characteristic keywords same as the extracted keywords are registered in the movie characteristic keyword table Tb7. Therefore, the host microcomputer 2 specifies that the extracted keywords are movie characteristic keywords.

After specifying, for each of the pieces of program information with the genre "movie", the movie characteristic keywords out of the extracted from the respective pieces of program information, the host microcomputer 2 shifts to the next step SP145. In step SP145, the host microcomputer 2 gives the specified movie characteristic keywords to the program information, from which the movie characteristic keywords are obtained, as movie characteristics and shifts to the next step SP146. Consequently, in the respective pieces of program information with the genre "movie", movie characteristics plainly representing characteristics of movie contents plainly identified by the program information are added.

In step SP146, the host microcomputer 2 selects program information included in day data N of the day of EPG information (i.e., program information of movie contents broadcasted today), sorts the selected pieces of program information in order from one with highest preference, and shifts to the next step SP147.

In step SP147, the host microcomputer 2 selects higher-order T (T is an integer) pieces of program information out of the sorted pieces of program information and creates a content list. Then, the host microcomputer 2 finishes the content list creation processing procedure RT1N based on the subject "today's movie".

In this way, the host microcomputer 2 creates, as a content list based on the subject "today's movie", a content list including pieces of program information with high preference among the pieces of program information included in the day data N of the day of the EPG information, having the genre "movie", and given with the movie characteristics.

According to such a content list creation processing procedure RT1N, the digital recording apparatus 1 creates a content list corresponding to the subject "today's movie".

The host microcomputer 2 displays one pieces of program information (e.g., a piece of program information at the top in the list, i.e., a piece of program information with highest preference) among the pieces of program information, which are included in the content list based on the subject "today's movie" created in this way, in a predetermined display area 31 of the content list table screen 30 shown in FIG. 2. In this case, the host microcomputer 2 displays a program title, movie characteristics, and a program outline in the one piece of program information.

As described above, in displaying program information of movie contents, the host microcomputer 2 extracts movie characteristic keywords plainly representing characteristics such as a genre, content, and a climax from the program information and displays the movie characteristic keywords as movie characteristics together with program titles and program outlines rather than simply displaying the program information as it is. Consequently, the host microcomputer 2 can easily cause the user to recognize characteristics of the movie contents and cause the user to take interest in the movie contents.

In accordance with the content list creation processing procedure explained above, the host microcomputer 2 creates content lists on the basis of the various subjects "recommended event program", "title not viewed yet", "title viewed halfway", "title often viewed", "title set with a bookmark", "last year's photograph", "recommend album creation", "recommend dubbing", "one word material", "trend keyword", "news of topics", and "today's movie" set in the digital recording apparatus 1 in advance.

The host microcomputer 2 displays content lists selected out of the content lists created in this way as a table on the content list table screen 30.

Consequently, the digital recording apparatus 1 can provide, via one screen, the user with plural pieces of information attractive for the user such as information concerning what kinds of recorded contents are present, what kinds of program contents are broadcasted, and what are keywords of interest.

The host microcomputer 2 creates, according to procedures realized by changing a part of processing contents of the content list creation processing procedures, content lists for subjects "newly arrived recommended title", "new program of interest", and "person in news" other than the subjects for which the content list creation processing procedures are explained.

Specifically, in a content list creation processing procedure based on the subject "newly arrived recommended title", for example, it is sufficient to change the processing in step SP30 of the content list creation processing procedure RT1C based on the subject "title not viewed yet" in such a manner as to set a recording date and time within a predetermined period (e.g., one week) from a present date and time as a retrieval condition for retrieving recorded contents not viewed yet.

In a content list creation processing procedure based on the subject "new program of interest", for example, it is sufficient to omit the processing in steps SP20 to SP22 of the content list creation processing procedure RT1B based on the subject "recommended event program" and change the processing in step SP23 in such a manner as to perform retrieval through EPG information using keywords (e.g., "new", "new program", and "first episode") indicating that program content is a new program instead of using the event keywords.

In a content list creation processing procedure based on the subject "person in news", for example, it is sufficient to change the processing in step SP122 in the content list creation processing procedure RT1L based on the subject "trend keyword" in such a manner as to extract keywords from performers of program information.

(1-4) Functional Structure of the Digital Recording Apparatus

Figure 36:
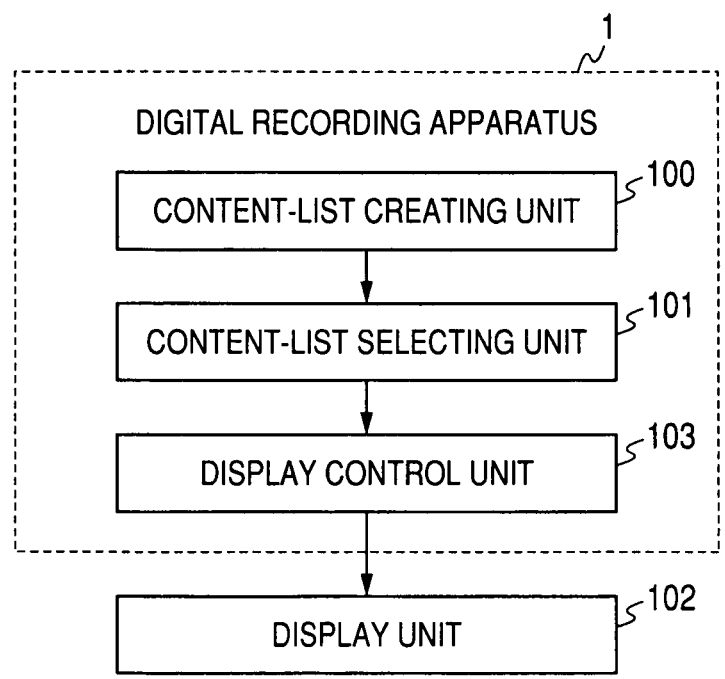
FIG. 36 is a block diagram showing the functional structure of the digital recording apparatus.

The functional structure of the digital recording apparatus 1 having the content list table display function as a main function is explained. As shown in FIG. 36, the digital recording apparatus 1 includes a content-list creating unit 100 that selects contents out of contents treated by the digital recording apparatus 1 (i.e., recorded contents, contents captured from the outside, contents stored in the information processing apparatus in advance, and EPG information) on the basis of a predetermined subject to thereby create a content list, a content-list selecting unit 101 that selects plural content lists to be displayed out of plural content lists created by the content-list creating unit 100 on the basis of contents of the content list and a situation during user operation (i.e., the fluctuation factors and adjustment amounts shown in FIG. 8), and a display control unit 103 that causes a predetermined display unit 102 to display the plural content lists selected by the content-list selecting unit 101.

According to such a functional structure, the digital recording apparatus 1 can realize the content list table display function. The content-list creating unit 100, the content-list selecting unit 101, and the display control unit 103 are, for example, functional units that are realized by the host microcomputer 2, which is a component of a hardware configuration of the digital recording apparatus 1, executing a computer program.

(1-5) Operations and Effects According to the First Embodiment

In the constitution described above, the digital recording apparatus 1 selects information contents (EPG information) concerning program contents scheduled to be broadcasted, still image contents captured from a USB apparatus, and text contents stored in the HDD 4 in advance, contents under conditions defined for respective plural subjects set in the digital recording apparatus 1 in advance to thereby create, for all contents treated by the digital recording apparatus 1 such as recorded program contents (recorded contents), content lists corresponding to the respective plural subjects.

The digital recording apparatus 1 selects plural content lists out of the content lists corresponding to the respective plural subjects on the basis of contents of the content lists and display situations of the content lists at that point. The digital recording apparatus 1 displays the selected plural content lists on the television monitor 22 as the content list table screen 30.

In this way, the digital recording apparatus 1 can present the user with plural content lists, i.e., plural useful content lists selected, on the basis of contents of the content lists and display situations of the content lists at that point, out of the plural content lists created by selecting contents on the basis of the respective plural subjects out of not only program contents but also all contents treated by the digital recording apparatus 1.

The digital recording apparatus 1 stores in advance plural layout patterns of content lists in displaying content lists as a table. Every time when the content lists are displayed as a table, the digital recording apparatus 1 displays content lists as a table according to a layout pattern selected at random out of the stored plural layout patterns.

In this way, the digital recording apparatus 1 can display the content lists as a table in a layout pattern different almost every time. Therefore, the digital recording apparatus 1 can present the content lists such that new feeling is typically obtained without boring the user.

Moreover, in the digital recording apparatus 1, as plural subjects, the various subjects "newly arrived recommended title", "new program of interest", "today's movie", "last year's photograph", "trend keyword", "person in news", "one word material", "recommended event program", "title not viewed yet", "title viewed halfway", "title often viewed", "title set with a bookmark", and "news of topics" for creating content lists desired by the user are set in advance. Therefore, the digital recording apparatus 1 can present the user with content lists desired by the user and useful for the user.

Furthermore, in the digital recording apparatus 1, as plural subjects, the various subjects "recommend album creation" and "recommend dubbing" for creating a message image for urging the user to perform specific operation are set in advance.

The digital recording apparatus 1 can urge the user to perform specific operation via the content list table screen 30 by treating such a message image as a kind of a content list.

In this way, it is possible to improve convenience in treating various contents.

According to the constitution described above, the digital recording apparatus 1 selects information contents (EPG information) concerning program contents scheduled to be broadcasted, still image contents captured from a USB apparatus, and text contents stored in the HDD 4 in advance, contents under conditions defined for various subjects set in the digital recording apparatus 1 in advance to thereby create, for all contents treated by the digital recording apparatus 1 such as recorded program contents (recorded contents), content lists corresponding to the respective various subjects. The digital recording apparatus 1 selects plural content lists to be displayed out of the created plural content lists on the basis of contents of the content lists and display situations of the content lists at that point. The digital recording apparatus 1 displays the selected plural content lists on the television monitor 22 as the content list table screen 30. Therefore, the digital recording apparatus 1 can present the user with plural useful content lists out of the plural content lists including the contents selected on the basis of the various subjects. Consequently, it is possible to improve convenience in treating various contents.

(2) Second Embodiment

A second embodiment of the present invention is described in detail. In the second embodiment, a subject "today's recommended program" different from the subjects explained in the first embodiment is added to the digital recording apparatus 1. The structure of the digital recording apparatus 1, the structure of the content list table screen 30, and the like are the same as those in the first embodiment.

Figure 37:
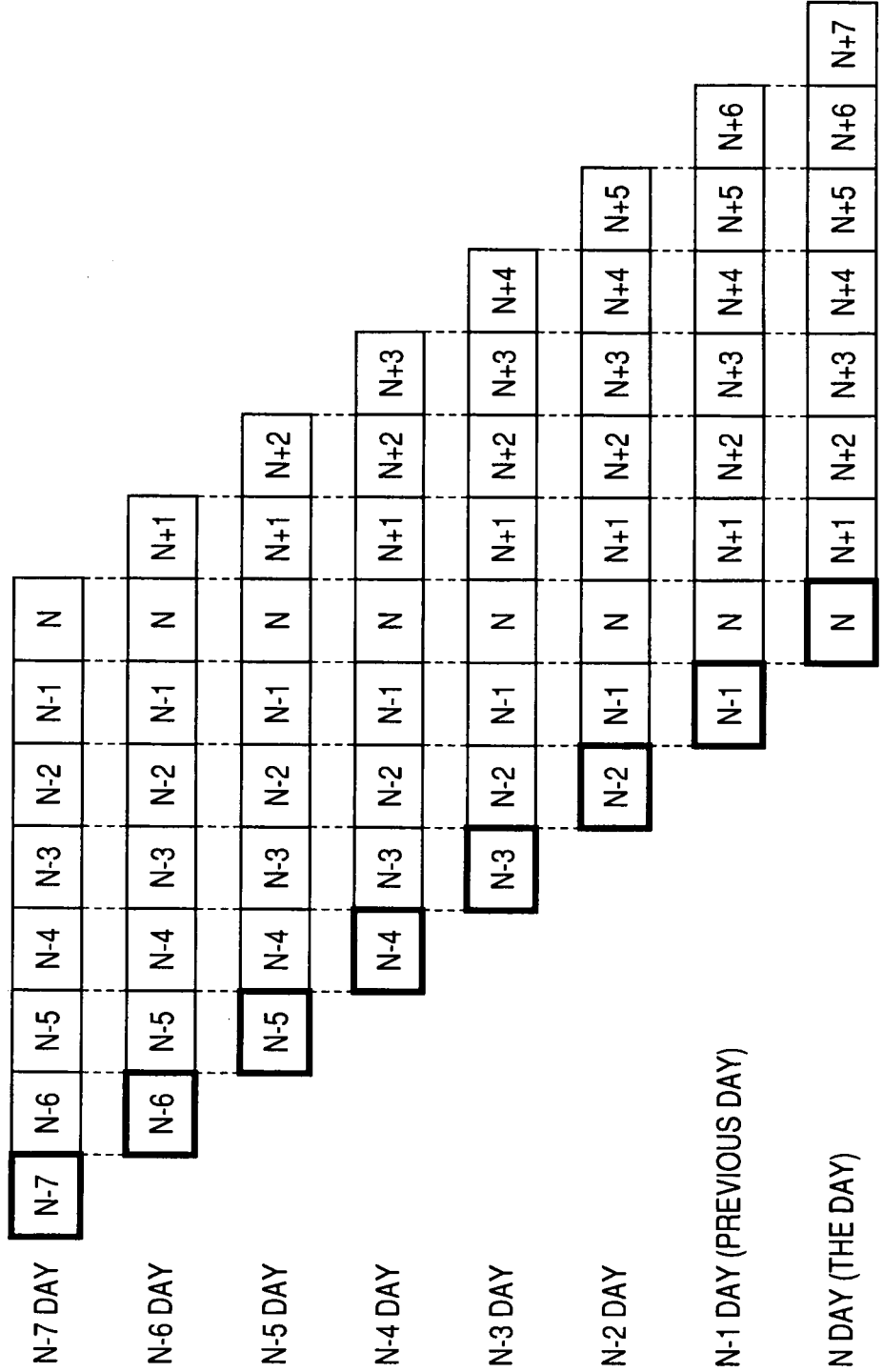
FIG. 37 is a diagram for explanation of EPG information stored by a digital recording apparatus according to a second embodiment of the present invention.

However, the digital recording apparatus 1 according to the second embodiment compares, in creating a content list corresponding to the subject "today's recommended program, program information of program contents broadcasted on the day and program information of the last broadcast of the program contents. Therefore, as shown in FIG. 37, the digital recording apparatus 1 stores not only EPG information delivered on the day (N day) and EPG information delivered on the previous day (N−1) day but also EPG information during the past several days (e.g., eight days). In the memory 25, day data N, N+1, N+2, . . . , and N+7 of EPG information delivered on the day (N day), day data N−1, N, N+1, . . . , and N+6 of EPG information delivered on the previous day (N−1 day), day data N−2, N−1, N, . . . , and N+5 of EPG information delivered on a day two days before the day (N−2 day), day data N−3, N−2, N−1, . . . , and N+4 of EPG information delivered on a day three days before the day (N−3 day), day data N−4, N−3, N−2, . . . , and N+3 of EPG information delivered on a day four days before the day (N−4 day), day data N−5, N−4, N−3, . . . , and N+2 of EPG information delivered on a day five days before the day (N−5 day), day data N−6, N−5, N−4, . . . , and N+1 of EPG information delivered on a day six days before the day (N−6 day), and day data N−7, N−6, N−5, and N of EPG information delivered on a day seven days before the day (N−7 day) are stored.

Figure 38:
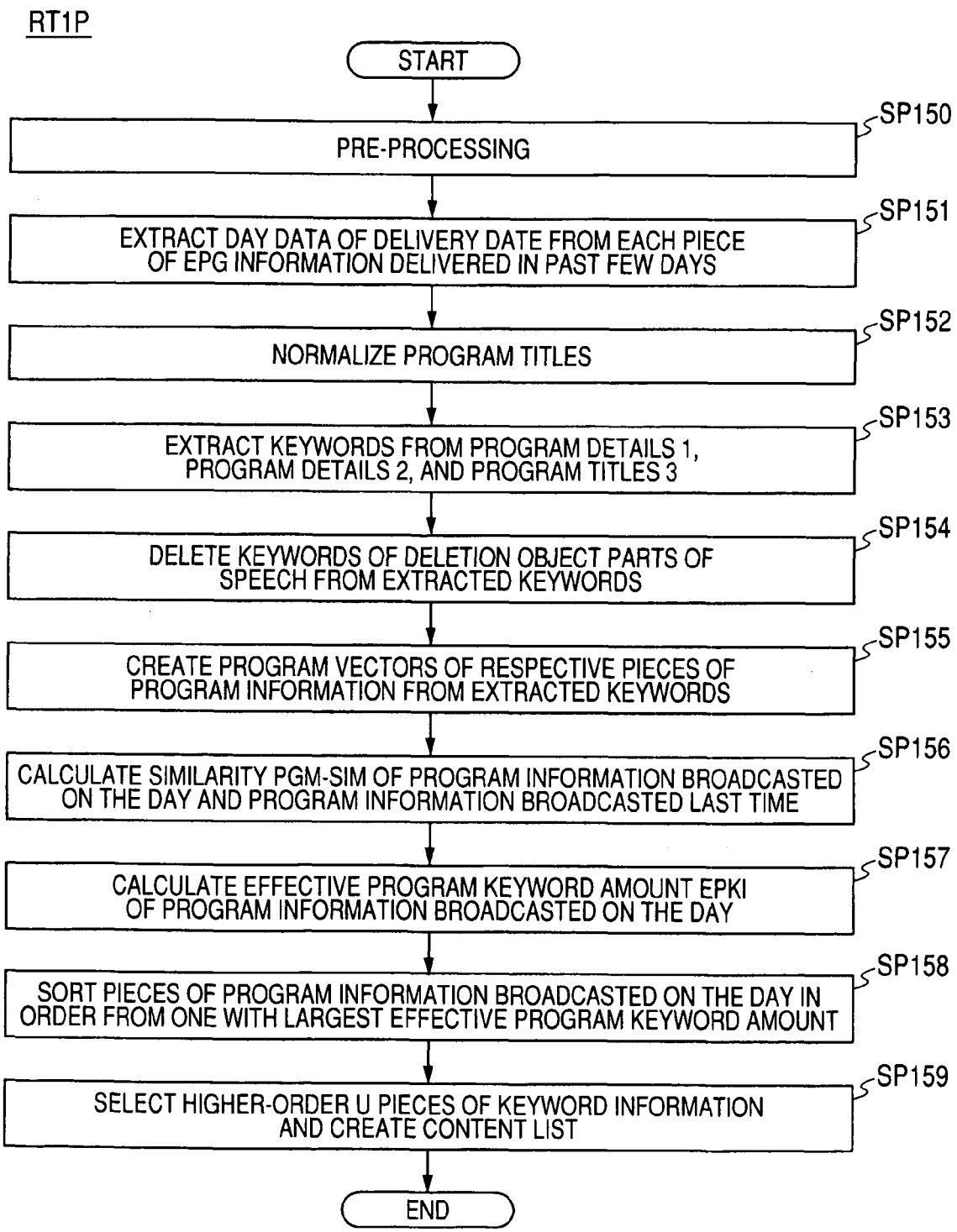
FIG. 38 is a flowchart showing a content list creation processing procedure based on a subject "today's recommended program"

On the premise of such a situation, a procedure of content list creation processing based on the subject "today's recommended program" is explained with reference to a flowchart shown in FIG. 38. The content list creation processing based on the subject "today's recommended program" is processing for selecting program information corresponding to "today's recommended program" from EPG information and creating a content list.

The host microcomputer 2 starts a content list creation processing procedure RT1P based on the subject "today's recommended program" in step SP1 of the startup processing procedure RT1 and shifts to step SP150. In step SP150, the host microcomputer 2 performs processing (pre-processing) same as the processing in steps SP120 and SP121 of the content list creation processing procedure RT1L based on the subject "trend keyword" and shifts to the next step SP151.

In step SP151, the host microcomputer 2 extracts, from respective pieces of EPG information delivered during the past several days (e.g., eight days) stored by the memory 25, day data of the delivery days.

Figure 39:
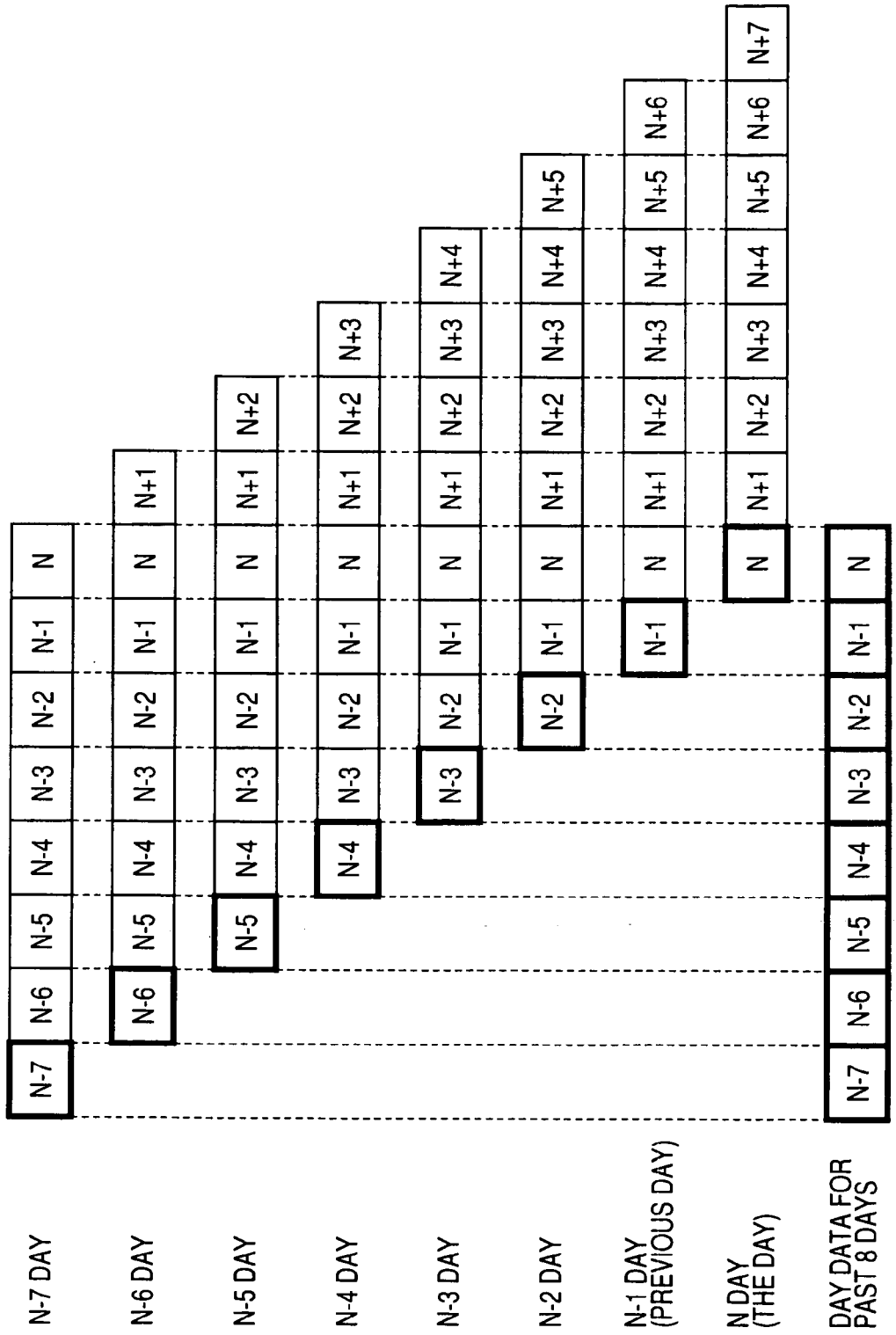
FIG. 39 is a schematic diagram for explanation of extraction of latest day data for the past eight days.

Specifically, as shown in FIG. 39, the host microcomputer 2 extracts, from EPG information delivered on the day (N day), day data N of the delivery day, extracts, from EPG information delivered on the previous day (N−1 day), day data N−1 of the delivery day, extracts, from EPG information delivered on a day two days before the day (N−2 day), day data N−2 of the delivery day, extracts, from EPG information delivered on a day three days before the day (N−3 day), day data N−3 of the delivery day, extracts, from EPG information delivered on a day four days before the day (N−4 day), day data N−4 of the delivery day, extracts, from EPG information delivered on a day five days before the day (N−5 day), day data N−5 of the delivery day, extracts, from EPG information delivered on a day six days before the day (N−6 day), and extracts, from EPG information delivered on a day seven days before the day (N−7 day), day data N−7 of the delivery day.

As a result, latest day data among the day data N−7 of a day seven days before the day, latest day data among the day data N−6 of a day six days before the day, latest day data among the day data N−5 of a day five days before the day, latest day data among the day data N−4 of a day four days before the day, latest day data among the day data N−3 of a day three days before the day, latest day data among the day data N−2 of a day two days before the day, latest day data among the day data N−1 of a day one day before the day, and latest day data among the day data of the day stored by the memory 25 are obtained. In other words, latest day data are obtained as the day data N−7, N−6, N−5, . . . , and N for the past eight days.

The host microcomputer 2 extracts the day data N−7, N−6, N−5, . . . , and N for the past eight days in this way and shifts to the next step SP152. In step SP152, the host microcomputer 2 normalizes program titles of program information included in the day data N−7, N−6, N−5, . . . , and N for the past eight days in order to specify, on the basis of the program titles, program information of the last broadcast of program contents broadcasted on the day.

Specifically, for example, the host microcomputer 2 removes apart "•Episode 13" other than a title of program content from a program title "First Propose • Episode 13" and uniformalizes characters of the title as full size characters to thereby normalize the program titles.

After finishing normalizing the program titles, the host microcomputer 2 shifts to the next step SP153. In step SP153, the host microcomputer 2 extracts keywords from the program details 1, the program details 2, and the program details 3 of the respective pieces of program information and shifts to the next step SP154.

In step SP154, the host microcomputer 2 deletes, among the extracted keywords, the extracted keywords of deletion object parts of speech and shifts to the next step SP155. In this case, for example, with parts of speech other than nouns set as deletion objects, the extracted keywords of the parts of speech other than nouns are deleted.

In step SP155, the host microcomputer 2 generates, for each of the pieces of program information included in the day data N−7, N−6, N−5, . . . , and N for the past eight days, program vectors on the basis of the keywords extracted from the respective pieces of program information and shifts to the next step SP156. In step SP156, the host microcomputer 2 calculates, for each of the pieces of program information of the program contents broadcasted on the day (i.e., the program information included in the day data N), similarity PGM-SIM between the program information of the program contents and program information of the last broadcast of the program contents.

Specifically, the similarity PGM-SIM is a cosine scale of a program vector obtained from the program information of the program contents broadcasted on the day and a program vector obtained from the program information of the last broadcast of the program contents. When the program vector obtained from the program information of the program contents broadcasted on the day is represented as x(n) and the program vector obtained from the program information of the last broadcast of the program contents is represented as x(n−1), the similarity PGM-SIM is calculated by the following formula (6):

$$PGM - SIM = \frac{x(n) \cdot x(n-1)}{\|x(n)\| \cdot \|x(n-1)\|} \quad (6)$$

(0≤PGM-SIM≤1; when the similarity PGM-SIM is 0, both the pieces of program information are completely different, when the similarity PGM-SIM is 1, both pieces of program information completely coincide with each other).

The program information of the last broadcast of the program contents broadcasted on the day is assumed to be, among program information having program titles (normalized) same as those of the program information of the program contents broadcasted on the day, the program information closest to the program information of the program contents broadcasted on the day. The program vector x(n) of the program information of the program contents broadcasted on the day and the program vector x(n−1) of the program information of the last broadcast of the program contents are represented as described below.

It is assumed that extracted keywords extracted from the program information of broadcast on the day and the program information of the last broadcast are, for example, seven extracted keywords KwA, KwB, KwC, KwD, KwE, KwF, and KwG. Among the extracted keywords, four extracted keywords KwA, KwB, KwE and KwF are present in the program information of broadcast on the day and five extracted keywords KwC, KwD, KwE, KwF, and KwG are present in the program information of the last broadcast. Then, when present extracted keywords among the seven extracted keywords KwA, KwB, KwC, KwD, KwE, KwF, and KwG are represented as "1" and absent extracted keywords among the extracted keywords are represented as "0", the program vector x(n) of the program information of broadcast on the day is represented as x(n)=(1,1,0,0,1,1,0) and the program vector x(n−1) of the program information of the last broadcast is represented as x(n−1)=(0,0,1,1,1,1,1).

By calculating such similarity PGM-SIM, the host microcomputer 2 can recognize, for example, to which degree program information of program contents broadcasted every week is updated from the program information of the last broadcast.

After finishing calculating the similarity PGM-SIM for each of the pieces of program information of broadcast of today, the host microcomputer 2 shifts to the next step SP157. In step SP157, the host microcomputer 2 calculates, for each of the pieces of program information of broadcast on the day, an effective program keyword amount EPKI (Effective Program Keyword Information).

Specifically, when the number of extracted keywords forming a program vector of certain program information is represented as KF and similarity PGM-SIM with program information of the last broadcast of the program information is used, an effective program key word amount EPKI of the program information is calculated by the following formula (7).

$$EPKI = KF \times (1-PGM\text{-}SIM) \wedge \wedge \qquad (7)$$

As it is evident from this formula, a value of the effective program keyword amount EPKI is larger as the number of keywords forming the program vector is larger and the similarity with the program information of the last broadcast is smaller. In other words, it can be said that program information with a larger value of the effective program keyword amount EPKI is program information in which contents broadcasted this time of program contents are described more in detail, i.e., program information of program contents into which a program production side puts a great deal of effort.

The host microcomputer 2 calculates the effective program keyword amount EPKI for each of the pieces of program information of broadcast on the day to thereby weight the respective pieces of program information of broadcast on the day such that "program information in which contents broadcasted this time are described in detail is evaluated high". Consequently, the host microcomputer 2 can select the program information of the program contents, into which the program production side put a great deal of effort, as "today's recommended program".

After finishing calculating the effective program keyword amount EPKI for each of the pieces of program information of broadcast on the day in this way, the host microcomputer 2 shifts to the next step SP158. In step SP158, the host microcomputer 2 sorts the pieces of program information of broadcast on the day in order from one with a largest value of the effective program keyword amount EPKI and shifts to the next step SP159. In step SP159, the host microcomputer 2 selects higher-order U (U is an integer) pieces of program information out of the sorted pieces of program information of broadcast on the day and creates a content list. Then, the host microcomputer 2 finishes the content list creation processing procedure RT1P based on the subject "today's recommended program".

In this way, the host microcomputer 2 creates, as a content list based on the subject "today's recommended program", a content list including program information with large values of the effective program keyword amount EPKI among the program information of broadcast on the day.

According to such a content list creation processing procedure RT1P, the digital recording apparatus 1 creates a content list corresponding to the subject "today's recommended program".

The host microcomputer 2 displays one piece of program information (e.g., a piece of program information at the top in the list, i.e., apiece of program information with a largest value of the effective program keyword amount EPKI) among the pieces of program information, which are included in the content list based on the subject "today's recommended program" created in this way, in a predetermined display area 31 of the content list table screen 30 shown in FIG. 2. Consequently, the host microcomputer 2 can cause the user to recognize what kinds of program contents are broadcasted as recommended program contents into which the program production side puts a great deal of effort.

In this way, the subject "today's recommended program" is additionally set in the digital recording apparatus 1 according to the second embodiment. The digital recording apparatus 1 creates content lists based on the subject "today's recommended program" together with the other subjects. Therefore, it is possible to further improve convenience in treating various contents.

(3) Third Embodiment

A third embodiment of the present invention is explained in detail. In the third embodiment, the processing performed in step SP1 (FIG. 4) of the startup processing procedure RT1 is different from that in the first embodiment. The structure of the digital recording apparatus 1, the structure of the content list table screen 30, and the like are the same as those in the first embodiment.

Figure 40:
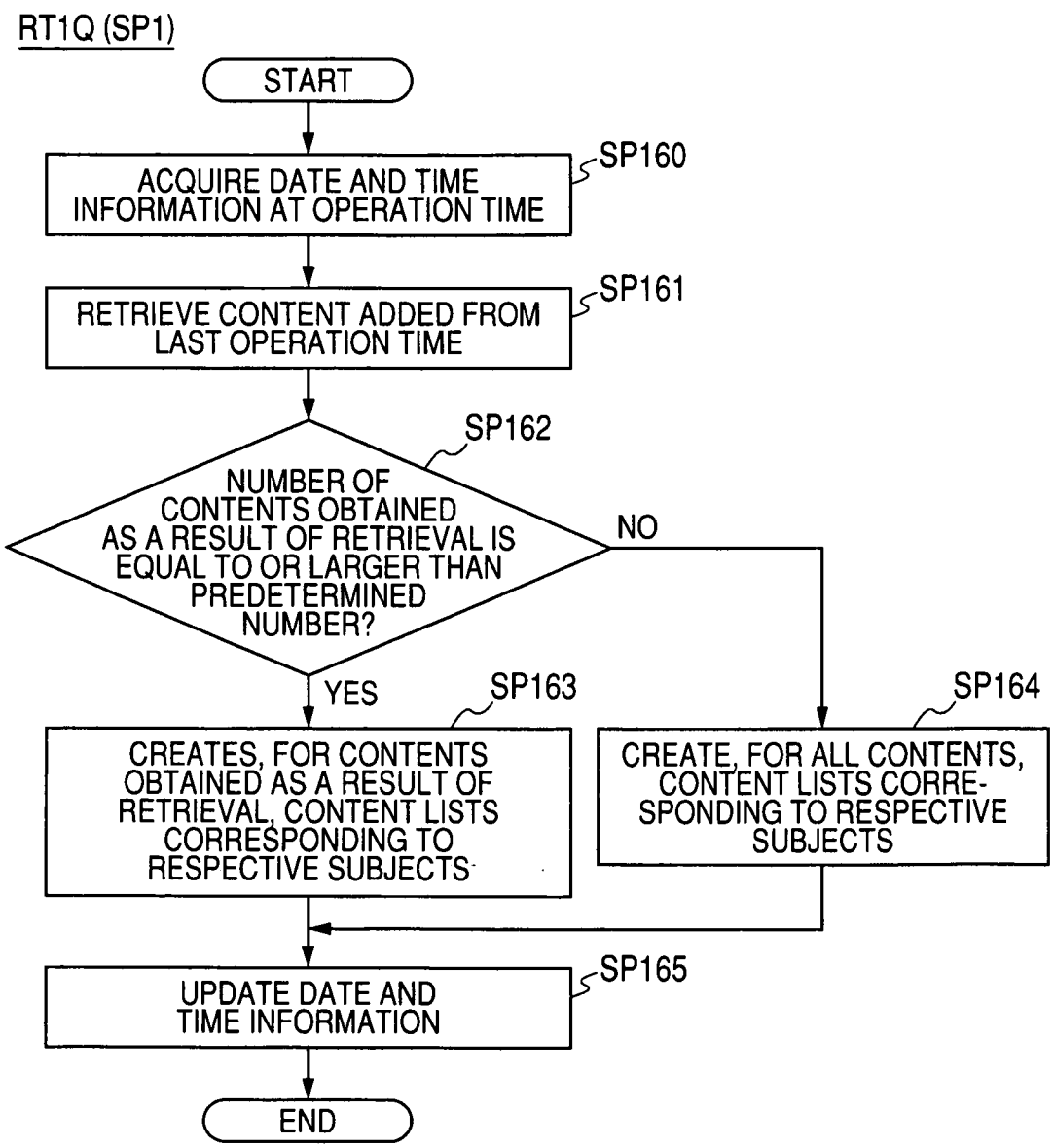
FIG. 40 is a flowchart showing a content list creation processing procedure according to a third embodiment of the present invention.

Therefore, a procedure of content list creation processing performed in step SP1 of the startup processing procedure RT1 is mainly explained with reference to a flowchart shown in FIG. 40.

The host microcomputer 2 starts a content list creation processing procedure RT1Q in step SP1 of the startup processing procedure RT1 and shifts to step SP160. In step SP160, the host microcomputer 2 acquires date and time information indicating an operation date and time when startup operation for the content list table display function is performed this time, i.e., a present date and time from the not-shown timer and shifts to the next step SP161.

In step SP161, the host microcomputer 2 acquires date and time information when startup operation for the content list table display function is performed last time from, for example, the HDD 4. The host microcomputer 2 retrieves, from the HDD 4 and the memory 25 of the digital recording apparatus 1, various contents added anew from a last operation date and time indicated by the date and time information at the last operation time to the operation date and time of this time, and shifts to the next step SP162.

In step SP162, the host microcomputer 2 judges whether the number of various contents obtained as a result of the retrieval is equal to or larger than a predetermined number. When an affirmative result is obtained in step SP162, this means that the number of contents added anew from the last startup of the content list table display function to the present is sufficient for creating content lists corresponding respective plural subjects. The host microcomputer 2 shifts to step SP163.

In step SP163, as explained in the first embodiment, the host microcomputer 2 selects contents under conditions defined for the respective plural subjects set in advance to thereby create, for the contents obtained as a result of the retrieval, content lists corresponding to the respective plural subjects and shifts to the next step SP165.

On the other hand, when a negative result is obtained in step SP162, this means that the number of contents added anew from the last startup of the content list table display function to the present is too small to create content lists corresponding to the respective plural subjects. The host microcomputer 2 shifts to step SP164.

In step SP164, the host microcomputer 2 selects contents under conditions defined for the respective plural subjects set in advance to thereby create, for all the contents recorded in the HDD 4 and the memory 25 of the digital recording apparatus 1, content lists corresponding to the respective plural subjects and shifts to the next step SP165.

In step SP165, the host microcomputer 2 updates the date and time information at the last operation time with the date and time information acquired in step SP160 this time and finishes the content list creation processing procedure RT1Q.

According to such a content list creation processing procedure RT1Q, the digital recording apparatus 1 creates plural content lists corresponding to the respective plural subjects.

In this way, the digital recording apparatus 1 according to the third embodiment creates, when the number of contents added anew from the last startup operation for the content list table display function to the startup operation of this time (i.e., new contents) is sufficient for creating content lists corresponding to the respective plural subjects, a content list based on the respective plural subjects from the contents added anew. Therefore, compared with the creation of content lists from all contents, it is possible to reduce a processing time for the creation of content lists.

In this case, the digital recording apparatus 1 displays content lists including the contents added anew as a table. Therefore, the digital recording apparatus 1 can typically present the user with new content lists. As a result, the digital recording apparatus 1 can cause, without boring the user, the user to recognize what kinds of contents are currently present as new contents among contents treated by the apparatus.

(4) Other Embodiments

In the embodiments described above, one of contents included in content lists is displayed in each of the display areas 31 of the content list table screen 30. However, the present invention is not limited to this. Plural contents among contents included in content lists may be displayed in each of the display areas 31.

In the embodiments, EPG information is recorded in the memory 25 separate from the HDD 4. However, the present invention is not limited to this. The EPG information may be recorded in the HDD 4 or may be downloaded from a server network-connected to the apparatus.

In the embodiments, as a specific example of layout patterns, the four layout patterns shown in FIGS. 6A to 6D are recorded in the HDD 4 in advance. However, the present invention is not limited to this. Other various layout patterns different from the layout patterns A to D may be recorded in the HDD 4. Layout patterns may be acquired from the outside (e.g., downloaded from a server network-connected to the apparatus) and added in the HDD 4. Moreover, sizes and forms of the respective display areas 31 forming layout patterns are not limited. Layout patterns may be formed by the display areas 31 having various sizes and forms.

In the embodiments, one layout pattern is selected at random out of the plural layout patterns A to D in the layout determination processing procedure RT1A. However, the present invention is not limited to this. For example, one layout pattern may be selected at random out of layout patterns other than the layout patterns selected last time or layout patterns may be selected in predetermined order. Layouts may be fixed to one layout pattern or the user may be caused to select a layout pattern.

In the embodiments, when a content list that should be displayed in the display area 31 is not present in step SP15 of the layout determination processing procedure RT1A, a layout pattern is selected again. However, the present invention is not limited to this. When a content list that should be displayed is not present, the layout determination processing procedure RT1A may be finished by reason of an error. When one or more content lists that should be displayed in the display area 31 are present, a layout pattern does not have to be selected again.

In the embodiments, the five fluctuation factors shown in FIG. 8 are set in the digital recording apparatus 1 as fluctuation factors for adjusting display priority parameters for content lists. However, the present invention is not limited to this. For example, various fluctuation factors may be set based on contents of content lists such as "a content list including contents with a large information amount (data amount)" and "a content list including contents recorded during the past several days" and a situation during user operation.

In the embodiments, in the content list creation processing procedure RT1B based on the subject "recommended event program", the event table Tb2 created in the HDD 4 is used. However, the event table Tb2 may be acquired from the outside (e.g., downloaded from a server network-connected to the apparatus) and recorded in the HDD 4. In this case, the event table Tb2 in which event keywords matching a taste of the user are registered may be acquired. In this way, it is possible to provide the user with program contents related to events matching the taste of the user more or typically provide the user with program contents related to latest events.

In the embodiments, in the content list creation processing procedure RT1G based on the subject "last year's photograph", a still image content with a minimum value of the display counter is selected. However, the present invention is not limited to this. For example, higher-order Q still image contents with smaller values of display counter may be selected.

In the message image creation processing procedure RT1H based on the subject "recommend album creation", the message image Pi1 showing a message indicating that the still image contents photographed the predetermined period or more before the present date and time and not subjected to album creation operation yet are present and a message indicating that album creation is recommended is created. However, the present invention is not limited to this. For example, a content list may be created by selecting still image contents photographed the predetermined period or more before the present date and time and not subjected to album creation operation yet are selected as still image contents for which album creation is recommended.

In the embodiments, in the message image creation processing procedure RT1J based on the subject "recommend dubbing", the message image Pi2 showing a message indicating that the series of certain every-time recorded content have ended and a message recommending dubbing of the series are created. However, the present invention is not limited to this. For example, every-time recorded contents, series of which have ended, may be selected as recorded contents for which dubbing is recommended to thereby create a content list.

In the embodiments, in the content list creation processing procedure RT1K based on the subject "one word material", the word table Tb5, the region table Tb6, and the like created in the HDD 4 are used. However, the word table Tb5 and the region table Tb6 may be acquired from the outside (e.g., downloaded from a server network-connected to the apparatus) and recorded in the HDD 4. In this way, it is possible to provide the user with a larger amount of information.

In the embodiments, program information included in EPG information includes the information shown in FIG. 28 (a broadcasting station, a broadcast date and time, a program title, a genre, a program outline, and the like). However, the present invention is not limited to this. Information other than such information may be added to the program information. The information forming the program information is not limited to the information shown in FIG. 28.

In the embodiments, in the content list creation processing procedure RT1L based on the subject "trend keyword", "n" used in the formula for PF-IDayF is set to a value (e.g., "8") corresponding to a broadcast schedule period of program information included in EPG information. However, the present invention is not limited to this. For example, "n" may be set to "5", which is the number of weekdays, or may be set to other values. (log(n/DayF)+1) as a part of the formula for PF-IDayF may be (log(n/DayF)) or may be (log(n/DayF+1)). In short, a value in parentheses only has to be smaller as the number of days in which keywords appear is larger, i.e., a value of DayF is larger.

In the embodiments, in the content list creation processing procedure RT1L based on the subject "trend keyword", a value of the difference PF-IDayF is used. However, the present invention is not limited to this. For example, when a value of PF of a specific extracted keyword does not become extremely large, only a value of PF-IDayF may be used without using (i.e., calculating) a value of the difference PF-IDayF. In this case, for example, the host microcomputer 2 only has to select extracted keywords with large values of PF-IDayF among extracted keywords extracted from the day data N of the day included in EPG information delivered on the day (N day) and create a content list.

In the embodiments, in the content list creation processing procedure RT1N based on the subject "today's movie", the movie characteristic keyword table Tb7 created in the HDD 4 is used. However, the movie characteristic keyword table Tb7 may be acquired from the outside (e.g., downloaded from a server network-connected to the apparatus) and recorded in the HDD 4. In this way, it is possible to update movie characteristic keywords according to a released movie. Not only the movie characteristic keywords but also sentences plainly representing characteristics of movies may be registered in the movie characteristic keyword table Tb7. In this case, when a sentence same as a sentence extracted from program information with the genre "movie" is present in the movie characteristic keyword table Tb7, the host microcomputer 2 only has to give the sentence to the program information, from which the sentence is extracted, as a movie characteristic.

In the embodiments, in the subjects "last year's photograph", "trend keyword", "news of topics", "today's movie", "today's recommended program", and the like, contents as selection objects are limited to those in the last year and today. However, the present invention is not limited to this. Subjects in which contents as selection objects are limited to those in this week and tomorrow such as "last week's photograph", "tomorrow's movie", and "this week's recommended program" may be set.

In the embodiments, in the content list creation processing procedure RT1Q according to the third embodiment, content lists corresponding to plural subjects are created from contents added anew from the last startup operation for the content list table display function to the startup operation of this time. However, the present invention is not limited to this. For example, content lists corresponding to respective plural subjects may be created from contents added anew during the past several days (e.g., the past one week).

In the embodiments, plural subjects are set in the digital recording apparatus 1 in advance. However, the present invention is not limited to this. Programs corresponding to subjects may be acquired from the outside (e.g., downloaded from a server network-connected to the apparatus) and set in the digital recording apparatus 1. In this way, a new subject can be additionally set and a different subject can be easily set for each digital recording apparatus 1. For example, it is assumed that a subject "title scheduled to be deleted" defined to select recorded contents scheduled to be deleted out of recorded contents.

In this case, the host microcomputer 2 selects, on the basis of the subject "title scheduled to be deleted", recorded contents scheduled to be deleted out of the recorded contents recorded in the HDD 4 and creates a content list. If the digital recording apparatus 1 is set to automatically delete, for example, recorded contents recorded a predetermined period (e.g., three months) before a present date and time among recorded contents not protected (not set to be prohibited from deletion), the host microcomputer 2 only has to select recorded contents, a recording date and time of which is nearly the predetermined time before the present date and time, among the recorded contents not protected and creates a content list. If the digital recording apparatus 1 is set to automatically delete, when a capacity of the HDD 4 is insufficient, recorded contents with early recording date and times among the recorded contents not protected, the host microcomputer 2 only has to select recorded contents with early recording date and times among the recorded contents not protected and create a content list.

The host microcomputer 2 displays the content list based on the subject "title scheduled to be deleted" created in this way in the content list table screen 30. Consequently, the host microcomputer 2 can cause the user to recognize what kinds of titles are present as titles about to be automatically deleted.

In the embodiments, in the content list creation processing procedure RT1B based on the subject "recommended event program", a content list is created by selecting program information included in EPG information. However, the present invention is not limited to this. For example, a content list may be created by selecting recorded contents instead of program information. Practically, since program information of recorded contents is added to the recorded contents, it is possible to select recorded contents related to events.

In the content creation processing procedures based on the respective subjects "title not viewed yet", "title viewed halfway", "title often viewed", and "title set with a bookmark", a content list may be created by selecting, for example, moving image contents captured from an external apparatus (a DV apparatus) instead of recorded contents. In this case, for example, the moving image contents captured from the external apparatus (the DV apparatus) only have to be managed by an attribute information table same as the recorded content attribute information table shown in FIG. 14.

As described above, in the content creation processing procedures based on the respective subjects described above, only specific contents are not always selection objects. Contents that can satisfy conditions defined for the respective subjects among contents treated by the digital recording apparatus 1 may be selection objects.

In the embodiments, contents treated by the digital recording apparatus 1 are recorded contents, moving image contents and still image contents captured from an external apparatus, EPG information, and text contents stored in the information processing apparatus in advance. However, the present invention is not limited to this. For example, a music play function and a game function may be provided in the digital recording apparatus 1 and the digital recording apparatus may treat music contents and game contents.

In the embodiments, the present invention is applied to the digital recording apparatus 1. However, the present invention is not limited to this. However, the present invention may be applied to apparatuses such as a personal computer and a game machine as long as the apparatuses are information processing apparatuses that treat various contents. Further, the present invention may be applied to not only the digital recording apparatus 1 that records various contents in the HDD 4 but also digital recording apparatuses that record various contents in recording media such as a BD (Blu-ray Disc), a DVD, and a nonvolatile memory instead of the HDD 4 or in addition to the HDD 4.

In the embodiments, in the content list creation processing procedure RT1L based on the subject "trend keyword", keywords corresponding to "trend keyword" are extracted from program information included in EPG information to create a content list. However, the present invention is not limited to this. Keywords corresponding to "trend keyword" may be extracted from document data other than the program information to create a content list. Specifically, the host microcomputer 2 may acquire, for example, document data (page data) of news webpages present on a network and extract keywords corresponding to "trend keyword" out of the document data to create a content list.

Similarly, in the content list creation processing procedure RT1M based on the subject "news of topics", sentences corresponding to "news of topics" out of document data other than the program information to create a content list. Specifically, the host microcomputer 2 may acquire, for example, document data (page data) of news webpages present on the network and extract sentences corresponding to "news of topics" out of the document data to create a content list.

In this way, it is possible to provide the user with "trend keyword" and "news of topics" extracted from latest news information present on the network.

In the embodiments, the program for executing the respective kinds of processing described above is stored in advance in the not-shown memory or the HDD 4 in the host microcomputer 2. However, the present invention is not limited to this. It is also possible that the program is recorded in a recording medium such as an optical disk, a magnetic disk, or a memory card and the digital recording apparatus 1 reads out the program from the recording medium and install the program in the memory or the HDD 4 in the host microcomputer 2.

The present invention can be widely used in information processing apparatuses that treat various contents such as a personal computer and a DVD recorder.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus having a processor programmed to comprise:

a content-list creator that generates plural content lists for contents in the information processing apparatus, the contents in the information processing apparatus including recorded program contents received through an antenna for a broadcast network, program guide information concerning program contents, contents acquired from a USB apparatus, contents acquired from a digital video terminal, and contents acquired from a network apparatus;

a content-list selector that selects from the plural content lists generated by the content-list creator, on the basis of at least one of contents of the content lists and a situation during user operation, a predetermined number of content lists to be displayed;

and a display controller that causes a predetermined display unit to display the predetermined number of content lists selected by the content-list selector, wherein the information processing apparatus further includes an event table that associates a festival event with an event keyword and an event period, wherein when the present date and time are within an event period of a festival event included in the event table, the content-list creator acquires an event keyword associated with the festival event and uses the acquired event keyword to create a content list dedicated to the festival event, wherein the content-list creator assigns at least two attributes to each content list: a first attribute indicating a priority of the content list and a second attribute indicating a display size of the content list, wherein the content-list selector selects a random first layout for displaying the predetermined number of content lists so that, for each layout selection, a layout different from a previously selected layout is used for displaying the content lists, and the content-list selector determines the predetermined number of content lists by selecting, among all of the content lists assigned a same display size, a number of content lists that have the highest priorities in accordance with the number of display areas that have the same display size in the layout, and wherein the content-list selector selects a random second layout when the number of content lists having a same predetermined display size is less than the number of display areas having the same predetermined display size on the first layout.

2. An information processing apparatus according to claim 1, wherein the content list creator generates the content list on the basis of a subject selected from plural subjects set in advance.

3. An information processing apparatus according to claim 1, wherein the content-list creator selects, on the basis of a predetermined subject, contents from contents added after a date and time when the content list is displayed on the display, program guide information concerning program contents, contents acquired from a USB apparatus, contents acquired from a digital video terminal, and contents acquired from a network apparatus.

4. An information processing apparatus according to claim 1, wherein the content-list selector adjusts priorities of the content lists on the basis of at least one of the contents of the content lists and the situation during user operation and selects, on the basis of the priorities after the adjustment plural content lists to be displayed.

5. An information processing apparatus according to claim 1, wherein
the content-list selector selects a pattern of a layout from plural patterns and selects plural content lists displayed in the layout corresponding to the selected pattern, and
the display controller causes the display unit to display the plural content lists selected by the content-list selector in the layout corresponding to the pattern selected by the content-list selector.

6. An information processing apparatus according to claim 1, wherein the display controller causes the display unit to display the plural content lists immediately after startup of the information processing apparatus or when a specific command is inputted.

7. An information processing apparatus according to claim 2, wherein one of the subjects is defined to select a keyword corresponding to a present date and time from the keywords registered in association with specific data and times and to select contents having information including the selected keyword.

8. An information processing apparatus according to claim 2, wherein one of the subjects is defined to select contents that are not yet viewed and have high user preference.

9. An information processing apparatus according to claim 2, wherein one of the subjects is defined to select contents to be automatically deleted.

10. An information processing apparatus according to claim 2, wherein one of the subjects is defined to select contents not reproduced at a predetermined percentage or more or for a predetermined time or more.

11. An information processing apparatus according to claim 2, wherein one of the subjects is defined to select contents with large numbers of times of reproduction and with predetermined date and times.

12. An information processing apparatus according to claim 2, wherein one of the subjects is defined to select contents that are bookmarked by a user.

13. An information processing apparatus according to claim 2, wherein one of the subjects is defined to select contents from the contents in the information processing apparatus that are recorded during a predetermined period before the present date and time and are selected fewer than a predetermined number of times.

14. An information processing apparatus according to claim 2, wherein one of the subjects is defined to create, when content recorded during a predetermined period before a present date and time is present, an image indicating that the content recorded during the predetermined period before the present date and time is present date and time is present, and the content-list creator generates the image on the basis of the subject.

15. An information processing apparatus according to claim 14, wherein the subject is defined to create an image indicating the content recorded the predetermined period before the present date and time is present and showing a message for urging a user to perform predetermined operation for the content.

16. An information processing apparatus according to claim 2, wherein one of the subjects is defined to create, when program contents belonging to a same series are present in the recorded program contents and program content, the series of which can be discriminated as having ended from program information, is present in the program contents, an images indicating that the program content, series of which have been ended, is present, and the content-list creator generates the image on the basis of the subject.

17. An information processing apparatus according to claim 16, wherein the subject is defined to create an image indicating that the program content, series of which have been ended, is present and showing a message for urging a user to perform predetermined operation for the content.

18. An information processing apparatus according to claim 2, wherein one of the subjects is defined to select contents related to at least one of information representing a taste of a user and information set by the user.

19. An information processing apparatus according to claim 2, wherein program guide information concerning program contents are formed by data for a predetermined number of days and include program information for each of program contents receivable in each day.

20. An information processing apparatus according to claim 19, wherein one of the subjects is defined to select keywords often appearing concentrated on one day as contents from the data for the predetermined number of days delivered as the information contents at a time.

21. An inform ion processing apparatus according to claim 19, wherein
one of the subjects is defined to select cords often appearing concentrated on one day from the data for the predetermined number of days delivered as the information contents at a time, extract sentences including the selected keywords from data on a certain day, and select sentences representing contents of sentences extracted from the extracted sentence as contents, and
the content-list creator selects, on the basis of a number of keywords forming the sentences and a number of sentences in which the keywords are included, the sentences representing the contents of the extracted sentences from the extracted sentences to thereby create a content list.

22. An information processing apparatus according to claim 19, wherein
one of the subjects is defined to select program information that belongs to a predetermined genre and has a high user preference as contents from the program information included in the data for the predetermined number of days delivered as the information contents at a time, and
the content-list creator extracts keywords representing characteristics of program contents from respective pieces of program information belonging to a predetermined genre included in the data for the predetermined number of days delivered as the information contents at a time, gives the extracted keywords to the program information, from which the keywords are extracted, as the characteristics of the program contents, and selects program information that belongs to the predetermined genre and has high user preference from the program information to thereby create a content list.

23. An information processing apparatus according to claim 19, further comprising a storing unit that stores information contents delivered, in the past among information contents delivered at least once in one day, wherein
one of the subjects is defined to select program information that has a large number of keywords forming the program information and has a predetermined difference from program information selected last time from the information contents delivered in the past, and
the content-list creator selects, on the basis of the subject, program information that has a large number of keywords forming the program information and has a predetermined difference from program information selected last time from the information contents delivered in the past several days stored in the storing unit to thereby create a content list.

24. An information processing method performed by an information processing apparatus, comprising the steps of:
generating plural content lists for contents in the information processing apparatus, the contents in the information processing apparatus including recorded program contents received through an antenna for a broadcast network, program guide information concerning program contents, contents acquired from a USB apparatus, contents acquired from a digital video terminal, and contents acquired from a network apparatus;
selecting from the plural content lists created in the generating step, on the basis of at least one of contents of the content lists and a situation during user operation, a predetermined number of content lists to be displayed; and
causing a predetermined display unit to display the plural content lists selected in the selecting step,
wherein the generating step assigns at least two attributes to each content list: a first attribute indicating a priority of the content list and a second attribute indicating a display size of the content list,
wherein the information processing method further includes associating a festival event with an event keyword and an event period in an event table,
wherein when the present date and time are within an event period of a festival event included in the event table, the generating step acquires an event keyword associated with the festival event and uses the acquired event keyword to create a content list dedicated to the festival event,
wherein the selecting step selects a random first layout for displaying the predetermined number of content lists so that, for each layout selection, a layout different from a previously selected layout is used for displaying the content lists, and the selecting step determines the predetermined number of content lists by selecting, among all of the content lists assigned a same display size, a number of content lists that have the highest priorities in accordance with the number of display areas that have the same display size in the layout, and
wherein the selecting step selects a random second layout when the number of content lists having a same predetermined display size is less than the number of display areas having the same predetermined display size on the first layout.

25. A non-transitory storage medium storing an information processing program for causing an information processing apparatus to execute the steps of:
generating plural content lists for contents in the information processing apparatus, the contents in the information processing apparatus including recorded program contents received through an antenna for a broadcast network, program guide information concerning program contents, contents acquired from a USB apparatus, contents acquired from a digital video terminal, and contents acquired from a network apparatus;
selecting from the plural content lists generated in the generating step, on the basis of at least one of contents of the content lists and a situation during user operation, a predetermined number of content lists to be displayed; and
causing a predetermined display unit to display the predetermined number of content lists selected in the selecting step,
wherein the generating step assigns at least two attributes to each content list: a first attribute indicating a priority of the content list and a second attribute indicating a display size of the content list,
wherein the information processing program further includes an event table that associates a festival event with an event keyword and an event period,
wherein when the present date and time are within at, event period of a festival event included in the event table, the generating step acquires an event keyword associated with the festival event and uses the acquired event keyword to create a content list dedicated to the festival event,
wherein the selecting step selects a random first layout for displaying the predetermined number of content lists so that, for each layout selection, a layout different from a previously selected layout is used for displaying the content lists, and the selecting step determines the predetermined number of content lists by selecting, among all of the content lists assigned a same display size, a number of content lists that have the highest priorities in accordance with the number of display areas that have the same display size in the layout, and
wherein the selecting step selects a random second layout when the number of content lists having a same predetermined display size is less than the number of display areas having a same predetermined display size on the first layout.

\* \* \* \* \*